United States Patent
Yagi et al.

(10) Patent No.: US 9,855,654 B2
(45) Date of Patent: Jan. 2, 2018

(54) POWER ASSIST ROBOT APPARATUS AND CONTROL METHOD THEREFOR

(75) Inventors: Eiichi Yagi, Wakayama (JP); Motonobu Sato, Wakayama (JP); Kazuo Sano, Wakayama (JP)

(73) Assignee: Wakayama University, Wakayama (JP)

( * ) Notice: Subject to any disclaimer, the term of this patent is extended or adjusted under 35 U.S.C. 154(b) by 406 days.

(21) Appl. No.: 14/238,865

(22) PCT Filed: Sep. 6, 2012

(86) PCT No.: PCT/JP2012/072814
§ 371 (c)(1),
(2), (4) Date: Mar. 27, 2014

(87) PCT Pub. No.: WO2013/035814
PCT Pub. Date: Mar. 14, 2013

(65) Prior Publication Data
US 2014/0212243 A1 Jul. 31, 2014

(30) Foreign Application Priority Data

Sep. 6, 2011 (JP) ................................. 2011-194319
Dec. 5, 2011 (JP) ................................. 2011-266330

(51) Int. Cl.
*G06F 7/00* (2006.01)
*B25J 9/00* (2006.01)
(Continued)

(52) U.S. Cl.
CPC ........... *B25J 9/0006* (2013.01); *A61H 1/024* (2013.01); *A61H 1/0244* (2013.01);
(Continued)

(58) Field of Classification Search
USPC ...................................................... 700/213
See application file for complete search history.

(56) References Cited

U.S. PATENT DOCUMENTS 5,956,465 A 9/1999 Takagi et al.
6,204,619 B1 * 3/2001 Gu ........................ B66C 23/005
254/1

(Continued)

FOREIGN PATENT DOCUMENTS

EP 1442703 A1 8/2004
JP 1027022 1/1998

(Continued)

OTHER PUBLICATIONS

International Preliminary Report on Patentability dated Mar. 20, 2014.

(Continued)

*Primary Examiner* — Kyle Logan
(74) *Attorney, Agent, or Firm* — Harness, Dickey & Pierce

(57) ABSTRACT

A power assist robot apparatus is disclosed which is capable of assisting heavy-object lifting action and walking movement with fewer driving sources, and a method is disclosed for controlling the power assist robot apparatus. Two power-assist electric motors are located near opposite lateral sides in a right-left direction of the wearer's waist, respectively. Each lower-limb assist arm has one end fixed to a rotary shaft of the power-assist electric motor and the other end to which a lateral side of the thigh is attached. An upper-body assist arm placed at the wearer's chest and a main frame that holds the two power-assist electric motors at both ends thereof and is placed at the wearer's waist are connected by a driven rotary shaft which is rotatable about a vertical axis and a driven rotary shaft which is rotatable about a right-left axis.

8 Claims, 44 Drawing Sheets

(51) Int. Cl.
*A61H 3/00* (2006.01)
*A61H 1/02* (2006.01)

(52) U.S. Cl.
CPC ......... *A61H 1/0277* (2013.01); *A61H 1/0281* (2013.01); *A61H 3/00* (2013.01); *A61H 2201/1215* (2013.01); *A61H 2201/1246* (2013.01); *A61H 2201/149* (2013.01); *A61H 2201/165* (2013.01); *A61H 2201/5002* (2013.01); *A61H 2201/5061* (2013.01); *A61H 2201/5069* (2013.01); *A61H 2201/5084* (2013.01); *A61H 2201/5097* (2013.01)

(56) References Cited

U.S. PATENT DOCUMENTS

| | | | |
|---|---|---|---|
| 7,780,616 | B2 | 8/2010 | Katoh et al. |
| 7,947,004 | B2 | 5/2011 | Kazerooni et al. |
| 2004/0249316 | A1* | 12/2004 | Ashihara ............ A61B 5/1038 600/595 |
| 2006/0211956 | A1 | 9/2006 | Sankai |
| 2008/0154165 | A1* | 6/2008 | Ashihara ............ A61F 5/0102 602/23 |
| 2008/0234608 | A1 | 9/2008 | Sankai |
| 2009/0319054 | A1 | 12/2009 | Sankai |
| 2010/0094188 | A1 | 4/2010 | Goffer et al. |
| 2010/0270771 | A1 | 10/2010 | Kobayashi et al. |
| 2010/0280628 | A1 | 11/2010 | Sankai |
| 2011/0266323 | A1* | 11/2011 | Kazerooni ............ B25J 9/0006 224/575 |
| 2013/0231595 | A1* | 9/2013 | Zoss ..................... A61H 1/0255 601/34 |

FOREIGN PATENT DOCUMENTS

| | | |
|---|---|---|
| JP | 2000-051289 A | 2/2000 |
| JP | 2005-095561 A | 4/2005 |
| JP | 2005230099 A | 9/2005 |
| JP | 2005253650 A | 9/2005 |
| JP | 2006075456 A | 3/2006 |
| JP | 2007097636 A | 4/2007 |
| JP | 2007130234 A | 5/2007 |
| JP | 2007282991 A | 11/2007 |
| JP | 2010-017390 A | 1/2010 |
| JP | 2010-200797 A | 9/2010 |
| JP | 2010-207620 A | 9/2010 |
| WO | WO-2009044568 A1 | 4/2009 |

OTHER PUBLICATIONS

Supplementary Partial European Search Report dated Sep. 4, 2015.
Japanese Office Action and English translation thereof dated Sep. 24, 2015.
Cao, H. et al., "Design frame of a leg exoskeleton for load-carrying augmentation," Proceedings of 2009 IEEE International Conference on Robotics and Biomimetics (ROBIO), Dec. 2009, pp. 426-431.
Extended European Search Report dated Dec. 23, 2015.
International Search Report PCT/ISA/210 for PCT/JP2012/072814 dated Oct. 16, 2012.

* cited by examiner

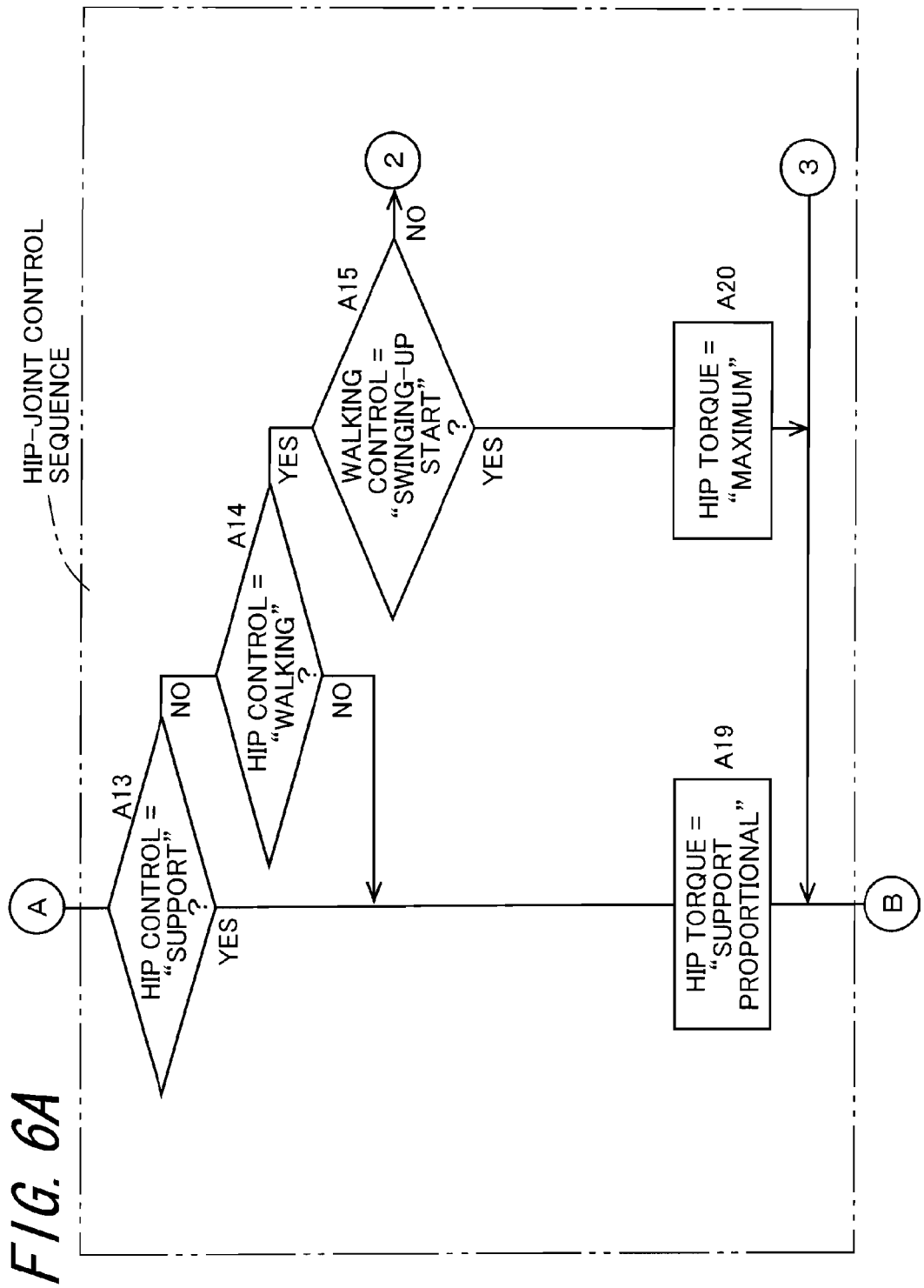

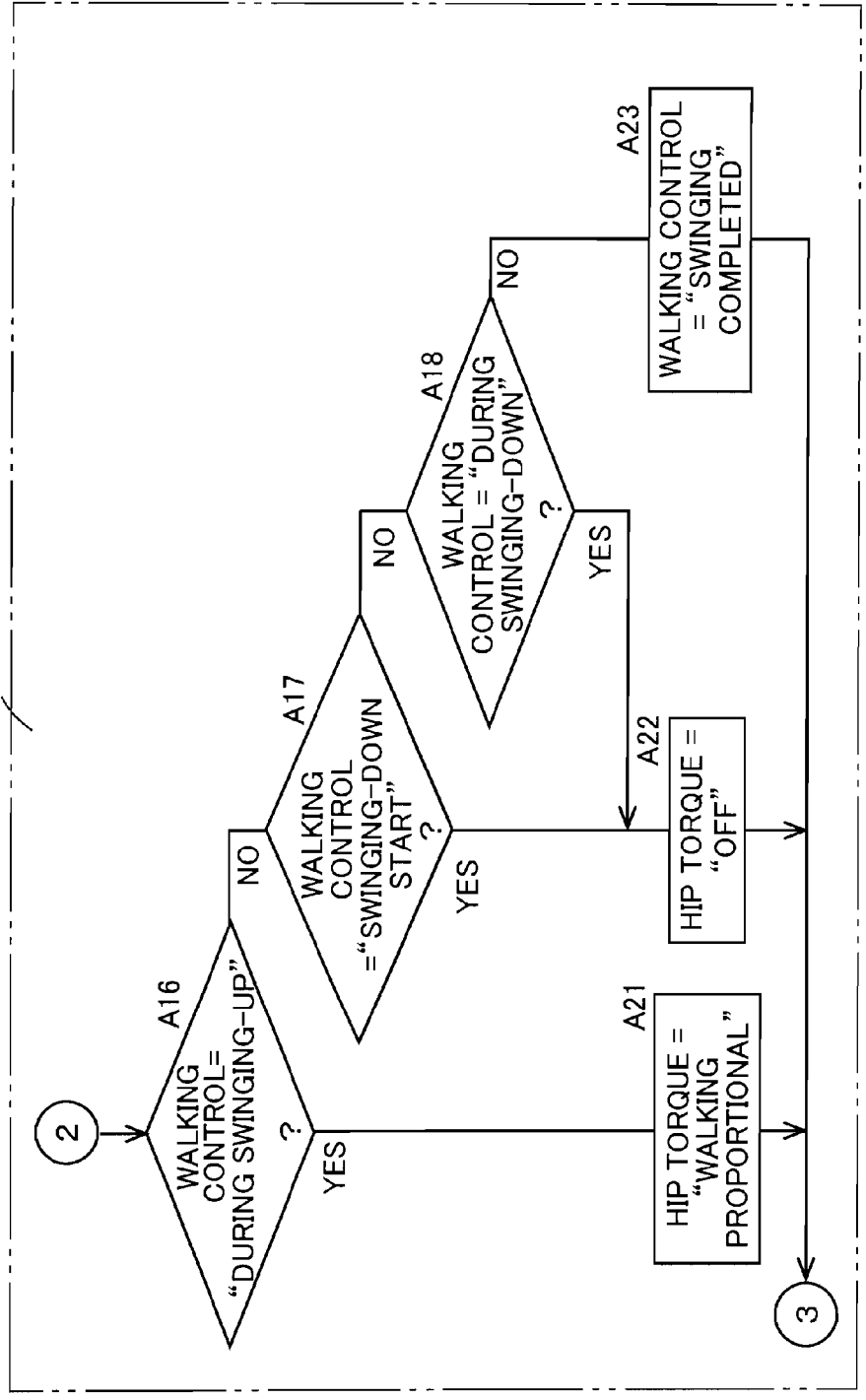

POWER ASSIST ROBOT APPARATUS AND CONTROL METHOD THEREFOR

TECHNICAL FIELD

The present invention relates to a power assist robot apparatus for assisting physical labor work carried out by a wearer who is wearing the same, and a control method for the same.

BACKGROUND ART

Japanese agricultural society is undergoing rapidly declining birth rate and growing proportion of elderly people. That is, while the farming population of the whole country has been declining, the number of agricultural workers aged over sixty has been increased to 2.2 million. Furthermore, in keeping with a crying need for improvement in the ratio of self-sufficiency in food products, farmwork support has been increasingly demanded. Under such circumstances, power assist robot equipment such as a power assist suit is utilized as farmwork support equipment that is not designed for traditional US-style large-scale agriculture mechanization but is adapted to Japanese narrow agricultural land, and is also useful in the invigoration of agriculture in intermontane areas and local revitalization.

There are two types of power assist suits, namely a light-work power assist suit and a heavy-work power assist suit. The light-work power assist suit is used for light-work support, for example, support for lifting, lowering, and transportation of light objects weighing ca. 10 kg or less, including work in a looking-up posture such as pollination, flower removal, picking, bagging, and harvest for fruits such as peaches, Japanese persimmons, mandarin oranges, grapes, and kiwis, and work in a half-sitting posture such as strawberry harvest, and also support for walking and running on the flat ground, slope, and stairs.

The heavy-work power assist suit is used for heavy-work support, for example, support for work in a half-sitting posture to harvest large vegetables such as Japanese white radishes and cabbages, and support for lifting, loading, unloading, and transportation of heavy objects weighing ca. 30 kg such as rice bags and crop containers.

Moreover, power assist suits are, in addition to being used for agricultural purposes, used in factories for work such as transportation of heavy objects and for work in a long-time continuous fixed posture. In addition, power assist suits are used for nursing-care purposes such as transfer of a person from a bed to a wheelchair, and can also be used for rehabilitation, for example, support for walking rehabilitation.

There are two types of drive systems for driving power assist suits, namely a passive system and an active system. Examples of the passive system include a spring-type system and a rubber-type system. Examples of the active system include an electric motor-type system, a pneumatically driving-type system, and a hydraulically driving-type system. Some of the pneumatically driving-type systems employ a pneumatic rubber artificial muscle, a pneumatic cylinder, and a pneumatic rotary actuator (refer to Patent Literatures 1 and 2, for example).

Moreover, examples of assist control systems for power assist suit control include an action pattern reproduction-type system based on sound input or switch input; a system for estimating torque which is to be produced from muscles based on surface electromyogram (EMG) signals (refer to Patent Literature 3, for example); an action pattern reproduction-type system for reproducing action patterns based on surface electromyogram (EMG) signals as trigger signals (refer to Patent Literature 4, for example); and a master-slave control-type system in which a power assist suit is allowed to follow the movement of a user wearing the power assist suit by feedback-controlling a force exerted on the user's wrist or ankle measuring by a sensor (refer to Patent Literatures 2, 5, and 6, for example).

CITATION LIST

Patent Literature

Patent Literature 1: Japanese Examined Patent Publication JP-B2 3771056
Patent Literature 2: Japanese Unexamined Patent Publication JP-A 2007-97636
Patent Literature 3: Japanese Examined Patent Publication JP-B2 4200492
Patent Literature 4: Japanese Examined Patent Publication JP-B2 4178185
Patent Literature 5: Japanese Unexamined Patent Publication JP-A 2007-130234
Patent Literature 6: Japanese Unexamined Patent Publication JP-A 2006-75456

SUMMARY OF INVENTION

Technical Problem

The passive system such as the spring-type system or rubber-type system is merely capable of providing power assistance in only one direction. The electric motor-type system with a high-reduction-ratio speed reducer poses a safety problem. The pneumatically driving-type system becomes heavy in weight when it is equipped with an air compressor for air compression, and so does the hydraulically driving-type system. The action pattern reproduction-type system is subjected to limitation on reproducible patterns, and poses the possibility of causing discontinuity in movement at the time of switching of action patterns. The system for estimating torque based on surface electromyogram (EMG) signals necessitates preliminary learning. In the master-slave control-type system, feedback is effected after a wearer moves, with a consequent delay in motion, wherefore it is inevitable that the wearer will feel as if he/she pulls the power assist robot apparatus on his/her own.

Furthermore, the prior-art technologies as above described cannot realize both power assistance to the waist joint, viz. lumbar vertebra to prevent a lower back pain resulting from execution of work such as lifting and transportation of heavy objects, and power assistance to hip joints during walking at the same time. As a method for power assistance to hip, there is a system for assisting a predetermined action, such as a bending motion at the waist, with use of a pneumatic artificial muscle, but, this system is designed merely to reproduce the waist bending motion for providing assistance, wherefore a wearer is restrained against a turning motion or side-to-side motion of his/her upper body, and also, the system is incapable of providing assistance in conjunction with walking movement. In addition, there is a need to provide separate driving sources: one for waist-joint power assistance and one for hip-joint power assistance.

An object of the invention is to provide a power assist robot apparatus capable of assisting wearer's movement without any restraint, and a method for controlling the power assist robot apparatus.

Another object of the invention is to provide a power assist robot apparatus capable of assisting heavy-object lifting action and walking movement with fewer driving sources, and a method for controlling the power assist robot apparatus.

Solution to Problem

The invention provides a power assist robot apparatus comprising:

two rotating drive portions that are located near opposite lateral sides in a right-left direction of a waist of a wearer wearing the power assist robot apparatus, respectively, and produce drive torque for assisting a movement of the wearer's upper body and thighs in a direction to follow the movement of the wearer's upper body and thighs;

an upper-limb frame that is placed at the wearer's chest and waist, and holds the two rotating drive portions; and two thigh frames, one ends of which are fixed to rotary shafts of the rotatably driving portions and the other ends of which are placed at lateral sides of thighs.

In the invention, it is preferable that the upper-limb frame includes:

a chest frame placed at the wearer's chest;

a waist frame for holding the two rotatably driving portions at opposite ends thereof, respectively, which extends along a back side of the wearer's waist in a region between the two rotatably driving portions so as to lie at the wearer's waist; and an upper-body connection portion for coupling the chest frame to the waist frame for rotation about a front-rear axis and a vertical axis as well.

Moreover, in the invention, it is preferable that the rotatably driving portion includes a bearing portion composed of an inner-ring part secured to the rotary shaft of the rotatably driving portion and an outer-ring part disposed so as to be rotatable about an axis of the rotary shaft relative to the inner-ring part, one end of the thigh frame is secured to the inner-ring part, and the waist frame includes a sub frame which is secured to the outer-ring part and is placed in intimate contact with the wearer's waist.

Moreover, in the invention, it is preferable that the power assist robot apparatus further comprises:

a first angle detecting portion that detects an angle of turning motion of the wearer's upper body about a right-left axis thereof;

a second angle detecting portion that is disposed in each of the two rotatably driving portions and detects a rotation angle of the rotary shaft of each of the rotatably driving portions; and floor-reaction-force detecting portions that are placed at a toe part and a heel part, respectively, of a sole of a shoe worn by the wearer, and detects whether a load greater than or equal to a predetermined value acts on a toe and a heel.

Moreover, in the invention, it is preferable that the power assist robot apparatus further comprises:

a drive control section that determines static torque exerted on the upper body and thighs, a turning direction, and rotation torque required for turning motion by calculation, based on a turning angle of the upper body detected by the first angular detecting portion, a rotation angle of the rotary shaft of the rotatably driving portion detected by the second angular detecting portion, and a result detected from the floor-reaction-force detecting portion, calculates drive torque which is to be produced by the two rotatably driving portions, based on the thusly determined static torque, turning direction, and rotation torque, and drives the two rotatably driving portions so as to produce the calculated drive torque.

Moreover, in the invention, it is preferable that the drive control section reduces the calculated drive torque so that a speed reduction ratio becomes less than or equal to a level that allows the wearer to drive the two rotatably driving portions in a reverse direction, and imparts the drive torque to the two rotatably driving portions.

The invention provides a power assist robot apparatus comprising:

two arm drive sections that are each located near opposite shoulders of a wearer wearing the power assist robot apparatus, respectively, and produce rotation torque for assisting a movement of the wearer's upper arm in a direction to follow the movement of the wearer's upper arm;

an arm holding portion that is placed at an upper part of the wearer's body, and holds the two arm drive sections;

two thigh drive sections that are each located near the wearer's hip, and produce rotation torque for assisting a movement of the wearer's thigh in a direction to follow the movement of the wearer's thigh; and a hip holding portion that is placed at the wearer's hip, and holds the two thigh drive sections.

In the invention, it is preferable that the arm holding portion includes a frame extending over the shoulders of the wearer, and the two arm drive sections are coupled to the frame.

Moreover, in the invention, it is preferable that the power assist robot apparatus further comprises:

a first angle detecting portion that is disposed in the two arm drive sections, and detects an angle of turning motion of the upper arm about a shoulder joint;

a second angle detecting portion that is disposed in the two thigh drive sections, and detects an angle of turning motion of the thigh about a hip joint;

floor-reaction-force detecting portions that are placed at a toe part and a heel part, respectively, of a sole of a shoe worn by the wearer, and detect whether a weight greater than or equal to a predetermined value acts on a toe and a heel; and a three-dimensional acceleration sensor that is disposed in the hip holding portion, and detects an inclination of an upper half of the wearer's body.

Moreover, in the invention, it is preferable that the power assist robot apparatus further comprises:

a drive control section that determines static torque exerted on each upper arm and each thigh, a turning direction, and rotation torque required for turning motion by calculation, based on a turning angle of each upper arm detected by the first angular detecting portion, a turning angle of each thigh detected by the second angular detecting portion, a result detected from the floor-reaction-force detecting portion, and an inclination of the upper half of the body detected by the three-dimensional acceleration sensor, calculates drive torque for a drive to the two arm drive sections and the two thigh drive sections, based on the thusly determined static torque, turning direction, and rotation torque, and drives the two arm drive sections and the two thigh drive sections so as to produce the calculated drive torque.

Moreover, in the invention, it is preferable that the drive control section reduces the calculated drive torque so that a speed reduction ratio becomes less than or equal to a level that allows the wearer to drive the two arm drive sections and the two thigh drive sections in a reverse direction, and imparts the drive torque to the two arm drive sections and the two thigh drive sections.

Moreover, in the invention, it is preferable that the power assist robot apparatus further comprises a parameter input section to which parameters indicative of individual differences among wearers are inputted, and the drive control section calculates the drive torque based on a parameter inputted via the parameter input section.

Moreover, in the invention, it is preferable that the drive control section produces parameters indicative of individual differences among wearers based on a turning angle of the upper body detected by the first angular detecting portion, a rotation angle of the rotary shaft of the rotatably driving portion detected by the second angular detecting portion, and a result detected from the floor-reaction-force detecting portion.

The invention provides a control method for the power assist robot apparatus described above, comprising:

a calculation step of determining static torque exerted on the upper body and thighs, a turning direction, and rotation torque required for turning motion by calculation, based on a turning angle of the upper body detected by the first angular detecting portion, a rotation angle of the rotary shaft of the rotatably driving portion detected by the second angular detecting portion, and a result detected from the floor-reaction-force detecting portion; and a driving step of calculating drive torque for a drive to the two rotatably driving portions, based on the static torque, turning direction, and rotation torque determined in the calculation step, and driving the two rotatably driving portions so as to produce the calculated drive torque.

The invention provides a control method for the power assist robot apparatus described above, comprising:

a calculation step of determining static torque exerted on each upper arm and each thigh, a turning direction, and rotation torque required for turning motion by calculation, based on a turning angle of each upper arm detected by the first angular detecting portion, a turning angle of each thigh detected by the second angular detecting portion, a result detected from the floor-reaction-force detecting portion, and an inclination of the upper half of the body detected by the three-dimensional acceleration sensor; and a driving step of calculating drive torque for a drive to the two arm drive sections and the two thigh drive sections, based on the thusly determined static torque, turning direction, and rotation torque, reducing the calculated drive torque so that a speed reduction ratio becomes less than or equal to a level that allows the wearer to drive the two arm drive sections and the two thigh drive sections in a reverse direction, and driving the two arm drive sections and the two thigh drive sections.

Advantageous Effects of Invention

According to the invention, the two rotatably driving portions are located near the opposite lateral sides in the right-left direction of the wearer's waist, respectively, and produce drive torque for assisting the movement of the upper body and the thigh in a direction to follow the movement of the wearer's upper body and thighs. The upper-body frame is placed at the wearer's chest and waist, and holds the two rotatably driving portions. Each of the two thigh frames has one end fixed to the rotary shaft of the rotatably driving portion and has the other end placed at the lateral side of the thigh. Accordingly, the power assist robot apparatus is capable of assisting heavy-object lifting action and walking movement with fewer driving sources, namely the two rotatably driving portions located at the lateral sides of the waist, respectively.

Moreover, according to the invention, the upper-body frame includes a chest frame, a waist frame, and an upper-body connection portion. The chest frame is placed at the wearer's chest. The waist frame holds the two rotatably driving portions at opposite ends thereof, respectively, and extends along the back side of the wearer's waist in a region between the two rotatably driving portions so as to lie at the wearer's waist. The upper-body connection portion couples the chest frame to the waist frame for rotation about the front-rear axis and the vertical axis as well. Accordingly, in contrast to the case of coupling the chest frame to the waist frame at two locations, namely their ends, the power assist robot apparatus is capable of assisting heavy-object lifting action and walking movement without putting any restraint on the side-to-side motion of the upper body and the turning motion of the upper body.

Moreover, according to the invention, the rotatably driving portion includes the bearing portion composed of the inner-ring part secured to the rotary shaft of the rotatably driving portion and the outer-ring part disposed so as to be rotatable about the axis of the rotary shaft relative to the inner-ring part. One end of the thigh frame is secured to the inner-ring part. The waist frame includes the sub frame which is secured to the outer-ring part and is placed in intimate contact with the wearer's waist. Accordingly, the power assist robot apparatus is capable of assisting heavy-object lifting action and walking movement without putting any restraint on the motion of the waist.

Moreover, according to the invention, the first angle detecting portion detects the angle of turning motion of the wearer's upper body about the right-left axis. The second angle detecting portion is disposed in each of the two rotatably driving portions, and detects a rotation angle of the rotary shaft of each of the rotatably driving portions. The floor-reaction-force detecting portions are placed at the toe part and the heel part, respectively, of the sole of a shoe worn by the wearer, and detects whether a load greater than or equal to a predetermined value acts on the toe and the heel. Accordingly, the power assist robot apparatus is free from the inconvenience of placement of a surface electromyogram (EMG) sensor, and is therefore useful.

Moreover, according to the invention, the drive control section determines static torque exerted on the upper body and thighs, a turning direction, and rotation torque required for turning motion by calculation, based on a turning angle of the upper body detected by the first angular detecting portion, a rotation angle of the rotary shaft of the rotatably driving portion detected by the second angular detecting portion, and a result detected from the floor-reaction-force detecting portion. Then, the drive control section calculates drive torque for a drive to the two rotatably driving portions, based on the thusly determined static torque, turning direction, and rotation torque, and then drives the two rotatably driving portions so as to produce the calculated drive torque. Accordingly, in the power assist robot apparatus, since there is no need to compile a large number of action patterns into a database, it never occurs that discontinuity in movement appears at the time of switching of action patterns.

Moreover, according to the invention, the drive control section reduces the calculated drive torque so that the speed reduction ratio becomes less than or equal to a level that allows the wearer to drive the two rotatably driving portions in a reverse direction, and imparts the drive torque to the two rotatably driving portions. Accordingly, the power assist robot apparatus is able to ensure wearer's safety.

Moreover, according to the invention, in practicing the control method for the power assist robot apparatus, in the calculation step, static torque exerted on the upper body and thighs, a turning direction, and rotation torque required for turning motion are determined by calculation, based on a turning angle of the upper body detected by the first angular detecting portion, a rotation angle of the rotary shaft of the rotatably driving portion, and a result detected from the floor-reaction-force detecting portion. Then, in the driving step, drive torque for a drive to the two rotatably driving portions is calculated based on the static torque, turning direction, and rotation torque determined in the calculation step, and the two rotatably driving portions are driven so as to produce the calculated drive torque. Accordingly, the control method pursuant to the invention makes it possible to assist heavy-object lifting action and walking movement with fewer driving sources, namely the two rotatably driving portions located at the lateral sides of the waist, respectively.

According to the invention, the two arm drive sections are located near the wearer's opposite shoulders, respectively, and produce rotation torque for assisting the movement of the wearer's upper arm in a direction to follow the movement of the wearer's upper arm. The arm holding portion is placed at the upper part of the wearer's body, and holds the two arm drive sections. The two thigh drive sections are each located near the wearer's hip, and produce rotation torque for assisting the movement of the wearer's thigh in a direction to follow the movement of the wearer's thigh. The hip holding portion is placed at the wearer's hip, and holds the two thigh drive sections. Thus, in the power assist robot apparatus, in order to permit freedom of wearer's movement in directions other than the assist direction, an arm connection portion and a hip connection portion, for example, driven rotary shafts free of drive devices, which are free to rotate about the vertical axis and the front-rear axis, are each disposed around the outer periphery of the wearer's joint. This makes it possible to provide assistance without putting any restraint on wearer's movement.

Moreover, according to the invention, the arm holding portion includes a frame extending over the shoulders of the wearer. The two arm drive sections are coupled to the frame. This makes it possible to render the arm holding portion for holding the two thigh drive sections lighter in weight, and thereby reduce burdens on the wearer.

Moreover, according to the invention, the first angle detecting portion is disposed in the two arm drive sections, and detects the angle of turning motion of the upper arm. The second angle detecting portion is disposed in the two thigh drive sections, and detects the angle of turning motion of the thigh. The floor-reaction-force detecting portions are placed at the toe part and the heel part, respectively, of the sole of a shoe worn by the wearer, and detect whether a weight greater than or equal to a predetermined value acts on the toe and the heel. The three-dimensional acceleration sensor is disposed in the hip holding portion, and detects an inclination of the upper half of the wearer's body. Being provided with the first and second angle detecting portions, the floor-reaction-force detecting portions, and the three-dimensional acceleration sensor, the power assist robot apparatus is free from the inconvenience of placement of a surface electromyogram (EMG) sensor, and is therefore useful.

Moreover, according to the invention, the drive control section determines static torque exerted on each upper arm and each thigh, a turning direction, and rotation torque required for turning motion by calculation, based on a turning angle of each upper arm detected by the first angular detecting portion, a turning angle of each thigh detected by the second angular detecting portion, a result detected from the floor-reaction-force detecting portion, and an inclination of the upper half of the body detected by the three-dimensional acceleration sensor, calculates drive torque for a drive to the two arm drive sections and the two thigh drive sections, based on the thusly determined static torque, turning direction, and rotation torque, and drives the two arm drive sections and the two thigh drive sections so as to produce the calculated drive torque. Accordingly, in the power assist robot apparatus, since drive-torque calculation is performed based on turning angles and so forth, there is no need to compile a large number of action patterns into a database, wherefore it never occurs that discontinuity in movement appears at the time of switching of action patterns.

Moreover, according to the invention, the drive control section reduces the calculated drive torque so that the speed reduction ratio becomes less than or equal to a level that allows the wearer to drive the two arm drive sections and the two thigh drive sections in a reverse direction, and then drives the two arm drive sections and the two thigh drive sections. Thus, in the power assist robot apparatus, the speed reduction ratio is adjusted to be less than or equal to a level that allows the wearer to operate the two arm drive sections and the two thigh drive sections in a reverse direction, for example, the speed reduction ratio is adjusted to be as low as about a one-fiftieth level, so that the output from the two arm drive sections and the two thigh drive sections can be restricted to prevent production of a force greater than that which can be produced by the wearer. This makes it possible to ensure wearer's safety.

Moreover, according to the invention, to the parameter input section, parameters indicative of individual differences among wearers are inputted. The drive control section calculates the drive torque based on a parameter inputted via the parameter input section. Thus, the power assist robot apparatus is designed to permit inputting of parameters indicative of individual differences among wearers, and can therefore be used by anyone who wants to wear.

Moreover, according to the invention, in controlling the power assist robot apparatus, in the calculation step, static torque exerted on each upper arm and each thigh, a turning direction, and rotation torque required for turning motion are determined by calculation, based on a turning angle of each upper arm detected by the first angular detecting portion, a turning angle of each thigh detected by the second angular detecting portion, a result detected from the floor-reaction-force detecting portion, and an inclination of the upper half of the body detected by the three-dimensional acceleration sensor. Then, in the driving step, drive torque for a drive to the two arm drive sections and the two thigh drive sections is calculated based on the thusly determined static torque, turning direction, and rotation torque, and the calculated drive torque is reduced so that the speed reduction ratio becomes less than or equal to a level that allows the wearer to drive the two arm drive sections and the two thigh drive sections in a reverse direction, for driving the two arm drive sections and the two thigh drive sections. Being provided with the angle detecting portions, the floor-reaction-force detecting portions, and the three-dimensional acceleration sensor, the power assist robot apparatus is free from the inconvenience of placement of a surface electromyogram (EMG) sensor, and is therefore useful. In addition, in the power assist robot apparatus, since drive-torque calculation is performed based on turning angles and so forth, there is no need to compile a large number of action patterns into a database, wherefore it never occurs that discontinuity in movement appears at the time of switching of action patterns.

Other and further objects, features, and advantages of the invention will be more explicit from the following detailed description taken with reference to the drawings wherein.

BRIEF DESCRIPTION OF DRAWINGS

FIGS. 6A and 6B are flow charts showing the procedural steps of the first assist suit control process to be performed by the first light-work assist suit 100;

DESCRIPTION OF EMBODIMENTS

Figure 1A:
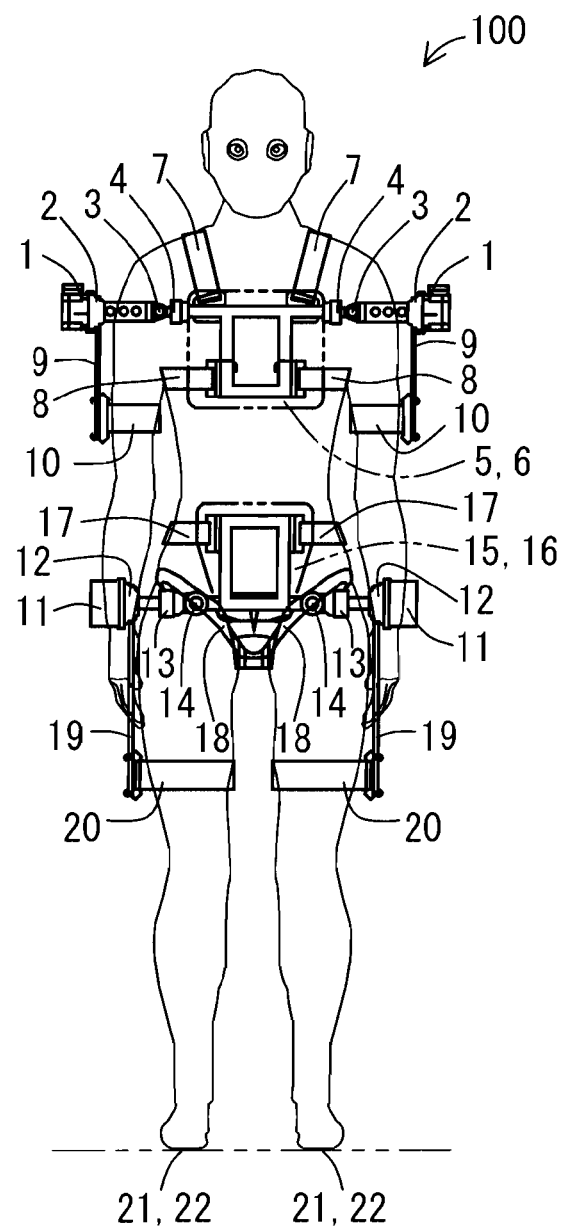
FIG. 1A is a view showing the outer appearance of a first light-work assist suit 100 in accordance with a first embodiment of the invention.
Figure 1B:
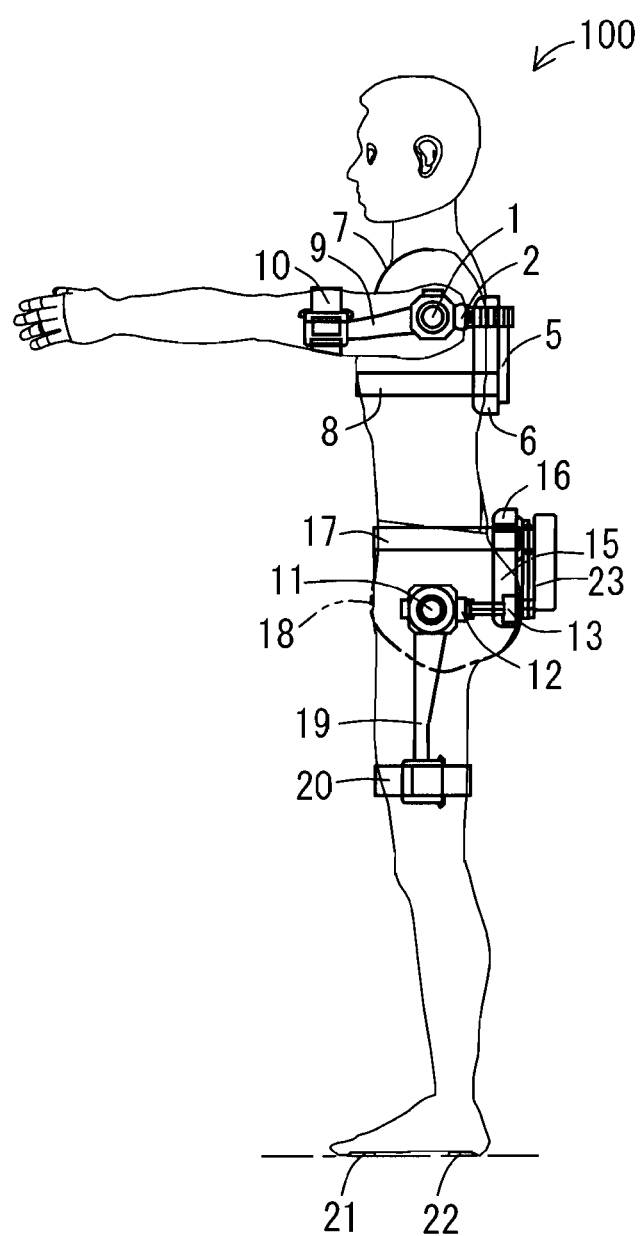
FIG. 1B is a view showing the outer appearance of the first light-work assist suit 100 in accordance with the first embodiment of the invention.

FIGS. 1A and 1B are views showing the outer appearance of a first light-work assist suit 100 in accordance with a first embodiment of the invention. FIG. 1A is a front view showing the outer appearance of the first light-work assist suit 100 worn by the wearer. FIG. 1B is a side view showing the outer appearance of the first light-work assist suit 100 worn by the wearer. A control method pursuant to the invention is practiced by the first light-work assist suit 100.

The first light-work assist suit 100 implemented as a power assist robot apparatus comprises: electric motors 1 and 11; driven rotary shafts 2 to 4 and 12 to 14; back frames 5 and 15; arms 9; shoulder belts 7; chest belts 8; arm belts 10; crotch belts 18; thigh belts 20; toe floor-reaction-force detection switches 21; heel floor-reaction-force detection switches 22; and a central control unit 23. The first light-work assist suit 100 is an assist suit for light work with the electric motor 1 serving as an actuator supported at its back.

The electric motor 1, which is an electric motor used as a power source for shoulder power assistance, and more specifically for assisting shoulder movement, produces power to assist a turning motion of the arm about the shoulder joint as a pivotal point. The electric motor 1 is placed at the side of each of the right and left shoulder joints in the following fashion. The positional relationship between each component of the first light-work assist suit 100 and the wearer conforms to the positional relationship between each component and the wearer in a state of wearing the first light-work assist suit 100.

On the fixed-end side of the electric motor 1 is installed the driven rotary shaft 2 configured to provide a degree of freedom in turning motion of the shoulder joint about a vertical axis. A frame coupled to the driven rotary shaft 2 is attached to the upper end of the back frame 5 located near the central area of the wearer's back, from the right and left sides, via the driven rotary shaft 3 configured to provide a degree of freedom in turning motion of the shoulder joint about a front-rear axis, and the driven rotary shaft 4 configured to provide a degree of freedom in turning motion of the shoulder joint about the vertical axis. The driven rotary shaft 3 and the driven rotary shaft 4 are situated on the back side of the shoulder joint center. The driven rotary shaft 2, the driven rotary shaft 3, and the driven rotary shaft 4 are arm connection portions.

The back frame 5 serving as an arm holding portion is quadrangular-shaped, for example. On the back frame 5 is installed a cushion pad 6 conforming to the shape of the wearer's back. Moreover, on the back frame 5 is installed the shoulder belt 7 and the chest belt 8. The shoulder belt 7 is placed so as to extend from the upper part of the back frame 5 to the top of each of the right and left shoulders and from there to the front of the chest, whereas the chest belt 8 is placed so as to extend in a right-left direction from the lower part of the back frame 5 to the wearer's underarm and from there to the front of the chest, so that the back frame 5 can be brought into intimate contact with the wearer.

On the rotating-end side of the electric motor 1 is installed the arm 9 extending along the wearer's upper arm. On the arm 9 is installed the arm belt 10 for fastening the arm 9 to the upper arm. The arm connection portions, the above-described electric motor 1, and the arm 9 constitute a arm drive section.

The electric motor 11, which is an electric motor used as a power source for hip power assistance, and more specifically for assisting hip movement, produces power to assist a turning motion of the thigh about the hip joint as a pivotal point. The electric motor 11 is placed at the side of each of the right and left hip joints for rotation about a right-left axis in the following fashion.

On the fixed-end side of the electric motor 11 is installed the driven rotary shaft 12 configured to provide a degree of freedom in turning motion of the hip joint about the vertical axis. A frame coupled to the driven rotary shaft 12 is attached to the lower end of the back frame 15 located near the central area of the wearer's back, from the right and left sides, via the driven rotary shaft 13 configured to provide a degree of freedom in turning motion of the hip joint about the vertical axis, and the driven rotary shaft 14 configured to provide a degree of freedom in turning motion of the hip joint about the front-rear axis. The driven rotary shaft 13 and the driven rotary shaft 14 are situated on the back side of the hip joint center. The driven rotary shaft 12, the driven rotary shaft 13, and the driven rotary shaft 14 are hip connection portions. The hip connection portions and the above-described electric motor 11 constitute a thigh drive section.

The back frame 15 serving as a hip holding portion is quadrangular-shaped, for example. On the back frame 15 is installed a cushion pad 16 conforming to the shape of the wearer's back. Moreover, on the back frame 15 is installed a waist belt 17 and the crotch belt 18. The waist belt 17 is placed so as to extend in the right-left direction from the upper part of the back frame 15 to the wearer's side and from there to each of the right and left front sides of the chest, whereas the crotch belt 18 is placed so as to extend from the lower part of the back frame 15 to the crotch region and from there to each of the right and left front sides of the chest, so that the back frame can be brought into intimate contact with the wearer.

On the rotating-end side of the electric motor 11 is installed an arm 19 extending along the wearer's thigh. On the arm 19 is installed the thigh belt 20, and the arm 19 is fastened to the thigh.

The toe floor-reaction-force detection switch 21 is placed at the side of the toe of each shoe sole. The heel floor-reaction-force detection switch 22 is placed at the side of the heel of each shoe sole. The toe floor-reaction-force detection switch 21 is a sensor for detecting whether the toe is subjected to a predetermined weight, for example, a weight of 3 kg or more. The heel floor-reaction-force detection switch 22 is a sensor for detecting whether the heel is subjected to a predetermined weight, for example, a weight of 3 kg or more. The toe floor-reaction-force detection switch 21, as well as the heel floor-reaction-force detection switch 22, sends the result detected, viz. information as to whether the toe is subjected to a weight of 3 kg or more, to the central control unit 23. The toe floor-reaction-force detection switch 21 and the heel floor-reaction-force detection switch 22 are floor-reaction-force detecting portions.

The electric motors 1 and 11 each include a rotary encoder for joint-angle measurement. Each of the rotary encoders sends a measured joint angle to the central control unit 23. The rotary encoder included in the electric motor 1 is a first angle detecting portion. The rotary encoder included in the electric motor 11 is a second angle detecting portion.

The central control unit 23 is installed on the back side of the back frame 15. The central control unit 23 includes a triaxial acceleration sensor. The triaxial acceleration sensor is a three-dimensional accelerometer for measuring the inclination of the hip in the directions of three axes.

Figure 2:
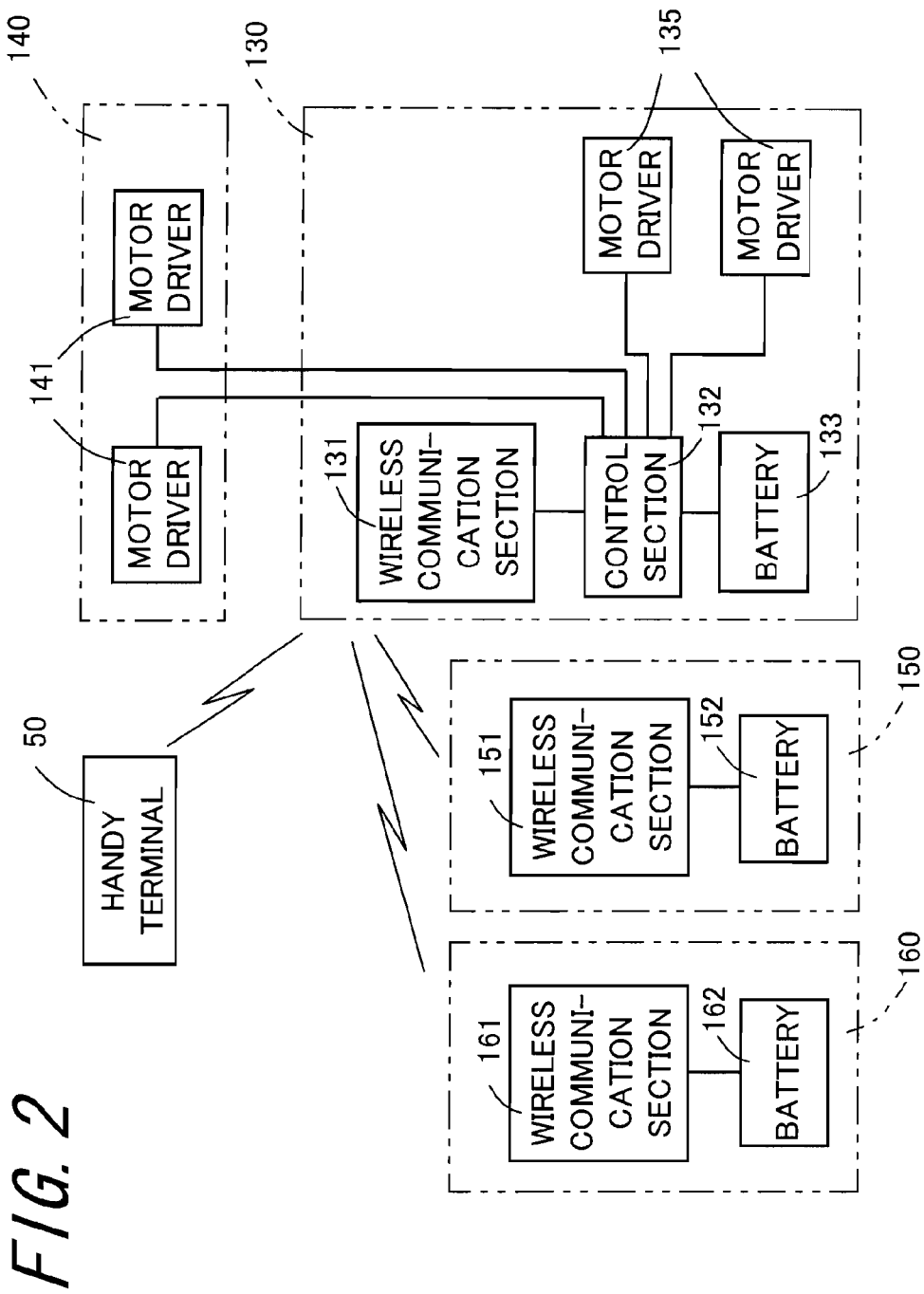
FIG. 2 is a diagram showing the configuration of control devices included in the first light-work assist suit 100.

FIG. 2 is a diagram showing the configuration of control devices included in the first light-work assist suit 100. The control devices included in the first light-work assist suit 100 include a lower-limb unit 130, an upper-limb unit 140, a right-foot unit 150, a left-foot unit 160, and a parameter-setting handy terminal (hereafter referred to as "handy terminal") 50.

The lower-limb unit 130, which serves as the central control unit 23, comprises: a wireless communication section 131; a control section 132; a battery 133; and a motor driver 135. The wireless communication section 131, which is constructed for example of a communication device, transmits information to and receives information from the right-foot unit 150, the left-foot unit 160, and the handy terminal 50 by means of wireless communication. Wireless communication is effected by using, for example, 2.4 GHz-band transceiver integrated circuit (hereafter referred to as "IC") manufactured by NORDIC SEMICONDUCTOR in Norway. This IC, while being based on a unique protocol, is capable of switching among four frequencies with a single IC, and thus permits communication among three points on an individual basis.

The control section 132 serving as a drive control section is constructed for example of a central processing unit ("CPU" for short). The motor driver 135 is incorporated in the electric motor 11 to effect drive control of the electric motor 11. The control section 132 and the motor driver 135 are connected to each other by means of wire communication. The control section 132 sends an output torque command required for assistance to the motor driver 135. The motor driver 135 sends a joint angle measured by the rotary encoder to the control section 132. The battery 133 is a rechargeable storage battery for supplying power to each of the constituent components of the lower-limb unit 130 and the upper-limb unit 140, and the electric motors 1 and 11.

The upper-limb unit 140 includes a motor driver 141. The motor driver 141 is incorporated in the electric motor 1 to effect drive control of the electric motor 1. The motor driver 141 is connected to the control section 11 by means of wire communication. Wire communication is effected by using, for example, CAN (Controller Area Network) communication used in the field of automobile. The control section 132 sends an output torque command required for assistance to the motor driver 141. The motor driver 141 sends a joint angle measured by the rotary encoder to the control section 132.

The right-foot unit 150 includes a wireless communication section 151 and a battery 152. The wireless communication section 151 is connected to the toe floor-reaction-force detection switch 21 and the heel floor-reaction-force detection switch 22, for sending the result detected from the toe floor-reaction-force detection switch 21 and the heel floor-reaction-force detection switch 22 to the control section 132 by means of wireless communication. The battery 152 supplies power to the wireless communication section 151, the toe floor-reaction-force detection switch 21, and the heel floor-reaction-force detection switch 22. The left-foot unit 160 includes a wireless communication section 161 and a battery 162, but is identical in configuration with the right-foot unit 150, wherefore the description thereof will be omitted to avoid overlaps.

Figure 3:
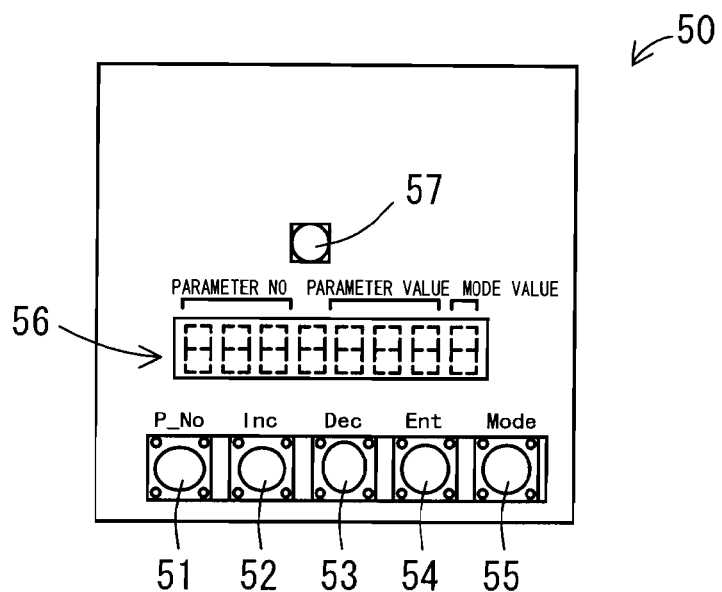
FIG. 3 is a view showing the outer appearance of the handy terminal 50.

FIG. 3 is a view showing the outer appearance of the handy terminal 50. The handy terminal 50 serving as a parameter input section is terminal equipment used for the setting of parameters required for the operation of the first light-work assist suit 100. The handy terminal 50 comprises: a parameter-number selection switch 51; an incrementing switch 52; a decrementing switch 53; an entry switch 54; a mode switch 55; a parameter display portion 56; and a light emitting diode (hereafter referred to as "LED") 57.

The parameter-number selection switch 51 is a switch for inputting parameter number (hereafter also referred to as "parameter No" or "P_No"). The parameter No is incremented from zero by one with every push of the switch. The incrementing switch 52 is a switch for the counting-up of parameter value for setting, and the parameter value is incremented by one with every push of the switch. The decrementing switch 53 is a switch for the counting-down of parameter value for setting, and the parameter value is decremented by one with every push of the switch.

The entry switch 54 is a switch for setting selected parameter No and updated parameter value by storing them in a non-illustrated memory section. The mode switch 55 is a switch for allowing selection between different operation modes as will hereafter be described, and a mode value is switched among "0", "1", and "2" one after another in the order named with every push of the switch. After reaching "2", the mode value is reset to "0". The mode value "0" represents a non-assist mode, the mode value "1" represents a support mode, and the mode value "2" represents a walking mode.

The parameter display portion 56 is constructed of a display device for displaying, for example, a numeral, a symbol, and a character thereon. The parameter display portion 56 shown in FIG. 3 is capable of displaying an 8-digit number, a symbol, and a character. Upper 3 digits indicate parameter No, the fourth digit indicates symbol "-", the fifth to seventh digits indicate parameter value, and the eighth digit indicates mode value. The LED 57 is a lamp for indicating that selected parameter No and updated parameter value are set in storage in the non-illustrated memory section. Parameters that can be set in the handy terminal 50 are listed in Table 1.

TABLE 1

| Parameter No | Meaning | Initial value | Range of values |
|---|---|---|---|
| 0 | Parameter storage area: Parameters corresponding to 10 persons in total can be stored | 1 | 1-10 |
| 1 | Radio channel used for right shoe | 0 | 0-3 |
| 2 | Radio channel used for left shoe | 1 | 0-3 |
| 3 | Shoulder swinging-down judgment time | 100 mS | 10-500 [mS] |
| 4 | Shoulder swinging-down judgment angle | 4 | 1-10 [deg] |
| 5 | Shoulder maximum torque | 50 | 0-100 [%] |
| 6 | Shoulder control range | 90 | 0-90 [deg] |
| 7 | Output in shoulder assist-OFF state | 1 | 0-10 [%] |
| 8 | Maximum torque for hip in support state | 50 | 0-100 [%] |
| 9 | Hip control range | 90 | 0-90 [deg] |
| 10 | Maximum torque for hip in swing phase | 50 | 0-100 [%] |
| 11 | Time for output of maximum torque for hip | 500 | 0-1000 [mS] |
| 12 | Maximum torque for hip in walking | 50 | 0-100 [%] |
| 13 | Hip control range in walking | 90 | 0-90 [deg] |
| 14 | Output in hip assist-OFF state | 1 | 0-10 [%] |

Figure 4:
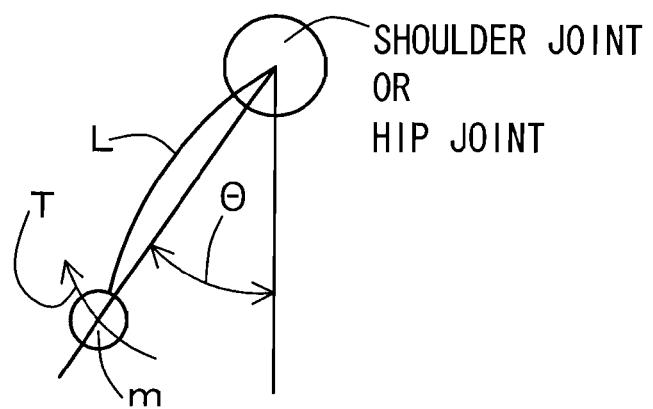
FIG. 4 is a view for explaining calculation of rotation torque T.
Figure 5A:
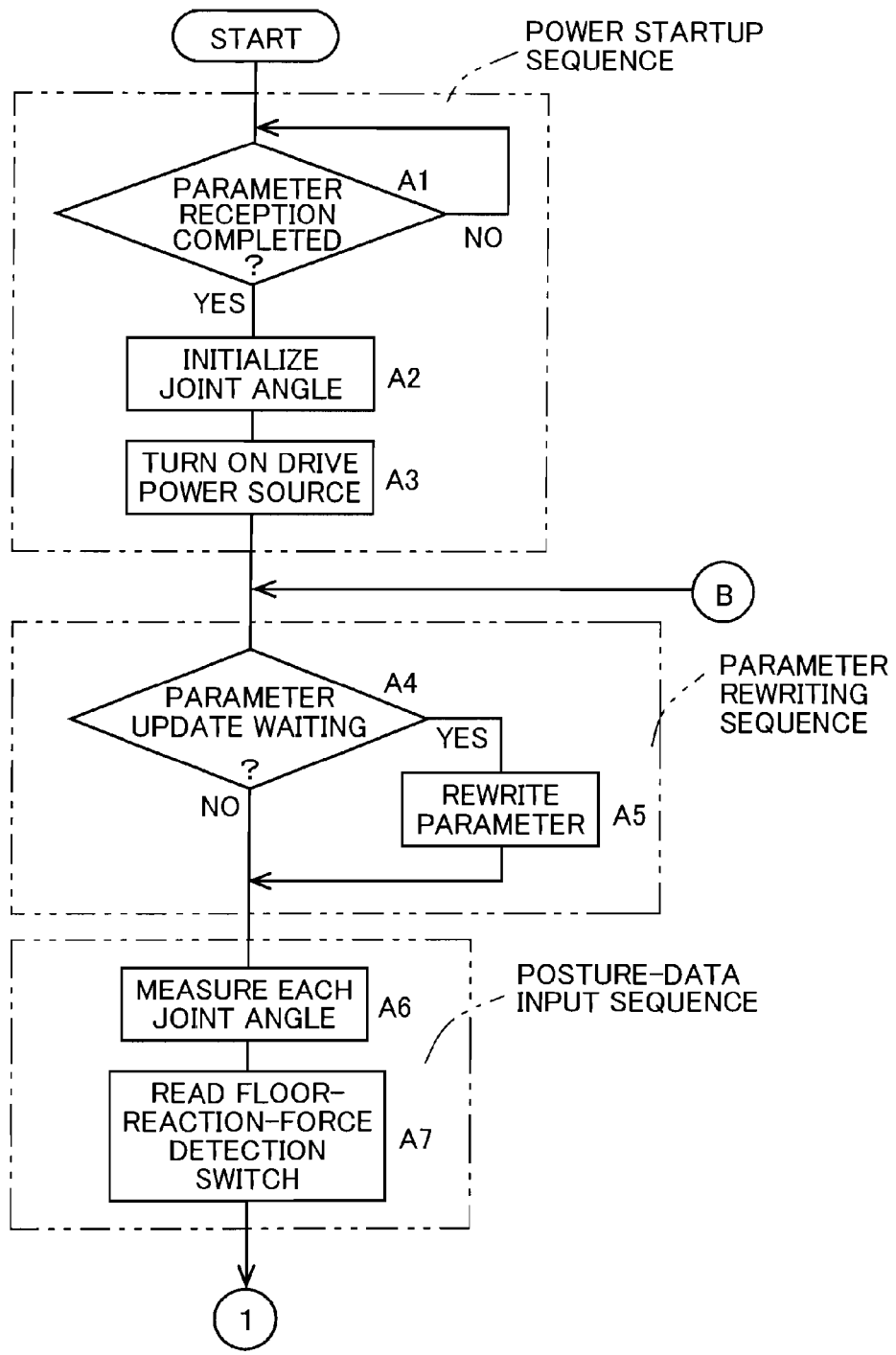
FIGS. 5A and 5B are flow charts showing the procedural steps of a first assist suit control process to be performed by the first light-work assist suit 100.
Figure 5B:
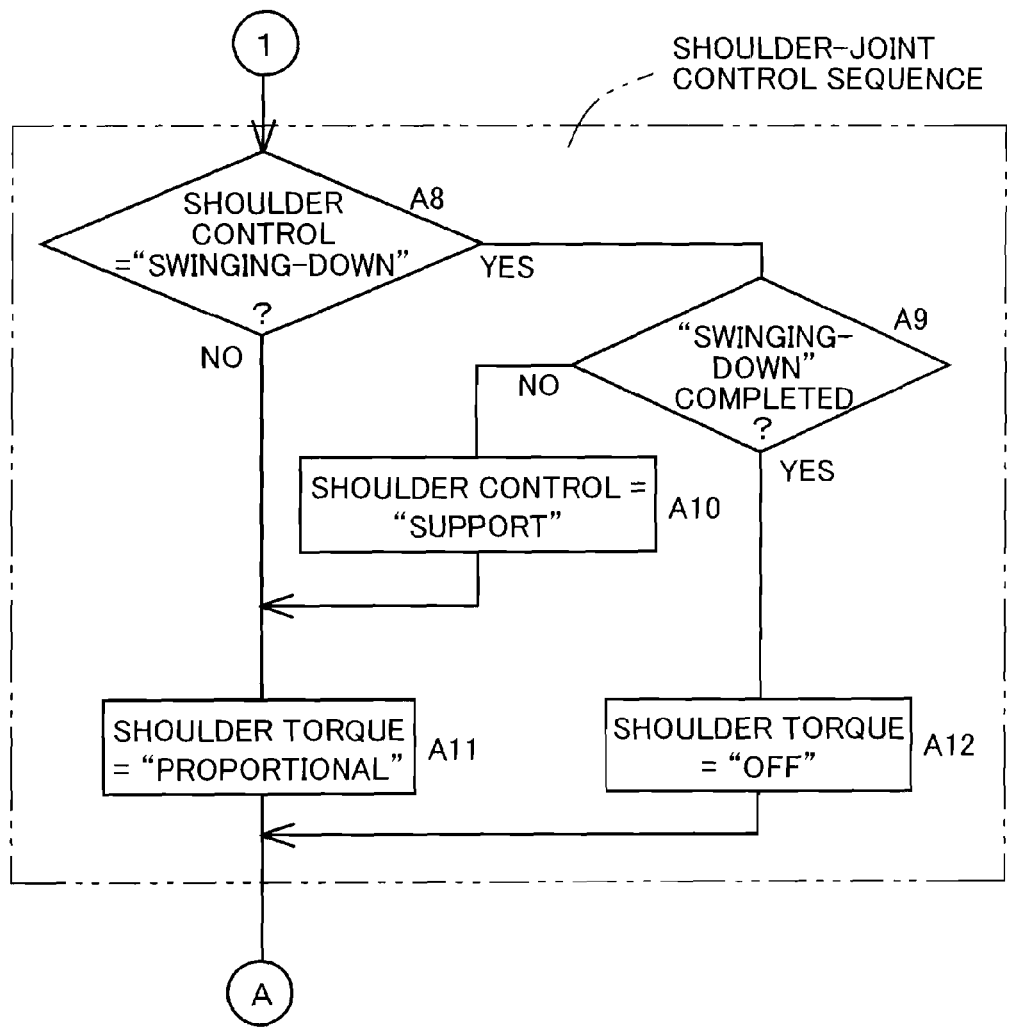

FIG. 4 is a view for explaining calculation of rotation torque T. The control section 132 determines assist torque by dynamically calculating rotation torque T required for the wearer to move his/her body in various working postures based on the measured angles of shoulder joints and hip joints and the conditions of floor-reaction-force switches acting on the toe and the heel of a shoe. The floor-reaction-force switches are the toe floor-reaction-force detection switch 21 and the heel floor-reaction-force detection switch 22.

To begin with, the control section 132 determines an operating angle $\theta$. The operating angle $\theta$ is an angle with respect to a vertical direction. The operating angle $\theta$ refers, where the shoulder joint is concerned, to a joint angle measured by the rotary encoder included in the electric motor 1, and also refers, where the hip joint is concerned, to a joint angle measured by the rotary encoder included in the electric motor 11.

Given that the mass of the arm or thigh is m [kg], and the distance from the rotary shaft of the electric motor 1 to the arm belt 10 or the distance from the rotary shaft of the electric motor 11 to the thigh belt 20 is L [m], then rotation torque T required to assist the weight m can be derived by calculation using the following math formula: $T = Lm \sin\theta$ [N·m], wherein Lm represents a constant which is determined by the wearer. The control section 132 calculates assist torque based on this value set as a parameter. The parameter is set by the wearer through the operation of the handy terminal 50. Moreover, the parameter is not limited to a fixed value, but may be changed in conformity with an action presumed by following procedural steps in a first assist suit control process which will hereafter be described.

FIGS. 5A, 5B, 6A and 6B are flow charts showing the procedural steps of the first assist suit control process to be performed by the first light-work assist suit 100. Upon powering on the first light-work assist suit 100, the control section 132 operates so that the supply of power to the constituent components except the electric motors 1 and 11 is started, thus bringing the suit into motion, and then the procedure proceeds to Step A1.

The first assist suit control process generally comprises five sequences. Steps A1 to A3 belong to a power startup sequence; Steps A4 and A5 belong to a parameter rewriting sequence; Steps A6 and A7 belong to a posture-data input sequence; Steps A8 to A12 belong to a shoulder-joint control sequence; and Steps A13 to A23 belong to a hip-joint control sequence. The control section 132 produces an output of assist torque needed for each joint by running the shoulder-joint control sequence and the hip-joint control sequence.

In Step A1, the control section 132 determines whether the reception of a parameter from the handy terminal 50 has been completed. Following the completion of reception of a parameter from the handy terminal 50, the control section 132 stores the received parameter in the non-illustrated memory section, and permits the procedure to proceed to Step A2. If the reception of a parameter from the handy terminal 50 has not been completed, the procedure returns to Step A1.

In Step A2, the control section 132 performs joint angle initialization. Specifically, the control section 132 defines a joint angle in an upright posture with arms pointing downward in the vertical direction as an initial value, viz. 0 degree. That is, the control section 132 acquires each joint angle in the upright posture with arms pointing downward in the vertical direction from the rotary encoder included in the electric motor 1, 11, and then defines the position of each of the acquired joint angles as a 0-degree angle position of each joint angle.

In Step A3, the control section 132 turns on a drive power source for driving the electric motors 1 and 11 (described as "ON" in the chart). That is, the control section 132 effects control of the battery 133 in a manner so as to start power supply from the battery 133 to the electric motor 1, 11.

In Step A4, the control section 132 waits for parameter updating from the handy terminal 50. The control section 132 operates so that, in the absence of parameter updating from the handy terminal 50, the procedure proceeds to Step A6, whereas, in the presence of parameter updating from the handy terminal 50, the procedure proceeds to Step A5. In Step A5, upon reception of an updated parameter from the handy terminal 50, the control section 132 stores the received updated parameter in the non-illustrated memory section for parameter updating.

Parameters required for assistance are sent from the handy terminal 50 carried by the wearer as occasion arises. Therefore, in the interest of execution of parameter rewriting on a constant basis, rewriting processing in Steps A4 and A5 is performed in a main loop. The main loop is a process for looping up Steps A4 to A23.

In Step A6, the control section 132 measures each joint angle. Specifically, the control section 132 acquires, from each rotary encoder, a joint angle measured by the rotary encoder included in the electric motor 1, 11, the presence or absence of turning motion, and a turning direction. In Step A7, the control section 132 reads switch status from the floor-reaction-force switch. Specifically, the control section 132 acquires, from the toe floor-reaction-force detection switch 21 and the heel floor-reaction-force detection switch 22, the result detected from each of the switches, or equivalently switch status. At this time, the control section 132 acquires hip inclination measured by the triaxial acceleration sensor included in the central control unit 23 from the triaxial acceleration sensor.

Then, the control section 132 calculates static torque exerted on the wearer's arm and thigh based on the acquired joint angles, presence or absence of turning motion, a turning direction, switch status, and hip inclination, and also assesses the conditions of shoulder control, hip control, and walking control. The shoulder control is the control of shoulder joints, and the hip control is the control of hip joints. The shoulder control deals with a swinging-down state and a support state. The hip control deals with a support state, a walking state, and another state different from the above-cited two states. The walking control deals with, so long as the hip control deals with the walking state, a swinging-up start state, a swinging-up state, a swinging-down start state, a swinging-down state, and a swinging completed state. The swinging-up is the act of swinging up the arm about the shoulder joint as a pivotal point, or the act of swinging up the thigh about the hip joint as a pivotal point. The swinging-down is the act of swinging down the arm about the shoulder joint as a pivotal point, or the act of swinging down the thigh about the hip joint as a pivotal point. The support state is a state where the arm or thigh is at rest. The swinging completed state is a state where the swinging-up or swinging-down motion is completed. The control section 132 assesses these control conditions based on the acquired presence or absence of turning motion and a turning direction.

The control of shoulder joints comprises two modes, namely a "swinging-down" mode and a "support" mode. Under normal circumstances, in order to execute assistance to "support" the shoulder joint, in Step A11, an output of assist torque proportional to the joint angle of the shoulder joint is produced.

In Step A8, the control section 132 determines whether the shoulder control deals with "swinging-down". The determination as to "swinging-down" depends on a parameter received from the handy terminal 50. The control section 132 operates so that, when the shoulder control deals with "swinging-down", the procedure proceeds to Step A9, whereas, when the shoulder control does not deal with "swinging-down", the procedure proceeds to Step A11. In Step A9, the control section 132 determines whether "swinging-down" has been completed. The control section 132 operates so that, when "swinging-down" has been completed under the shoulder control, the procedure proceeds to Step A10, whereas, when "swinging-down" has not been completed under the shoulder control, the procedure proceeds to Step A12.

In Step A10, the control section 132 returns the shoulder control to the mode for dealing with "support", and permits the procedure to proceed to Step A11. In Step A11, the control section 132 defines shoulder torque as "proportional", and permits the procedure to proceed to Step A13. In the control section 132, where the shoulder torque is "proportional", in order to impart torque proportional to static torque and rotation torque to the arm, drive torque of the drive of the electric motor 1, viz. assist torque is calculated, and then the control section 132 effects control of the electric motor 1 in a manner so as to operate under the calculated drive torque.

In Step A12, the control section 132 operates so that the shoulder torque is off (described as "OFF" in the chart) to disable shoulder assistance until the swinging-down motion is finished, and the procedure proceeds to Step A13. When the shoulder torque is "off", the control section 132 brings the operation of the electric motor 1 to a halt.

The control of hip joints generally comprises two movement modes, namely a "support" mode and a "walking" mode, and mode selection is made in accordance with information sent from the handy terminal 50. When the "support" mode is selected, that is, when the mode value "1" is sent from the handy terminal 50, then, in order to maintain an upright posture, in Step A19, an output of assist torque proportional to the joint angle of the hip joint is produced. When the "walking" mode is selected, that is, when the mode value "2" is sent from the handy terminal 50, then one step of the walking sequence of "swinging-up start", "during swinging-up", "swinging-down start", and "during swinging-down" is executed. In the walking sequence, "swinging-up start", "during swinging-up", "swinging-down start", and "during swinging-down" are done one after another in the order named, and the sequence comes to an end at the completion of "swinging completed". One of the legs that is not in a swing phase is not swung up, and, for this leg defined as a supported leg, an output of support torque proportional to the joint angle of the hip joint is produced in Step A19.

In Step A13, the control section 132 determines whether the hip control deals with "support". The control section 132 operates so that, when the hip control deals with "support", the procedure proceeds to Step A19, whereas, when the hip control does not deal with "support", the procedure proceeds to Step A14. In Step A14, the control section 132 determines whether the hip control deals with "walking". The control section 132 operates so that, when the hip control deals with "walking", the procedure proceeds to Step A15, whereas, when the hip control does not deal with "walking", the procedure proceeds to Step A19.

In Step A15, the control section 132 determines whether the walking control deals with "swinging-up start". The control section 132 determines "swinging-up start" when the heel floor-reaction-force detection switch 22 is turned off and the angle of the hip joint is small. The control section 132 operates so that, when the walking control deals with "swinging-up start", the procedure proceeds to Step A20, whereas, when the walking control does not deal with "swinging-up start", the procedure proceeds to Step A16. In Step A16, the control section 132 determines whether the walking control deals with "during swinging-up". The control section 132 operates so that, when the walking control deals with "during swinging-up", the procedure proceeds to Step A21, whereas, when the walking control does not deal with "during swinging-up", the procedure proceeds to Step A17.

In Step A17, the control section 132 determines whether the walking control deals with "swinging-down start". The control section 132 determines "swinging-down start" when the joint angle of the hip joint reaches an angle greater than or equal to a predetermined value. The control section 132 operates so that, when the walking control deals with "swinging-down start", the procedure proceeds to Step A22, whereas, when the walking control does not deal with "swinging-down start", the procedure proceeds to Step A18. In Step A18, the control section 132 determines whether the walking control deals with "during swinging-down". The control section 132 operates so that, when the walking control deals with "during swinging-down", the procedure proceeds to Step A22, whereas, when the walking control does not deal with "during swinging-down", the procedure proceeds to Step A23.

In Step A19, the control section 132 defines hip torque as "support proportional", and permits the procedure to return to Step A4. In Step A20, the control section 132 defines the hip torque as "maximum" for outputting short-time maximum assist torque to the electric motor 11 on the swinging-up side, and permits the procedure to return to Step A4. In Step A21, the control section 132 defines the hip torque as "walking proportional" for outputting assist torque proportional to the joint angle of the hip joint to the electric motor 11 on the swinging-up side, and permits the procedure to return to Step A4. In Step A22, the control section 132 operates so that the hip torque is "off", and the procedure returns to Step A4. In Step A23, the control section 132 determines that the walking control deals with "swinging completed", and permits the procedure to return to Step A4.

Steps A4 to A7 are calculation steps. Steps A8 to A23 are driving steps. The control section 132 executes a sequence of Steps A4 to A23, or equivalently a main loop, at 10 millisecond intervals, thereby achieving smooth assistance to the wearer. In the control section 132, among the parameters as listed in Table 1, parameters No. 3 and No. 4 are used in Step A9; parameters No. 5 and No. 6 are used in Step A11; parameter No. 7 is used in Step A12; parameters No. 8 and No. 9 are used in Step A19; parameters No. 10 and No. 11 are used in Step A20; parameters No. 12 and No. 13 are used in Step A21; and parameter No. 14 is used in Step A22.

Figure 7A:
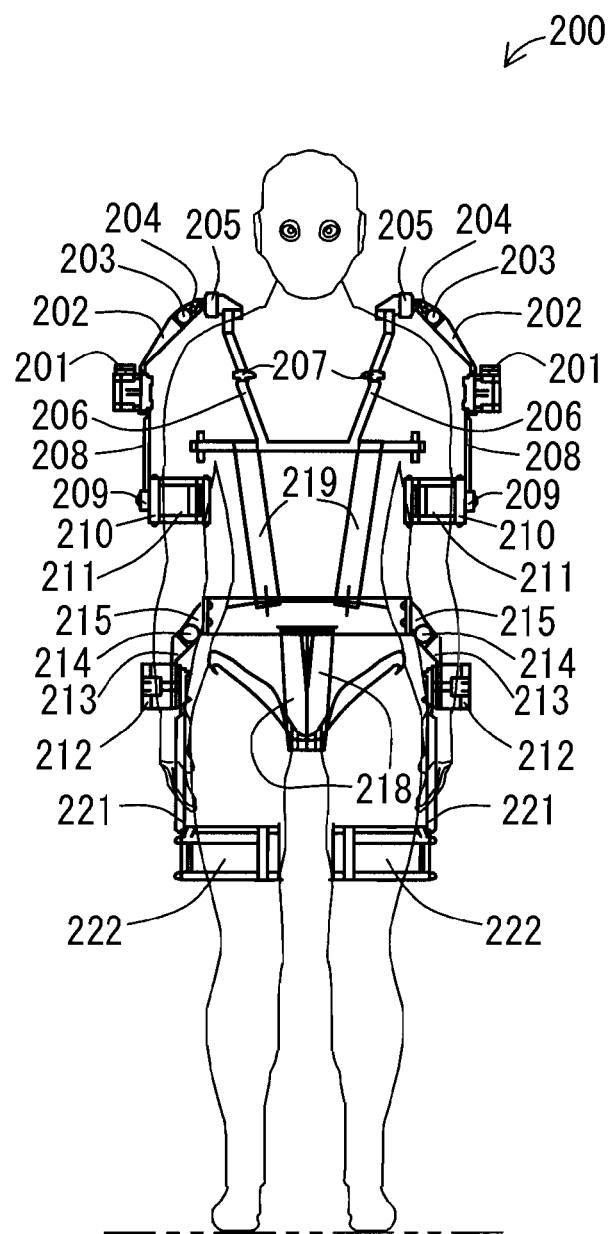
FIG. 7A is a view showing the outer appearance of a second light-work assist suit 200 in accordance with a second embodiment of the invention.
Figure 7B:
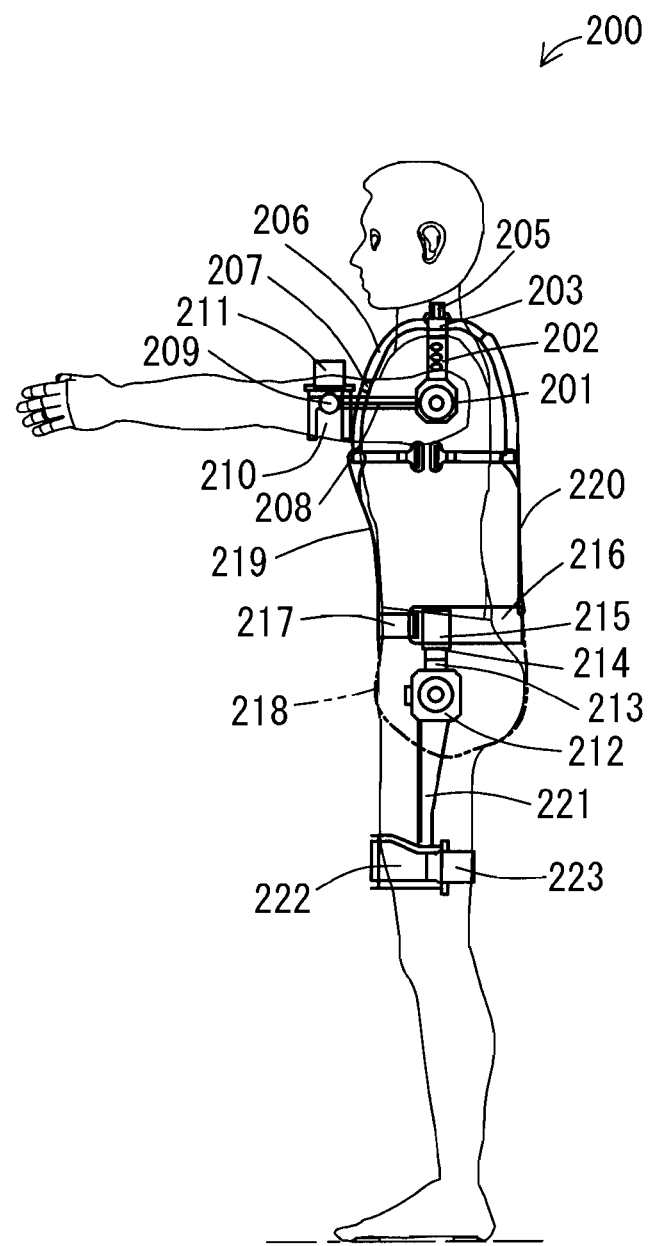
FIG. 7B is a view showing the outer appearance of the second light-work assist suit 200 in accordance with the second embodiment of the invention.

FIGS. 7A and 7B are views showing the outer appearance of a second light-work assist suit 200 in accordance with a second embodiment of the invention. FIG. 7A is a front view showing the outer appearance of the second light-work assist suit 200 worn by the wearer. FIG. 7B is a side view showing the outer appearance of the second light-work assist suit 200 worn by the wearer. A control method pursuant to the invention is practiced by the second light-work assist suit 200.

The second light-work assist suit 200 implemented as a power assist robot apparatus comprises: electric motors 201 and 212; frames 202, 204, 213 and 215; back frames 206 and 216; driven rotary shafts 203, 205, 209 and 214; hinges 207; receiving surfaces 210 and 222; arms 208 and 221; belts 211 and 223; a waist belt 217; crotch belts 218; front belts 219; a back belt 220; toe floor-reaction-force detection switches 21; heel floor-reaction-force detection switches 22; and a central control unit 23. The second light-work assist suit 200 is an assist suit for light work with the electric motor 201 serving as an actuator supported on the upper side of each shoulder. The driven rotary shafts 203, 205 are arm connection portions. The driven rotary shafts 214 are hip connection portions.

The electric motor 201, which is an electric motor used as a power source for shoulder power assistance, and more specifically for assisting shoulder movement, produces power to assist turning motion of the arm about the shoulder joint as a pivotal point. The electric motor 201 is placed at the side of each of the right and left shoulder joints for rotation about the right-left axis in the following fashion.

On the fixed-end side of the electric motor 201 is installed, via the frame 202 extending upward, the driven rotary shaft 203 configured to provide a degree of freedom in turning motion of the shoulder joint about the front-rear axis. The frame 204 coupled to the driven rotary shaft 203 is attached to the upper end of the back frame 206 located near the upper surface of the shoulder joint center, or the central area of the upper surface of each of the right and left shoulders of the wearer, from the right and left sides, via the driven rotary shaft 205 configured to provide a degree of freedom in turning motion of the shoulder joint about the vertical axis. For example, the back frame 206 is shaped like the letter of an inverted π when viewed from the front of the wearer, and is shaped like the letter Y when viewed from the back. On the back frame 206 is installed the hinge 207 conforming to the shape of the wearer's body.

On the rotating-end side of the electric motor 201 is installed the arm 208 extending along the wearer's upper arm. At the front end of the arm 208 is installed, via the driven rotary shaft 209 which is rotatable about the right-left axis, the semi-cylindrical receiving surface 210. On the receiving surface 210 is installed the belt 211. The upper arm of the wearer can be held securely on the receiving surface 210 by the belt 211.

The electric motor 212, which is an electric motor for hip power assistance, and more specifically for assisting hip movement, assists turning motion of the thigh about the hip joint as a pivotal point. The electric motor 212 is placed at the side of each of the right and left hip joints for rotation about the right-left axis in the following fashion.

On the fixed-end side of the electric motor 212 is installed, via the upwardly-extending frame 213, the driven rotary shaft 214 configured to provide a degree of freedom in turning motion of the hip joint about the front-rear axis. The driven rotary shaft 214 is attached, via the frame 215, to each of the right and left sides of the back frame 216 so as to lie at the lateral side of the wearer's waist.

On the back frame 216 is installed the waist belt 217 and the crotch belts 218. The waist belt 217 is placed so as to extend in the right-left direction from the lateral side of the back frame 216 to the wearer's side and from there to each of the right and left front sides, whereas the crotch belt 218 is placed so as to extend from the lower part of the back frame 216 to the crotch region and from there to each of the right and left front sides, so that the back frame can be brought into intimate contact with the wearer. The back frame 216 and the back frame 206 can be coupled to each other by the front belt 219 and the back belt 220 worn by the wearer.

On the rotating-end side of the electric motor 212 is installed the arm 221 protruding along the wearer's thigh. At the front end of the arm 221 is installed the semi-cylindrical receiving surface 222. On the receiving surface 222 is installed the belt 223. The thigh of the wearer can be held securely on the receiving surface 222 by the belt 223.

The configuration of control devices included in the second light-work assist suit 200 and the procedural steps of the second assist suit control process to be performed by the second light-work assist suit 200 are identical with the configuration of control devices included in the first light-work assist suit 100 as shown in FIG. 2 and the procedural steps of the first assist suit control process to be performed by the first light-work assist suit 100 as shown in FIGS. 5A, 5B, 6A and 6B, respectively, and will therefore be not described to avoid overlaps.

Figure 8A:
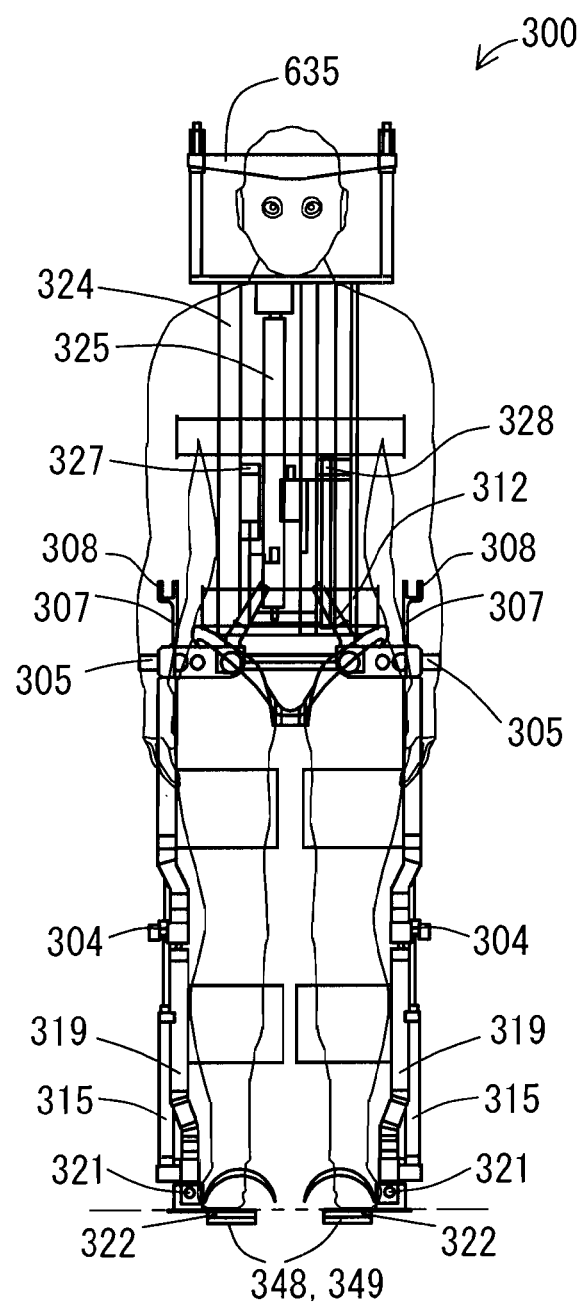
FIG. 8A is a view showing the outer appearance of a first heavy-work assist suit 300 in accordance with a third embodiment of the invention.
Figure 8B:
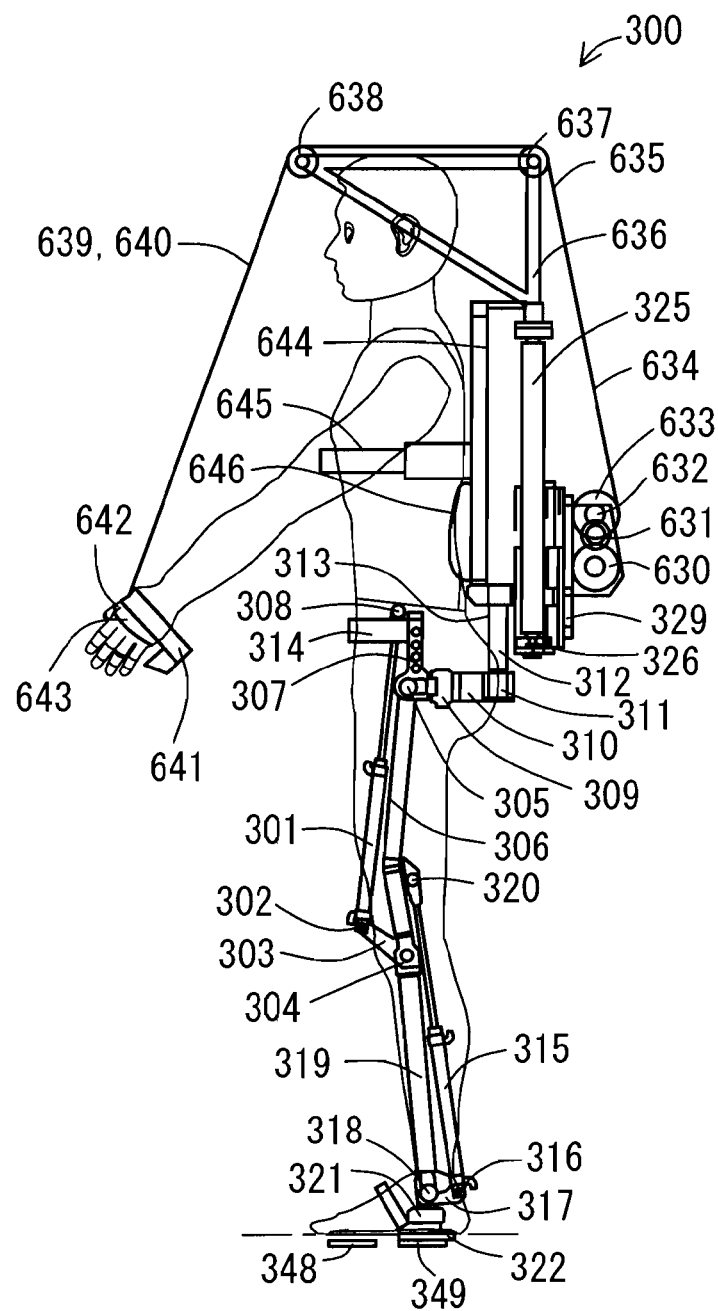
FIG. 8B is a view showing the outer appearance of the first heavy-work assist suit 300 in accordance with the third embodiment of the invention.

FIGS. 8A and 8B are views showing the outer appearance of a first heavy-work assist suit 300 in accordance with a third embodiment of the invention. FIG. 8A is a front view showing the outer appearance of the first heavy-work assist suit 300 worn by the wearer. FIG. 8B is a side view showing the outer appearance of the first heavy-work assist suit 300 worn by the wearer. A control method pursuant to the invention is practiced by the first heavy-work assist suit 300.

The first heavy-work assist suit 300 shown in FIGS. 8A and 8B exemplifies a lifter system-based construction that employs a pneumatic cylinder for power assistance to hip joints and knee joints in legs, and employs a pneumatic artificial rubber muscle for power assistance to upper limbs.

The first heavy-work assist suit 300 implemented as a power assist robot apparatus comprises: pneumatic cylinders 301 and 315; driven rotary shafts 302, 304, 305, 308, 309, 311, 316, 318, 320 and 321; frames 303, 306, 307, 310, 317 and 322; a back frame 312; a waist belt 314; an upper-limb back box 324; an artificial rubber muscle 325; a movement frame 326; linear guides 327 and 328; a rack gear 329; pinion gears 630 to 632; a wire winding sheave 633; wires 634, 639 and 640; a balance plate 635; pulleys 637 and 638; wires 634, 639 and 640; a hook 641; a switch 642; a pair of gloves 643; and a belt 645.

In the first heavy-work assist suit 300, for the purpose of power assistance to hip joints and knee joints, the pneumatic cylinder 301 is placed at the side of each of the right and left hip joints, and the pneumatic cylinder 315 is placed at the side of each of the right and left knee joints.

The pneumatic cylinder 301, which is a pneumatic cylinder used as a power source for hip power assistance, and more specifically for assisting hip movement, produces power to assist turning motion of the thigh about the hip joint as a pivotal point. The pneumatic cylinder 301 is placed at the side of each of the right and left hip joints so as to produce rotation torque around the right-left axis in the following fashion.

The pneumatic cylinder 301 is, at its fixed-end side, attached to the frame 303 via the driven rotary shaft 302 which is rotatable about the right-left axis. The frame 303 is coupled to the driven rotary shaft 304 which is rotatable about the right-left axis with respect to the knee joint center. On the driven rotary shaft 304 is installed the frame 306 coupled to one of the rotating ends of the driven rotary shaft 305 which is rotatable about the right-left axis with respect to the hip joint center. On the other one of the rotating ends of the driven rotary shaft 305 is installed the upwardly-extending frame 307. The moving end of the pneumatic cylinder 301 is coupled to the upper end of the frame 307 via the driven rotary shaft 308 which is rotatable about the right-left axis.

On the other rotating end of the driven rotary shaft 305 is installed, in addition to the upwardly-extending frame 307, the driven rotary shaft 309 configured to provide a degree of freedom in turning motion of the hip joint about the vertical axis. On the back side of the hip joint center, the frame 310 is attached to the lower end of the back frame 312 located near the central area of the wearer's back, from the right and left sides, via the driven rotary shaft 311 configured to provide a degree of freedom in turning motion of the hip joint about the front-rear axis.

The back frame 312, which is a back fitting portion, is quadrangular-shaped, for example. On the back frame 312 is installed a cushion pad 313 conforming to the shape of the wearer's back. Moreover, on the back frame 312 is installed the waist belt 314. The waist belt 314 is placed so as to extend in the right-left direction from the upper part of the back frame 312 to the wearer's side, so that the back frame can be brought into intimate contact with the wearer.

The pneumatic cylinder 315, which is a pneumatic cylinder used as a power source for knee power assistance, and more specifically for assisting knee movement, produces power to assist turning motion of the lower leg about the knee joint as a pivotal point. The pneumatic cylinder 315 is placed at the side of each of the right and left knees so as to produce rotation torque around the right-left axis in the following fashion.

The pneumatic cylinder 315 is, at its fixed-end side, attached to the frame 317 via the driven rotary shaft 316 which is rotatable about the right-left axis. The frame 317 is coupled to one of the rotating ends of the driven rotary shaft 318 which is rotatable about the right-left axis with respect to the ankle joint center, and is equipped with the frame 319 coupled to one of the rotating ends of the driven rotary shaft 304 which is rotatable about the right-left axis with respect to the knee joint center. On the other one of the rotating ends of the driven rotary shaft 304 is installed the frame 306 coupled to the driven rotary shaft 305. The moving end of the pneumatic cylinder 315 is coupled to a part of the frame 306 which lies above the knee joint center via the driven rotary shaft 320 which is rotatable about the right-left axis.

On the other one of the rotating ends of the driven rotary shaft 318 is installed one of the rotating ends of the driven rotary shaft 321 configured to provide a degree of freedom in turning motion of the ankle joint about the front-rear axis. The other one of the rotating ends of the driven rotary shaft 321 is placed at the shoe sole via the frame 322.

Moreover, the first heavy-work assist suit 300 includes a lifter device for power assistance for the lifting of heavy objects. The lifter device (hereafter also referred to as "lifter") is installed in the upper-limb back box 324 attached to the back frame 312 for wearer's leg via a rotary shaft which is rotatable about the vertical axis.

The fixed end of the artificial rubber muscle 325 is coupled to the upper part of the upper-limb back box 324. The artificial rubber muscle 325 is a pneumatic artificial rubber muscle. The movement frame 326 is connected to the moving end of the artificial rubber muscle 325. The linear guides 327 and 328 are attached to the opposite ends, respectively, of the movement frame 326. The linear guides 327 and 328 assist expansion and contraction of the artificial rubber muscle 325. On the linear guide 328 is installed the rack gear 329.

The rack gear 329 is in engagement with the pinion gear 630. The expanding and contracting motion of the artificial rubber muscle 325 is transmitted to the pinion gear 630 through the rack gear 329, so that the expanding and contracting motion can be converted into a rotating motion. The pinion gear 630 is in engagement with the pinion gear 631 and the pinion gear 632. In order to achieve a five-fold increase in the stroke of the artificial rubber muscle 325, the gear ratio and the direction of rotation are determined in a manner such that, as the pinion gear 630 makes one turn, the pinion gear 632 is caused to make five turns, via the pinion gear 631, in the same direction as the turning direction of the pinion gear 630.

The pinion gear 632 is connected with the wire winding sheave 633. The wire winding sheave 633 is designed to take up the wire 634. On the moving end of the wire 634 is installed the balance plate 635. On the right edge of the balance plate 635 is installed the right-hand wire 639, and on the left edge of the balance plate 635 is installed the left-hand wire 640.

The right-hand wire 639 and the left-hand wire 640 are passed from the wearer's back to front through the pulley 637 and the pulley 638 which are attached to the frame 636, respectively. On the right-hand wire 639 and the left-hand wire 640 is installed the glove 643 equipped with the hook 641 and the startup switch 642. The wearer is able to lift up and down a load by going through a step of wearing the gloves 643, a step of putting the load on the hook 641, and a step of operating the startup switch 642 to set the artificial rubber muscle 625 in motion, so that the wire winding sheave 633 is caused to turn to take up the wire 634.

The upper-limb back box 324 is connected to a back frame 644. On the back frame 644 is installed a cushion 646 conforming to the shape of the wearer's back. Moreover, on the back frame 644 is installed the belt 645 to be placed so as to extend in the right-left direction from the back frame 644 to the wearer's side, so that the back frame can be brought into intimate contact with the wearer.

In this way, the upper part of the upper-limb back box 324 is connected with the fixed end of the artificial rubber muscle 325. At the moving end of the artificial rubber muscle 325, the expanding and contracting motion of the artificial rubber muscle 325 is converted into a rotating motion through the rack gear 329 and the pinion gears 630 to 632. The speed ratio between the input side and the output side of the pinion gears 630 to 632 is set at a five-fold level to achieve a five-fold increase in the stroke of the artificial rubber muscle 329. The wire 639, 640 is passed from the upper part of the upper-limb back box 324 to a guide portion situated above each of the right and left shoulders, and from there to the front of the wearer. The guide portion is composed of the frame 636, the pulley 637, and the pulley 638. On the end of the wire 639, 640 is installed the hook 641 for holding a heavy object and the switch 642. The wearer is able to lift up and down a load by putting the load on the hook 641 and then pressing the switch 642.

Figure 9:
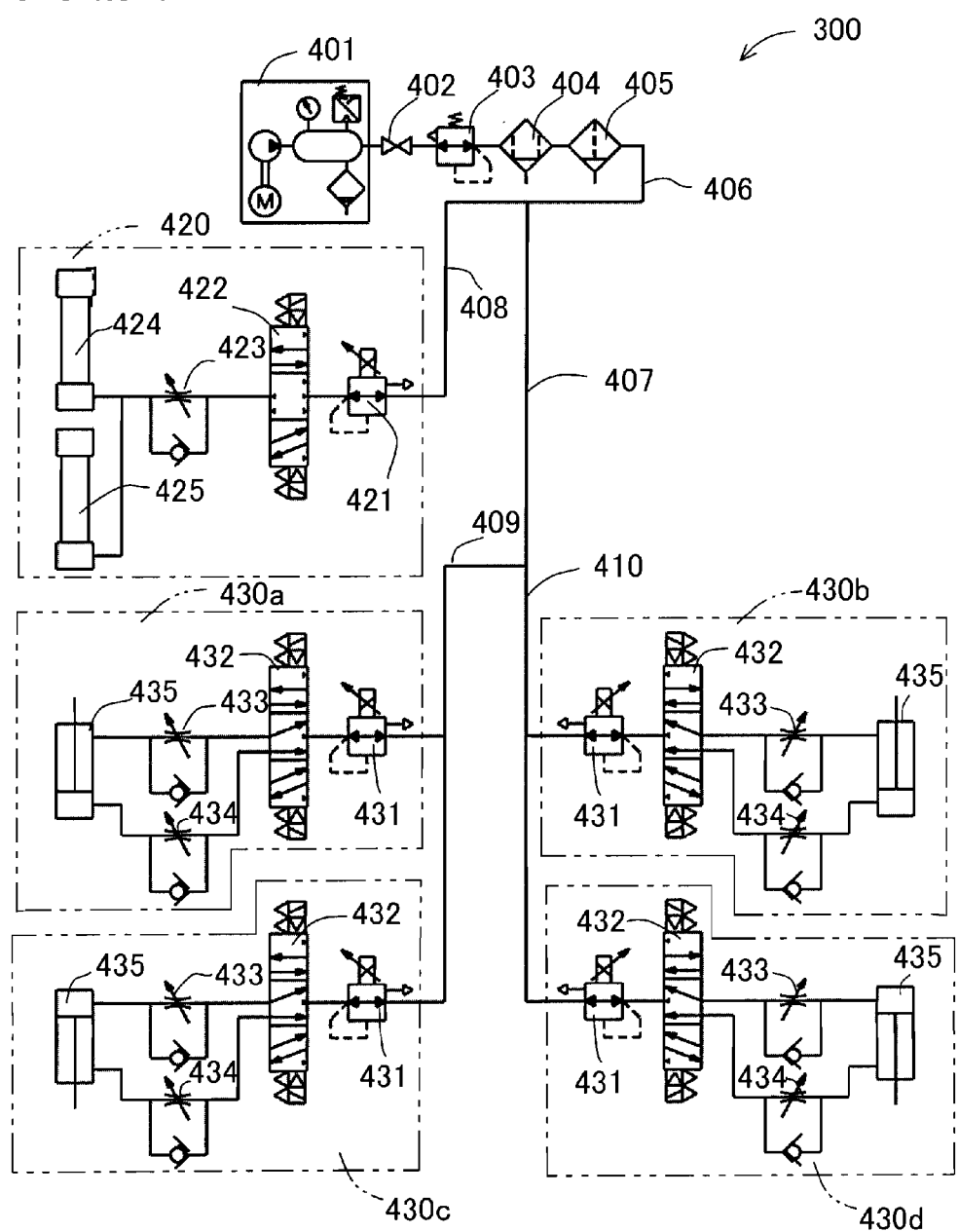
FIG. 9 is a diagram showing the configuration of pneumatic drive devices included in the first heavy-work assist suit 300.

FIG. 9 is a diagram showing the configuration of pneumatic drive devices included in the first heavy-work assist suit 300. The pneumatic drive devices included in the first heavy-work assist suit 300 include a compressor 401, an open/close valve 402, a regulator 403, an air filter 404, a mist separator 405, a main flow path 406, a lower-limb flow path 407, an upper-limb flow path 408, a left lower-limb flow path 409, a right lower-limb flow path 410, an upper-limb pneumatic circuit section 420, a lower-limb left waist joint pneumatic circuit 430a, a lower-limb right waist joint pneumatic circuit 430b, a lower-limb left knee joint pneumatic circuit 430c, and a lower-limb right knee joint pneumatic circuit 430d.

Air that has been compressed by the floor-mounted compressor 401 (hereafter referred to as "compressed air") is caused to flow into the regulator 403 by opening the open/close valve 402, is adjusted to a proper level in respect of its pressure by the regulator 403, is cleaned up by the air filter 404 and the mist separator 405, and is delivered to the main flow path 406. The main flow path 406 is branched into the upper-limb flow path 408 and the lower-limb flow path 407.

Compressed air delivered to the upper-limb flow path 408 flows into the upper-limb pneumatic circuit section 420. The upper-limb pneumatic circuit section 420 comprises: an upper-limb electropneumatic regulator 421; an upper-limb electromagnetic valve 422; an upper-limb flow-rate control valve 423; and upper-limb actuators 424 and 425. The upper-limb actuators 424 and 425 are each formed of the artificial rubber muscle 325, for example.

The compressed air that has flowed from the upper-limb flow path 408 into the upper-limb pneumatic circuit section 420 is adjusted in respect of its air pressure to a level commensurate with a thrust required for a load to be lifted by the upper-limb electropneumatic regulator 421. The flow path taken by the pressure-adjusted compressed air is switched to the lifting side or the lowering side by the upper-limb electromagnetic valve 422. After the flow-path switching, the compressed air is subjected to flow rate control by the upper-limb flow-rate control valve 423, and is whereafter delivered to the upper-limb actuator 424, 425, thereby driving the upper-limb actuator 424, 425, viz. the artificial rubber muscle 325.

Compressed air delivered to the lower-limb flow path 407 is divided into two; one for the left lower-limb flow path 409 and one for the right lower-limb flow path 410. The compressed air delivered to the left lower-limb flow path 409 is delivered to the lower-limb left waist joint pneumatic circuit 430a and the lower-limb left knee joint pneumatic circuit 430c. The lower-limb left waist joint pneumatic circuit 430a is a pneumatic circuit for assisting the movement of a left waist joint, and more specifically for driving the pneumatic cylinder 301 located on the left side of the left thigh. The lower-limb left waist joint pneumatic circuit 430a comprises: a lower-limb joint electropneumatic regulator 431; a lower-limb joint electromagnetic valve 432; a lower-limb joint stretching-side flow-rate control valve 433; a lower-limb joint bending-side flow-rate control valve 434; and a lower-limb joint actuator 435.

The compressed air delivered to the lower-limb left waist joint pneumatic circuit 430a is adjusted in respect of its air pressure to a level commensurate with a thrust required for joint movement by the lower-limb joint electropneumatic regulator 431. The flow path taken by the pressure-adjusted compressed air is switched to the joint stretching side or the joint bending side by the lower-limb joint electromagnetic valve 432. After the flow-path switching, the compressed air is subjected to flow rate control by the lower-limb joint stretching-side flow-rate control valve 433 or the lower-limb joint bending-side flow-rate control valve 434, and is whereafter delivered to the lower-limb joint actuator 435, thereby driving the lower-limb joint actuator 435, viz. the pneumatic cylinder 301.

The lower-limb left knee joint pneumatic circuit 430c is a pneumatic circuit for assisting the movement of a left knee joint, and more specifically for driving the pneumatic cylinder 315 located on the left side of the left lower leg. The lower-limb left knee joint pneumatic circuit 430c is structurally identical with the lower-limb left waist joint pneumatic circuit 430a, and will therefore be not described to avoid overlaps.

The compressed air delivered to the right lower-limb flow path 410 is delivered to the lower-limb right waist joint pneumatic circuit 430b and the lower-limb right knee joint pneumatic circuit 430d. The lower-limb right waist joint pneumatic circuit 430b is a pneumatic circuit for assisting the movement of a right waist joint, and more specifically for driving the pneumatic cylinder 301 located on the left side of the right thigh. The lower-limb right knee joint pneumatic circuit 430d is a pneumatic circuit for assisting the movement of a right knee joint, and more specifically for driving the pneumatic cylinder 315 located on the right side of the right lower leg. The lower-limb right waist joint pneumatic circuit 430b and the lower-limb right knee joint pneumatic circuit 430d are structurally identical with the lower-limb left waist joint pneumatic circuit 430a, and will therefore be not described to avoid overlaps.

The lower-limb joint actuator 435 included in the lower-limb left waist joint pneumatic circuit 430a is the pneumatic cylinder 301 located on the left side of the left thigh. The lower-limb joint actuator 435 included in the lower-limb left knee joint pneumatic circuit 430c is the pneumatic cylinder 301 located on the left side of the left lower leg. The lower-limb joint actuator 435 included in the lower-limb right waist joint pneumatic circuit 430b is the pneumatic cylinder 301 located on the right side of the right thigh. The lower-limb joint actuator 435 included in the lower-limb right knee joint pneumatic circuit 430d is the pneumatic cylinder 301 located on the right side of the right lower leg.

Figure 10A:
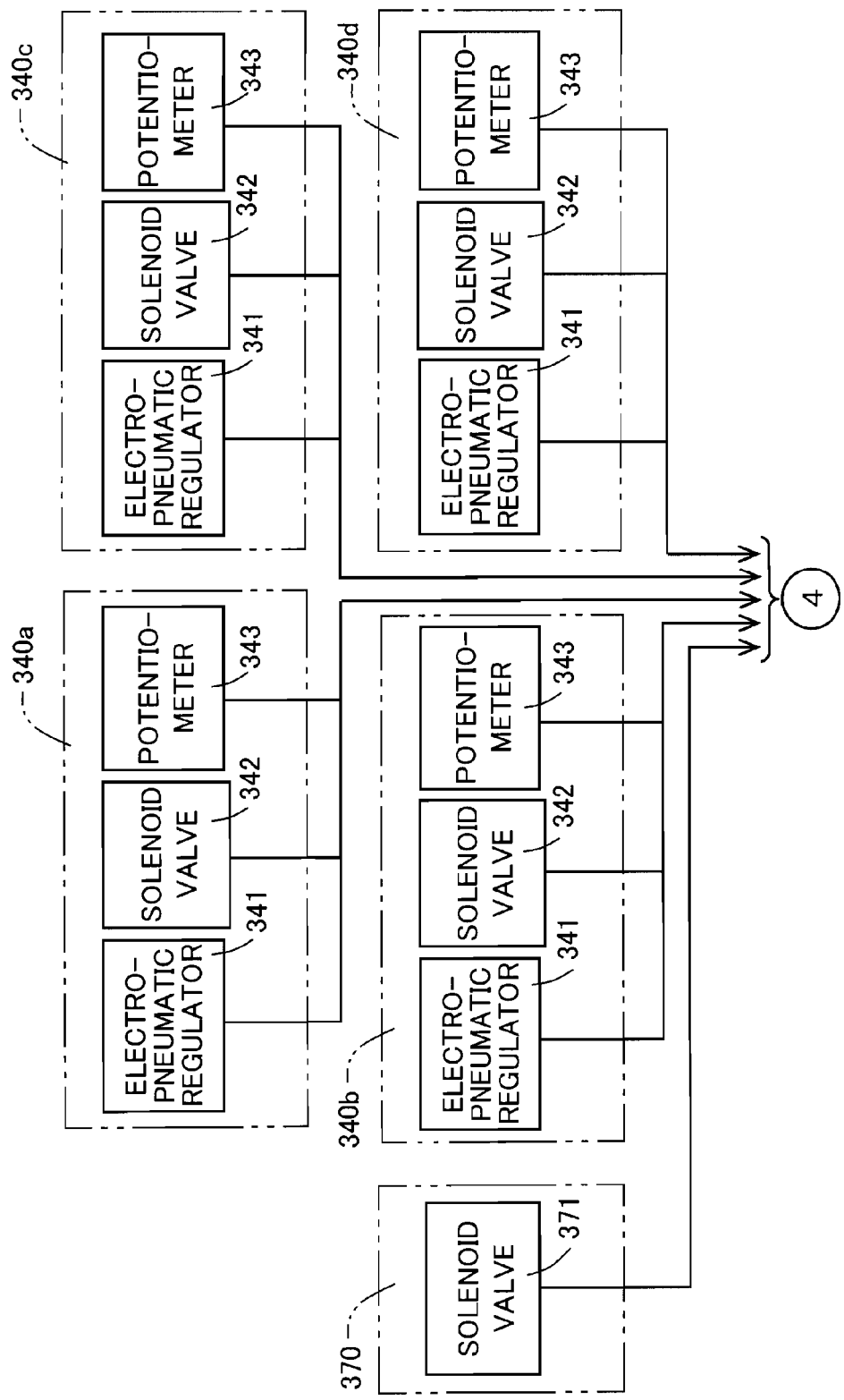
FIGS. 10A and 10B are diagrams showing the configuration of control devices included in the first heavy-work assist suit 300.
Figure 10B:
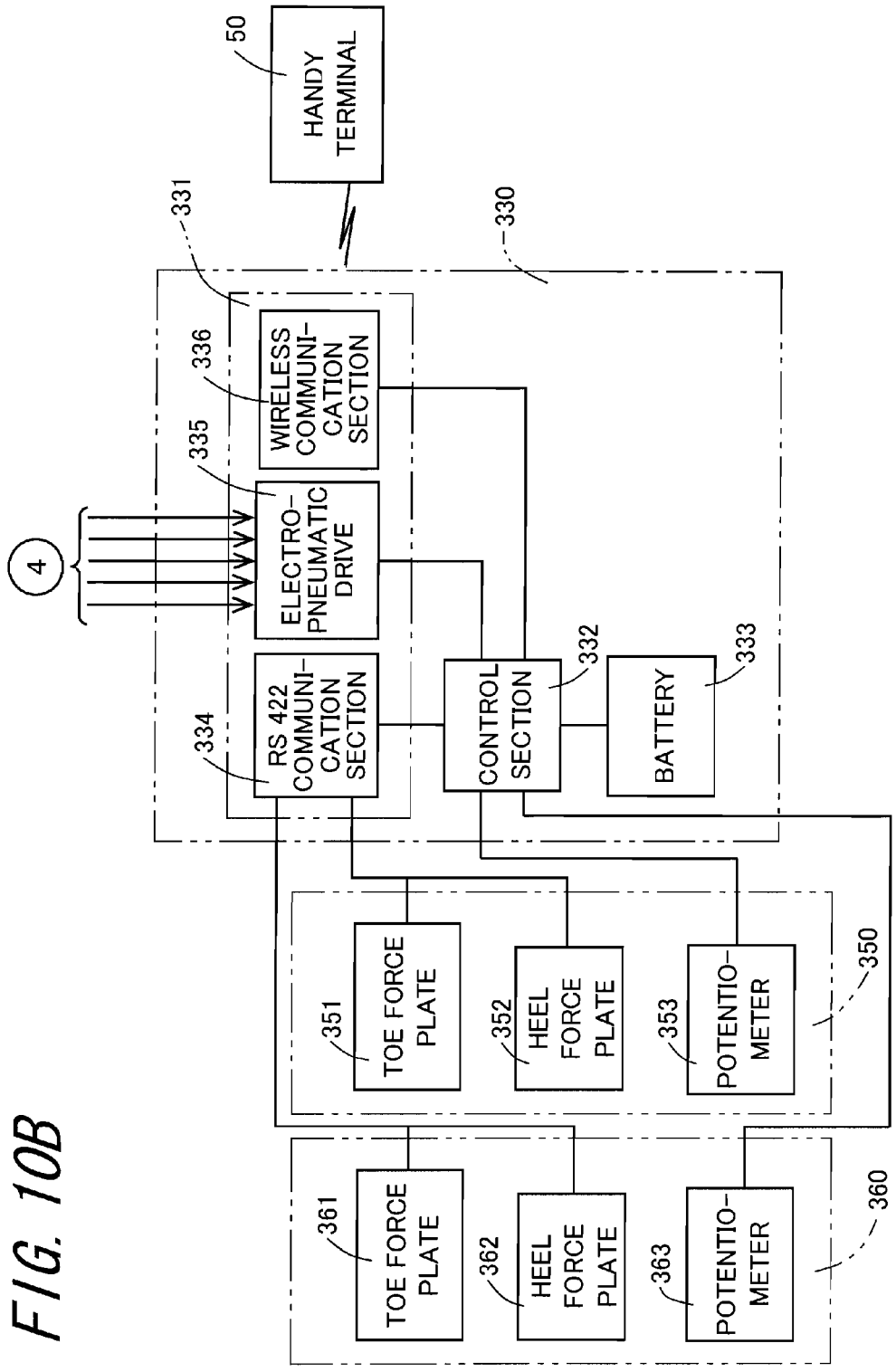
Figure 11A:
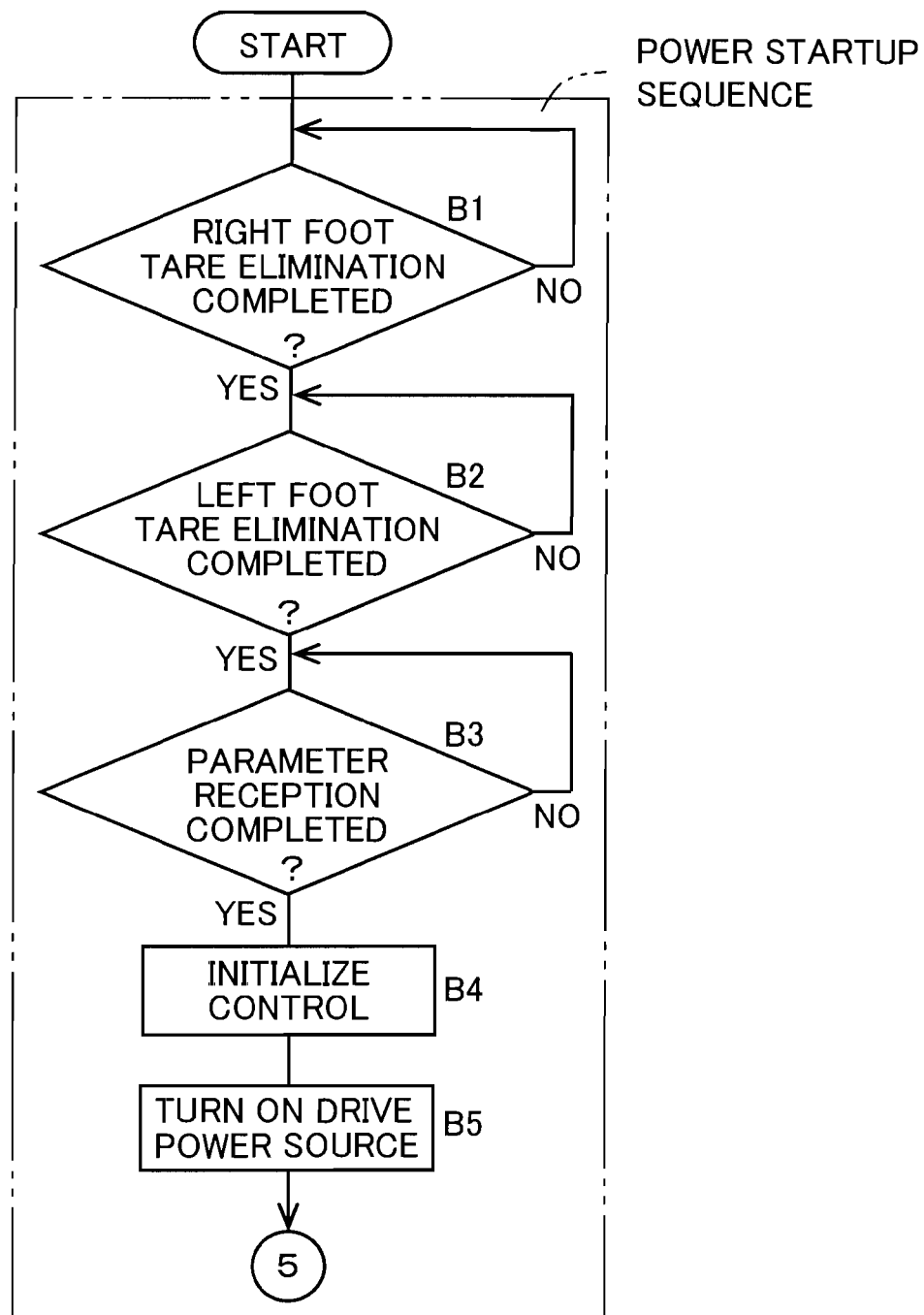
FIGS. 11A and 11B are flow charts showing the procedural steps of a third assist suit control process to be performed by the first heavy-work assist suit 300.
Figure 11B:
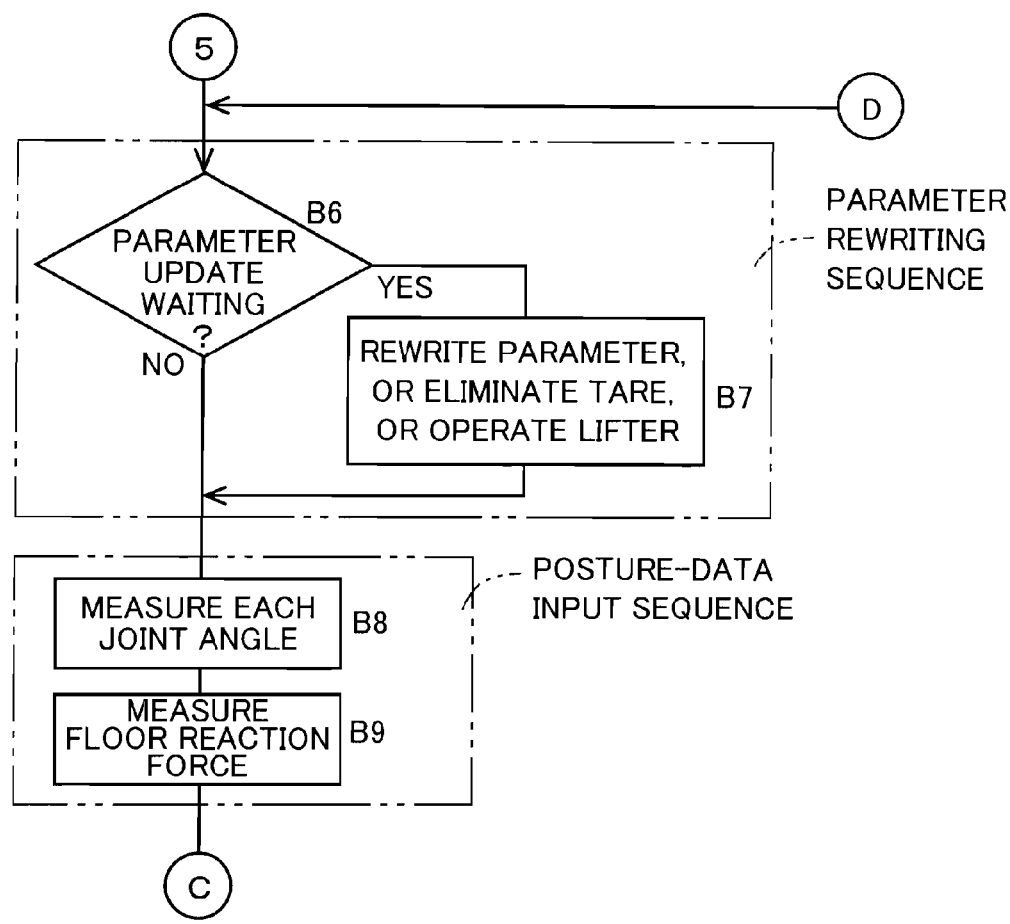
Figure 12A:
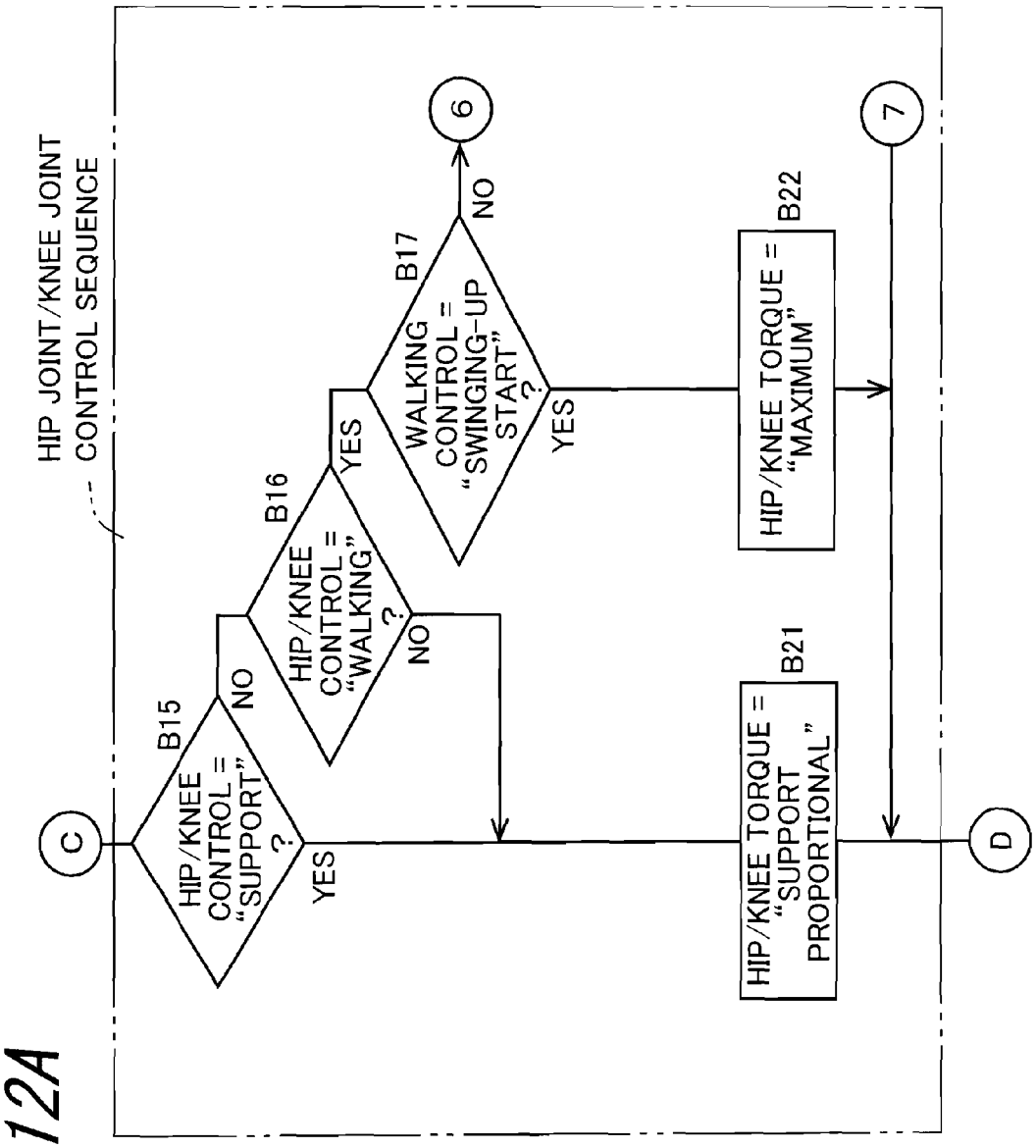
FIGS. 12A and 12B are flow charts showing the procedural steps of the third assist suit control process to be performed by the first heavy-work assist suit 300.
Figure 12B:
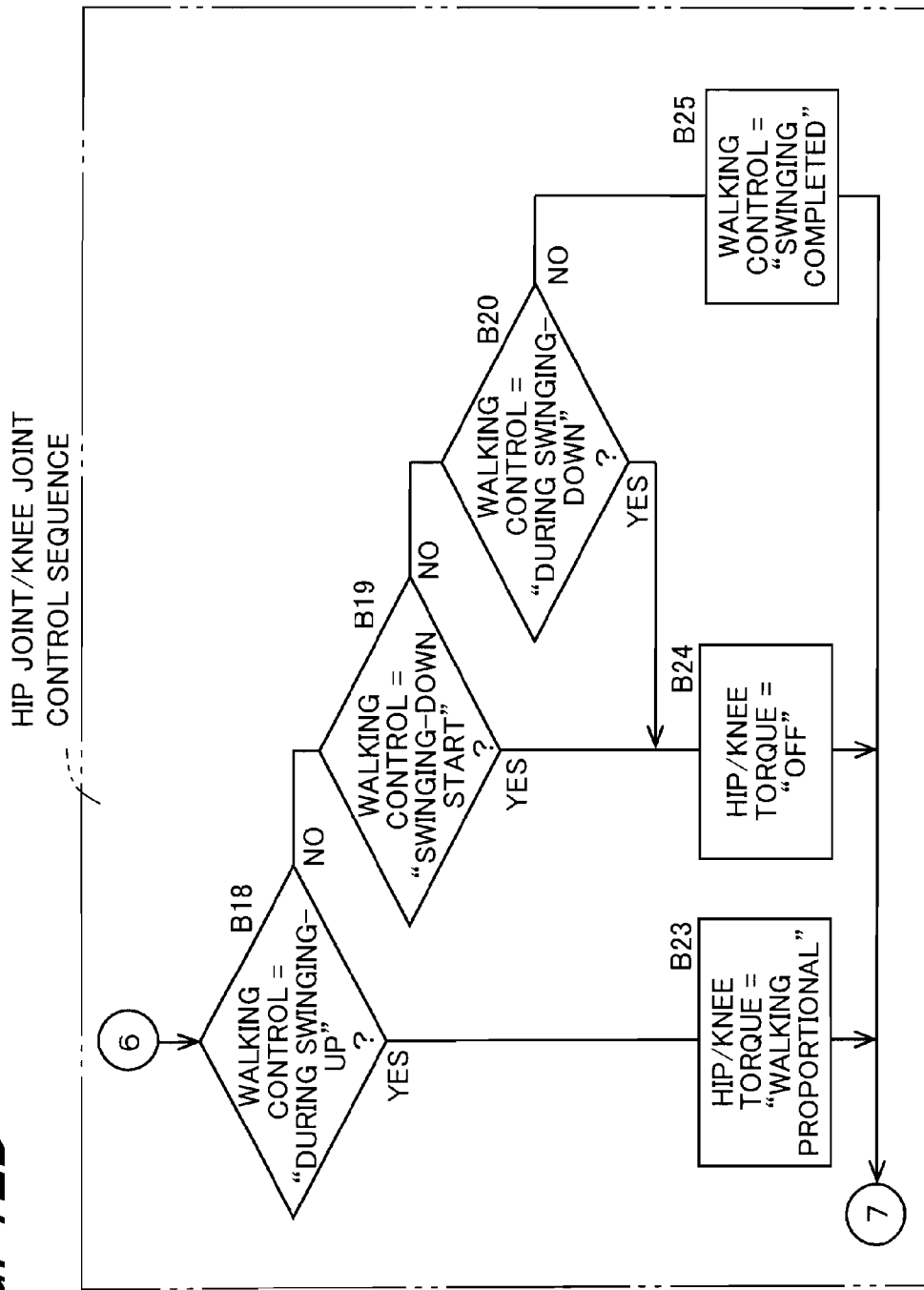

FIGS. 10A and 10B are diagrams showing the configuration of control devices included in the first heavy-work assist suit 300. The control devices included in the first heavy-work assist suit 300 include a central control unit 330, a right-sole unit 350, a left-sole unit 360, joint units 340a to 340d, a lifter unit 370, and a handy terminal 50.

The central control unit 330 comprises: a control section 332; a battery 333; an RS 422 communication section 334; an electropneumatic drive 335; and a wireless communication section 336. The battery 333 is a rechargeable storage battery for supplying power to all of the units. The control section 332, which is constructed for example of CPU, controls the RS 422 communication section 334, the electropneumatic drive 335, and the wireless communication section 336. The electropneumatic drive 335 is wire-connected to each of the joint units 340a to 340d and the lifter unit 370. The control section 332 sends an output torque command required for assistance to each of the joint units 340a to 340d and the lifter unit 370. The joint units 340a to 340d send their respective output torque information to the control section 332.

The joint unit 340a controls the pneumatic cylinder 301 located on the left side of the left thigh. The joint unit 340b controls the pneumatic cylinder 301 located on the right side of the right thigh. The joint unit 340c controls the pneumatic cylinder 315 located on the left side of the left lower leg. The joint unit 340d controls the pneumatic cylinder 315 located on the left side of the right lower leg.

Each of the joint units 340a to 340d comprises: an electropneumatic regulator 341; a solenoid valve 342; and a potentiometer 343. The potentiometer 343 measures the joint angle of each joint. The electropneumatic regulator 41 effects air pressure control in accordance with assist conditions, and, the determination as to an output direction, either the bending direction or the stretching direction, is made by the solenoid valve 42, and the result of determination is outputted to the pneumatic actuator, viz. the pneumatic cylinder 301, 315.

The right-sole unit 350 comprises: a toe force plate 351; a heel force plate 352; and a potentiometer 353. The toe force plate 351 measures a floor reaction force, to be specific, a weight exerted on the toe. The heel force plate 352 measures a floor reaction force exerted on the heel. The toe force plate 351 and the heel force plate 352 transmit the measured weight to the control section 332 by way of RS 422 communication. The potentiometer 353 measures the joint angle of the ankle joint, and sends the result of measurement directly to the control section 332.

The left-sole unit 360 is structurally identical with the right-sole unit 350. That is, a toe force plate 361, a heel force plate 362, and a potentiometer 363 are identical with the toe force plate 351, the heel force plate 352, and the potentiometer 353, respectively, and will therefore be not described to avoid overlaps.

The handy terminal 50 is structurally identical with the handy terminal 50 as shown in FIG. 3. However, the handy terminal 50 of the third embodiment is used to effect raising and lowering operation of the lifter. Specifically, the wearer is able to operate the lifter manually by setting parameter No at "1" in the handy terminal 50. The lifter is moved upward by depressing an incrementing switch 52, and is moved downward by depressing a decrementing switch 53.

Parameters that can be set in the handy terminal 50 of the third embodiment are listed in Table 2.

TABLE 2

| Parameter No | Meaning | Initial value | Range of values |
|---|---|---|---|
| 0 | Force plate initialization [Inc]: eliminate right foot tare; [Dec]: eliminate left foot tare | | |
| 1 | Lifter operation [Inc]: UP; [Dec]: DOWN; [Ent]: OFF | | |
| 2 | Lifted load | 30 | 1-30 [kg] |
| 3 | Parameter storage area: Parameters corresponding to 10 persons in total can be stored | 1 | 1-10 |
| 4 | Shoulder swinging-down judgment angle | 4 | 1-10 [deg] |
| 5 | Maximum torque for shoulder/elbow | 50 | 0-100 [%] |
| 6 | Shoulder/elbow control range | 90 | 0-90 [deg] |
| 7 | Output in shoulder/elbow assist-OFF state | 1 | 0-10 [%] |
| 8 | Maximum torque for hip/knee in support state | 50 | 0-100 [%] |
| 9 | Hip/knee control range | 90 | 0-90 [deg] |
| 10 | Maximum torque for hip/knee in swing phase | 50 | 0-100 [%] |
| 11 | Time for output of maximum torque for hip/knee | 500 | 0-1000 [mS] |
| 12 | Maximum torque for hip/knee in walking | 50 | 0-100 [%] |
| 13 | Hip/knee control range in walking | 90 | 0-90 [deg] |
| 14 | Output in hip/knee assist-OFF state | 1 | 0-10 [%] |

The lifter unit 370 includes a solenoid valve 371. The solenoid valve 371 produces, based on whether the lifter is raised or lowered, an output of air pressure adjusted in accordance with assist conditions to the pneumatic actuator, viz. the artificial rubber muscle 325.

FIGS. 11A, 11B, 12A and 12B are flow charts showing the procedural steps of the third assist suit control process to be performed by the first heavy-work assist suit 300. Upon powering on the first heavy-work assist suit 300, the control section 332 operates so that the supply of power to the constituent components except the pneumatic cylinders 301 and 315 and the artificial rubber muscle 325 is started, thus bringing the suit into motion, and then the procedure proceeds to Step B1.

The third assist suit control process generally comprises four sequences. Steps B1 to B5 belong to a power startup sequence; Steps B6 and B7 belong to a parameter rewriting sequence; Steps B8 and B9 belong to a posture-data input sequence; and Steps B15 to B25 belong to a hip-joint/knee-joint control sequence. The control section 332 produces an output of assist torque needed for each joint by running the hip-joint/knee-joint control sequence.

In Step B1, the control section 332 determines whether the elimination of the tare of the right foot has been completed. The right-foot tare refers to a part of the weights of the wearer standing in an upright posture without carrying any load and the first heavy-work assist suit 300 which is loaded on the right foot of the wearer. The left-foot tare refers to a part of the weights of the wearer standing in an upright posture without carrying any load and the first heavy-work assist suit 300 which is loaded on the left foot of the wearer. The control section 332 effects tare elimination by bringing a weight measured by the right-sole unit 350 and the left-sole unit 360 under a condition where the wearer stands in an upright posture without carrying any load into correspondence with the fact that the load weight is "0". The tare elimination can be achieved by setting parameter No at "0" in the handy terminal 50.

The control section 332 operates so that, when the elimination of the right-foot tare has been completed, the procedure proceeds to Step B2, whereas, when the elimination of the right-foot tare has not been completed, the procedure returns to Step B1. In Step B2, the control section 332 determines whether the elimination of the tare of the left foot has been completed. The control section 332 operates so that, when the elimination of the left-foot tare has been completed, the procedure proceeds to Step B3, whereas, when the elimination of the left-foot tare has not been completed, the procedure returns to Step B2. Step B3 and Step B6 are identical with Step A1 and Step A4 as shown in FIG. 5, respectively, and will therefore be not described to avoid overlaps.

In Step B4, the control section 332 performs control initialization. Specifically, just as with Step A2 shown in FIG. 5, the control section 332 defines a joint angle in an upright posture with arms pointing downward in the vertical direction as an initial value, viz. 0 degree. That is, the control section 132 acquires each joint angle in the upright posture with arms pointing downward in the vertical direction from the potentiometer 343 included in each of the joint units 340*a* to 340*d*, the potentiometer 353 included in the right-sole unit 350, and the potentiometer 363 included in the left-sole unit 360, and then defines the position of each of the acquired joint angles as a 0-degree angle position of each joint angle.

In Step B5, the control section 332 turns on a drive power source for driving the pneumatic cylinders 301, 315 and the artificial rubber muscle 325. That is, the control section 332 effects control of the battery 333 in a manner so as to start power supply from the battery 333 to the pneumatic cylinder 301, 315 and the artificial rubber muscle 325.

In Step B7, upon reception of an updated parameter from the handy terminal 50, the control section 332 stores the received updated parameter in the non-illustrated memory section for parameter updating. Alternatively, the control section 332 effects tare elimination. In another alternative, it effects lifter operation. That is, the control section 332 controls the lifter in response to the instruction from the handy terminal 50.

In Step B8, the control section 332 measures each joint angle. Specifically, the control section 332 acquires joint angles measured by the potentiometer 343 included in each of the joint units 340*a* to 340*d*, the potentiometer 353 included in the right-sole unit 350, and the potentiometer 363 included in the left-sole unit 360, the presence or absence of turning motion, and a turning direction, from each of the potentiometers 343, 353 and 363. In Step B9, the control section 332 reads switch status from a floor-reaction-force switch. Specifically, the control section 332 acquires, from a toe floor-reaction-force detection switch 348 and a heel floor-reaction-force detection switch 349, the result detected from each of the switches, or equivalently measured weight. At this time, the control section 332 acquires hip inclination measured by a triaxial acceleration sensor included in the central control unit from the triaxial acceleration sensor.

Then, the control section 332 calculates static torque exerted on the wearer's thigh and lower leg based on the acquired joint angles, presence or absence of turning motion, a turning direction, weight, and hip inclination, and also assesses the conditions of hip/knee control and walking control.

Steps B15 to B25 correspond to Steps A13 to A23 as shown in FIGS. 6A and 6B, respectively, except that the former are associated with hip/knee control and hip/knee torque in place of hip control and hip torque, and will therefore be not described to avoid overlaps. The control section 332 executes a sequence of Steps B6 to B25, or equivalently a main loop, at 10 millisecond intervals, thereby achieving smooth assistance to the wearer.

In the control section 332, among the parameters as listed in Table 1, parameters No. 8 and No. 9 are used in Step B21; parameters No. 10 and No. 11 are used in Step B22; parameters No. 12 and No. 13 are used in Step B23; and parameter No. 14 is used in Step B24.

Figure 13A:
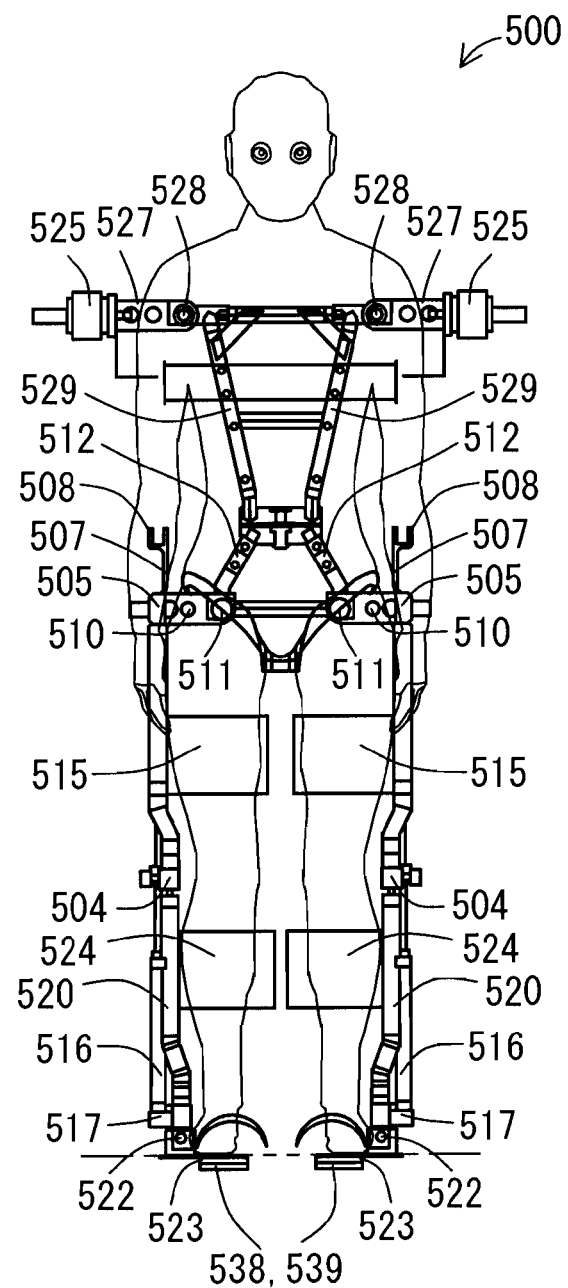
FIG. 13A is a view showing the outer appearance of a second heavy-work assist suit 500 in accordance with a fourth embodiment of the invention.
Figure 13B:
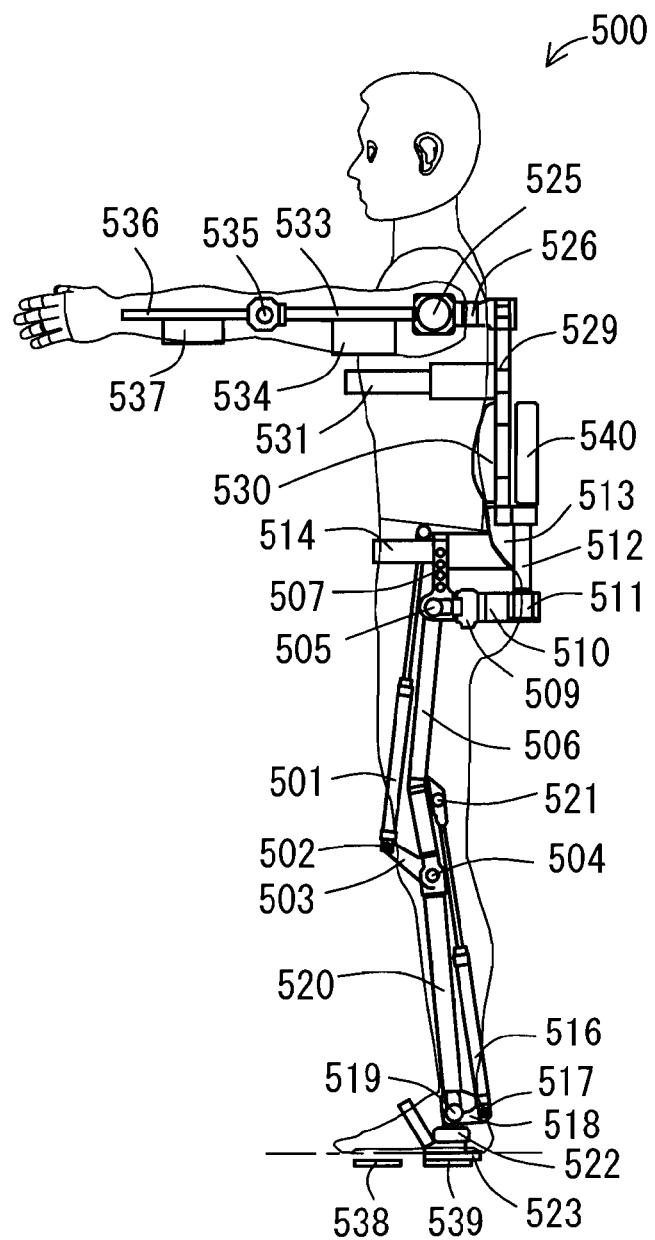
FIG. 13B is a view showing the outer appearance of the second heavy-work assist suit 500 in accordance with the fourth embodiment of the invention.

FIGS. 13A and 13B are views showing the outer appearance of a second heavy-work assist suit 500 in accordance with a fourth embodiment of the invention. FIG. 13A is a front view showing the outer appearance of the second heavy-work assist suit 500 worn by the wearer. FIG. 13B is a side view showing the outer appearance of the second heavy-work assist suit 500 worn by the wearer. A control method pursuant to the invention is practiced by the second heavy-work assist suit 500.

The second heavy-work assist suit 500 shown in FIGS. 13A and 13B exemplifies a construction that employs a pneumatic cylinder for power assistance to hip joints and knee joints in lower limbs, and employs a pneumatic rotary actuator for power assistance to shoulder joints and elbow joints in upper limbs.

The second heavy-work assist suit 500 implemented as a power assist robot apparatus comprises: pneumatic cylinders 501 and 516; driven rotary shafts 502, 504, 505, 508, 509, 511, 517, 519, 521, 522, 526, 528 and 532; frames 503, 506, 507, 510, 518, 520, 523 and 527; back frames 512 and 529; a waist belt 514; a thigh belt 515; a lower-leg belt 524; pneumatic rotary actuators 525 and 535; a chest belt 531; arms 533 and 536; an upper-arm belt 534; and a forearm belt 537.

The back frames 512 and 529 are back fitting portions. The frame 506 is a thigh fitting portion. The frame 520 is a lower leg fitting portion. The frame 523 is a shoe sole fitting portion. The driven rotary shaft 505 is a hip connection portion. The driven rotary shaft 504 is a knee connection portion. The driven rotary shaft 519 is an ankle connection portion. The driven rotary shaft 508 is a first connection portion. The driven rotary shaft 502 is a second connection portion. The driven rotary shaft 521 is a third connection portion. The driven rotary shaft 517 is a fourth connection portion.

In the second heavy-work assist suit 500, for the purpose of power assistance to hip joints and knee joints, the pneumatic cylinder 501 is placed at the side of each of the right and left hip joints, and the pneumatic cylinder 516 is placed at the side of each of the right and left knee joints.

The pneumatic cylinder 501, which is a pneumatic cylinder for hip power assistance, and more specifically for assisting hip movement, assists turning motion of the thigh about the hip joint as a pivotal point. The pneumatic cylinder 501 is placed at the side of each of the right and left hip joints so as to produce rotation torque around the right-left axis in the following fashion.

The pneumatic cylinder 501 is, at its fixed-end side, attached to the frame 503 via the driven rotary shaft 502 which is rotatable about the right-left axis. The frame 503 is coupled to the driven rotary shaft 504 which is rotatable about the right-left axis with respect to the knee joint center. On the driven rotary shaft 504 is installed the frame 506 coupled to one of the rotating ends of the driven rotary shaft 505 which is rotatable about the right-left axis with respect to the hip joint center. On the other one of the rotating ends of the driven rotary shaft 505 is installed the upwardly-extending frame 507. The moving end of the pneumatic cylinder 501 is coupled to the upper end of the frame 507 via the driven rotary shaft 508 which is rotatable about the right-left axis.

On the other rotating end of the driven rotary shaft 505 is installed, in addition to the upwardly-extending frame 507, the driven rotary shaft 509 configured to provide a degree of freedom in turning motion of the hip joint about the vertical axis. On the back side of the hip joint center, the frame 510 is attached to the lower end of the back frame 512 located near the central area of the wearer's back, from the right and left sides, via the driven rotary shaft 511 configured to provide a degree of freedom in turning motion of the hip joint about the front-rear axis.

The back frame 512 is quadrangular-shaped, for example. On the back frame 512 is installed a cushion pad 513 conforming to the shape of the wearer's back. Moreover, on the back frame 512 is installed the waist belt 514. The waist belt 514 is placed so as to extend in the right-left direction from the upper part of the back frame 512 to the wearer's side, so that the back frame can be brought into intimate contact with the wearer. On the frame 506 is installed the thigh belt 515 for fastening the frame 506 to the wearer's thigh.

The pneumatic cylinder 516, which is a pneumatic cylinder for knee power assistance, and more specifically for assisting knee movement, assists turning motion of the lower leg about the knee joint as a pivotal point. The pneumatic cylinder 516 is placed at the side of each of the right and left knees so as to produce rotation torque around the right-left axis in the following fashion.

The pneumatic cylinder 516 is, at its fixed-end side, attached to the frame 518 via the driven rotary shaft 517 which is rotatable about the right-left axis. The frame 518 is coupled to one of the rotating ends of the driven rotary shaft 519 which is rotatable about the right-left axis with respect to the ankle joint center, and is equipped with the frame 520 coupled to one of the rotating ends of the driven rotary shaft 504. On the other one of the rotating ends of the driven rotary shaft 504 is installed the frame 506 coupled to the driven rotary shaft 505. The moving end of the pneumatic cylinder 516 is coupled to a part of the frame 506 which lies above the knee joint center via the driven rotary shaft 521 which is rotatable about the right-left axis.

On the other one of the rotating ends of the driven rotary shaft 519 is installed one of the rotating ends of the driven rotary shaft 522 configured to provide a degree of freedom in turning motion of the ankle joint about the front-rear axis. The other one of the rotating ends of the driven rotary shaft 522 is placed at the shoe sole via the frame 523. On the frame 520 is installed the lower-leg belt 524 for fastening the frame 520 to the wearer's lower leg.

Moreover, in the second heavy-work assist suit 500, for the purpose of power assistance to shoulder joints and elbow joints, the pneumatic rotary actuator 525, 535 is placed at the side of each of the right and left shoulder joints, as well as at the side of each of the right and left elbow joints.

The pneumatic rotary actuator 525, which is a pneumatic cylinder used as a power source for shoulder power assistance, and more specifically for assisting shoulder movement, produces power to assist turning motion of the upper arm about the shoulder joint as a pivotal point. The pneumatic rotary actuator 525 is placed at the side of each of the right and left shoulder joints in the following fashion.

On the fixed-end side of the pneumatic rotary actuator 525 is installed the driven rotary shaft 526 configured to provide a degree of freedom in turning motion of the shoulder joint about the vertical axis. The frame 527 coupled to the driven rotary shaft 526 is attached to the upper end of the back frame 529 located near the central area of the wearer's back, from the right and left sides, via the driven rotary shaft 528 configured to provide a degree of freedom in turning motion of the shoulder joint about the front-rear axis.

The back frame 529 is quadrangular-shaped, for example. On the back frame 529 is installed a cushion pad 530 conforming to the shape of the wearer's back. On the back frame 529 is installed the chest belt 531. The chest belt 531 is placed so as to extend in the right-left direction from the vertical midportion of the back frame 529 to the wearer's side and from there to the front, so that the back frame can be brought into intimate contact with the wearer. The lower part of the back frame 529 serving as a portion for the upper body is coupled to the upper part of the back frame 512 serving as a portion for the lower limb via the driven rotary shaft 532 which is rotatable about the vertical axis.

On the rotating-end side of the pneumatic rotary actuator 525 is installed the arm 533 extending along the wearer's upper arm. On the arm 533 is installed the upper-arm belt 534 for fastening the arm 533 to the upper arm. At the front end of the arm 533 is disposed the fixed end of the pneumatic rotary actuator 535 for elbow power assistance. At the rotating end of the pneumatic rotary actuator 535 is installed the arm 536 extending along the wearer's forearm. On the arm 536 is installed the forearm belt 537 for fastening the arm 536 to the forearm.

Figure 14:
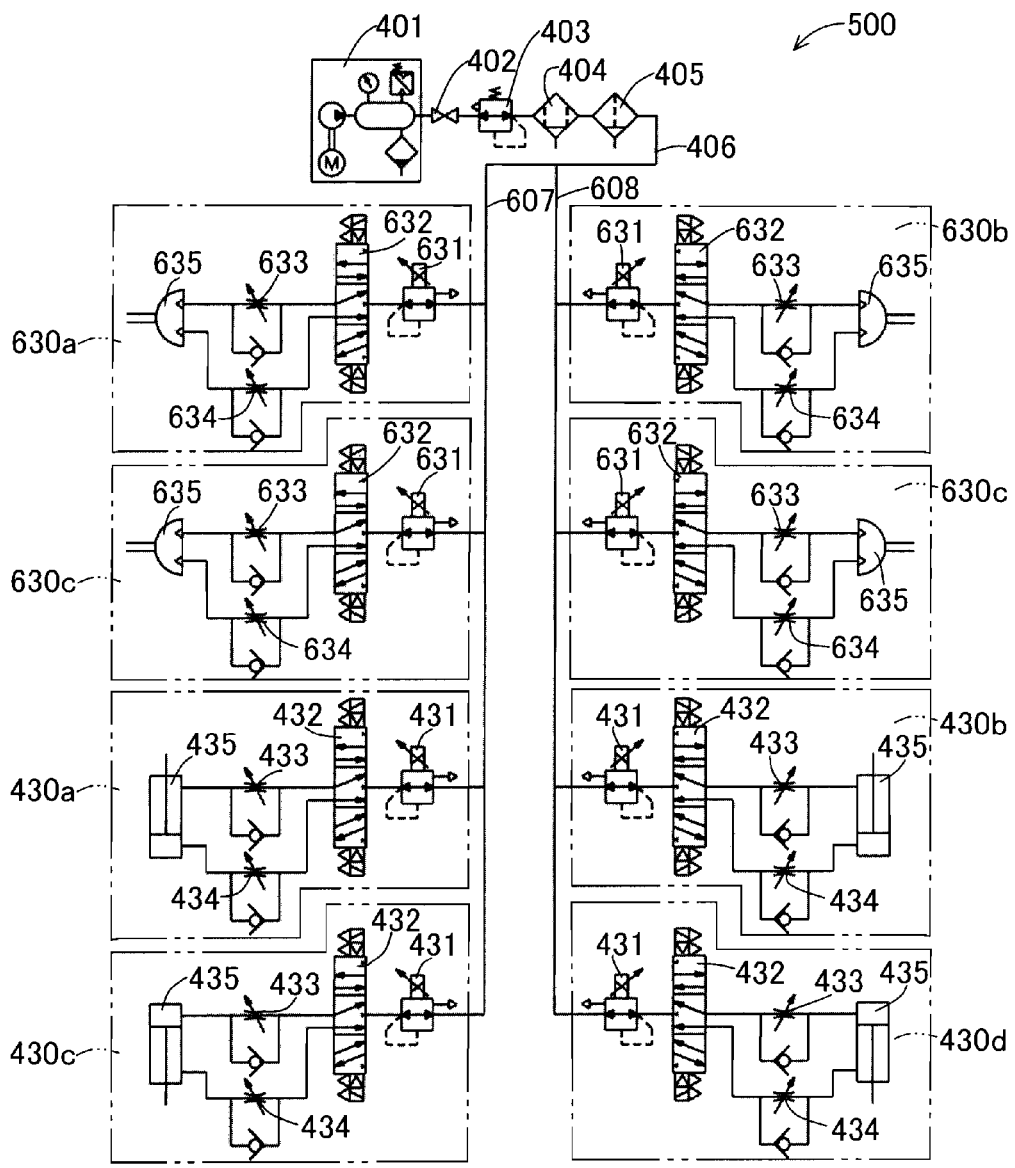
FIG. 14 is a diagram showing the configuration of pneumatic drive devices included in the second heavy-work assist suit 500.

FIG. 14 is a diagram showing the configuration of pneumatic drive devices included in the second heavy-work assist suit 500. The pneumatic drive devices included in the second heavy-work assist suit 500 include a compressor 401, an open/close valve 402, a regulator 403, an air filter 404, a mist separator 405, a main flow path 406, a flow path for body's left side 607, a flow path for body's right side 608, an upper-limb left shoulder joint pneumatic circuit section 630*a*, an upper-limb right shoulder joint pneumatic circuit section 630*b*, an upper-limb left elbow joint pneumatic circuit section 630*c*, an upper-limb right elbow joint pneumatic circuit section 630*d*, a lower-limb left waist joint pneumatic circuit 430*a*, a lower-limb right waist joint pneumatic circuit 430*b*, a lower-limb left knee joint pneumatic circuit 430*c*, and a lower-limb right knee joint pneumatic circuit 430*d*.

Compressed air, viz. air that has been compressed by the floor-mounted compressor 401 is caused to flow into the regulator 403 by opening the open/close valve 402, is adjusted to a proper level in respect of its pressure by the regulator 403, is cleaned up by the air filter 404 and the mist separator 405, and is delivered to the main flow path 406. The main flow path 406 is branched into the flow path for body's left side 607 and the flow path for body's right side 608.

The compressed air delivered to the flow path for body's left side 607 is, at first, delivered to the upper-limb left shoulder joint pneumatic circuit section 630*a* and the upper-limb left elbow joint pneumatic circuit section 630*c*. The upper-limb left shoulder joint pneumatic circuit section 630*a* is a pneumatic circuit for assisting the movement of a left shoulder joint, and more specifically for driving the pneumatic rotary actuator 525 located on the left side of the left shoulder. The upper-limb left shoulder joint pneumatic circuit section 630*a* comprises: an upper-limb joint electropneumatic regulator 631; an upper-limb joint electromagnetic valve 632; an upper-limb joint bending-side flow-rate control valve 633; an upper-limb joint stretching-side flow-rate control valve 634; and an upper-limb joint rotary actuator 635.

The compressed air delivered to the upper-limb left shoulder joint pneumatic circuit section 630*a* is adjusted in respect of its air pressure to a level commensurate with a torque required for a load to be lifted by the upper-limb joint electropneumatic regulator 631. The flow path taken by the pressure-adjusted compressed air is switched to the shoulder- or elbow-joint stretching side, as well as bending side, by the upper-limb joint electromagnetic valve 632. After the flow-path switching, the compressed air is subjected to flow rate control by the upper-limb joint bending-side flow-rate control valve 633 or the upper-limb joint stretching-side flow-rate control valve 634, and is whereafter delivered to the upper-limb joint rotary actuator 635, thereby driving the upper-limb joint rotary actuator 635, viz. the pneumatic rotary actuator 525.

The upper-limb left elbow joint pneumatic circuit section 630*c* is a pneumatic circuit for assisting the movement of a left elbow joint, and more specifically for driving the pneumatic rotary actuator 535 located near the left elbow. The upper-limb left elbow joint pneumatic circuit section 630*c* is structurally identical with the upper-limb left shoulder joint pneumatic circuit section 630*a*, and will therefore be not described to avoid overlaps.

The compressed air delivered to the flow path for body's right side 608 is delivered to the upper-limb right shoulder joint pneumatic circuit section 630*b* and the upper-limb right elbow joint pneumatic circuit section 630*d*. The upper-limb right shoulder joint pneumatic circuit section 630*b* is a pneumatic circuit for providing assistance to the movement of a right shoulder joint, and more specifically for driving the pneumatic rotary actuator 525 located on the right side of the left shoulder. The upper-limb right elbow joint pneumatic circuit section 630*d* is a pneumatic circuit for assisting the movement of a right elbow joint, and more specifically for driving the pneumatic rotary actuator 535 located near the right elbow.

The upper-limb right shoulder joint pneumatic circuit section 630*b* and the upper-limb right elbow joint pneumatic circuit section 630*d* are structurally identical with the upper-limb left shoulder joint pneumatic circuit section 630*a*, and will therefore be not described to avoid overlaps. Moreover, the lower-limb left waist joint pneumatic circuit 430*a*, the lower-limb right waist joint pneumatic circuit 430*b*, the lower-limb left knee joint pneumatic circuit 430*c*, and the lower-limb right knee joint pneumatic circuit 430*d* are structurally identical with the lower-limb left waist joint pneumatic circuit 430*a*, the lower-limb right waist joint pneumatic circuit 430*b*, the lower-limb left knee joint pneumatic circuit 430*c*, and the lower-limb right knee joint pneumatic circuit 430*d* as shown in FIG. 9, respectively, and will therefore be not described to avoid overlaps.

The upper-limb joint rotary actuator 635 included in the upper-limb left shoulder joint pneumatic circuit section 630*a* is the pneumatic rotary actuator 525 located on the left side of the left shoulder. The upper-limb joint rotary actuator 635 included in the upper-limb left elbow joint pneumatic circuit section 630*c* is the pneumatic rotary actuator 535 located near the left elbow. The upper-limb joint rotary actuator 635 included in the upper-limb right shoulder joint pneumatic circuit section 630*b* is the pneumatic rotary actuator 525 located on the right side of the right shoulder. The upper-limb joint rotary actuator 635 included in the upper-limb right elbow joint pneumatic circuit section 630*d* is the pneumatic rotary actuator 535 located near the right elbow.

Figure 15A:
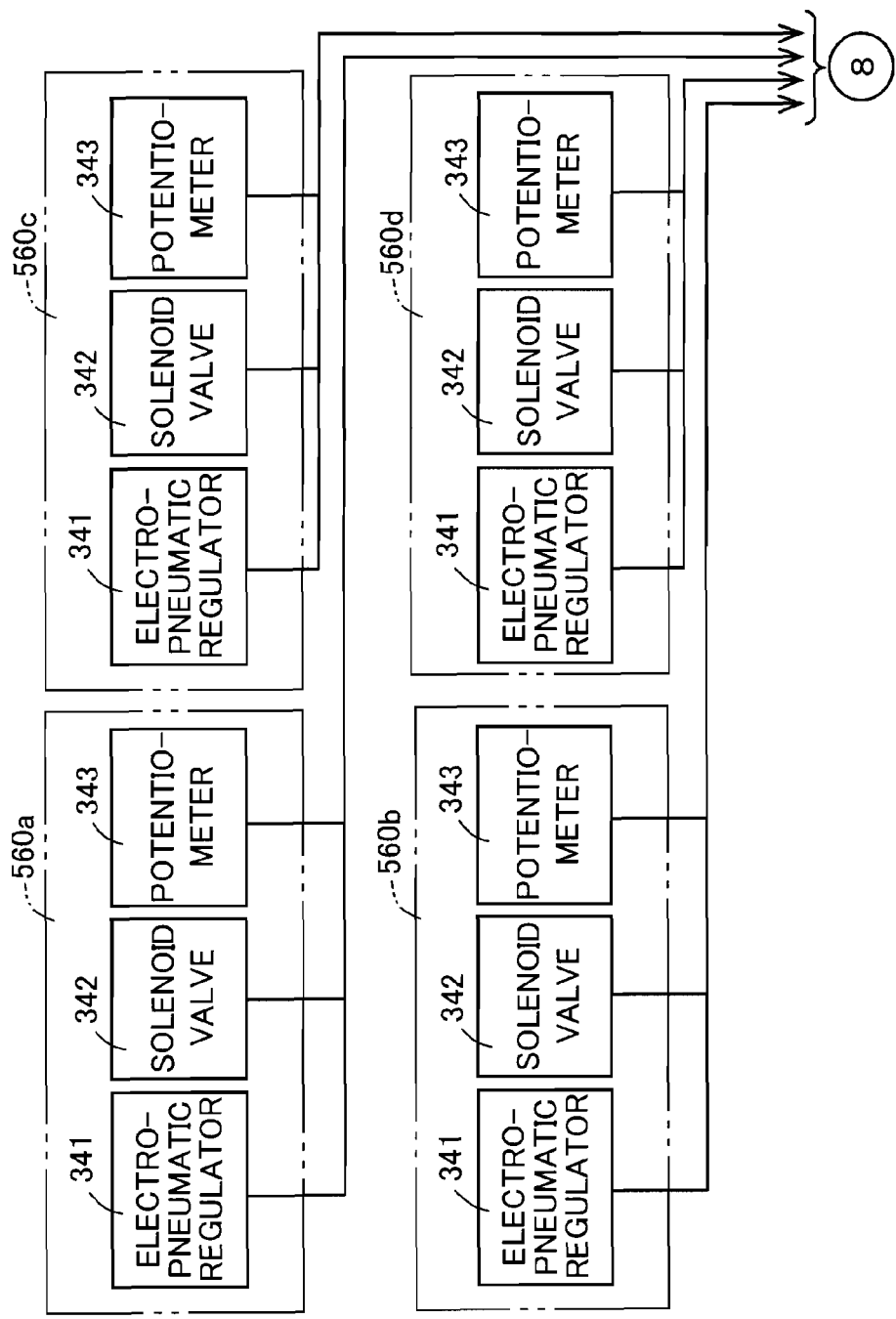
FIGS. 15A to 15C are diagrams showing the configuration of control devices included in the second heavy-work assist suit 500.
Figure 15B:
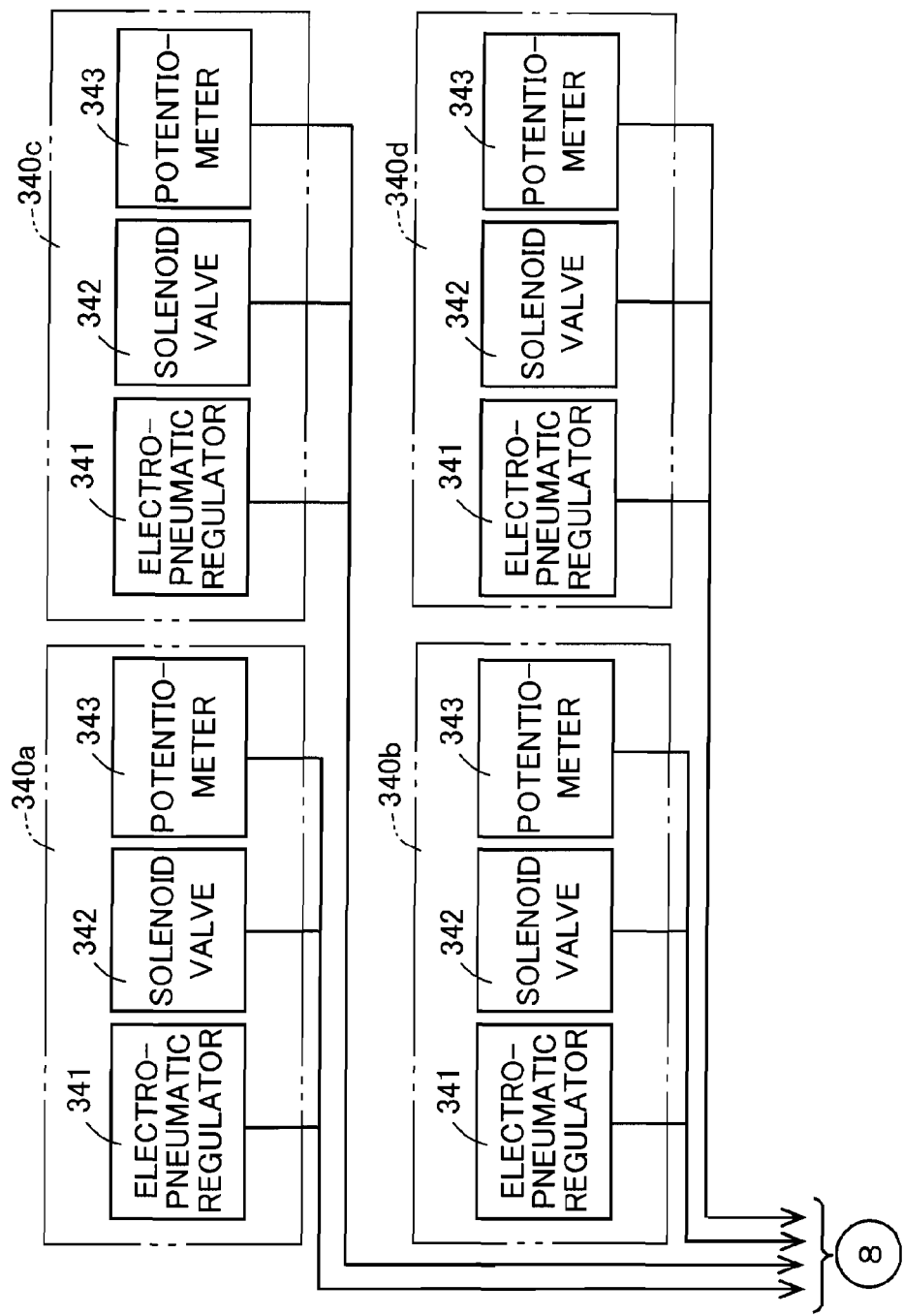
Figure 15C:
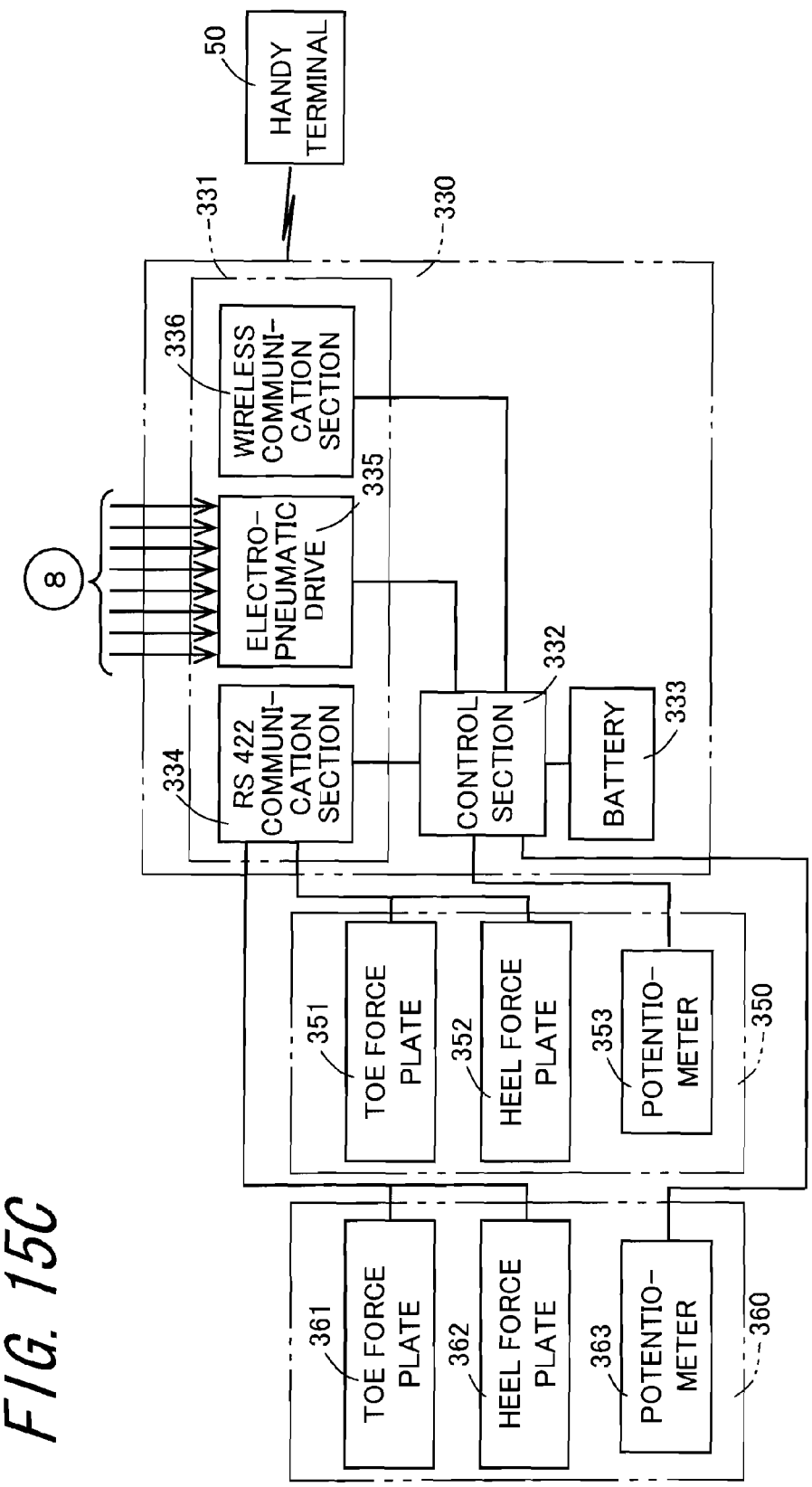

FIGS. 15A to 15C are diagrams showing the configuration of control devices included in the second heavy-work assist suit 500. The control devices included in the second heavy-work assist suit 500 include a central control unit 330, a right-sole unit 350, a left-sole unit 360, joint units 340a to 340d, 560a to 560d, and a handy terminal 50. The central control unit 330, the right-sole unit 350, the left-sole unit 360, and the joint units 340a to 340d are identical with the central control unit 330, the right-sole unit 350, the left-sole unit 360, and the joint units 340a to 340d, and the handy terminal 50, respectively, and will therefore be not described to avoid overlaps.

The joint unit 560a controls the pneumatic rotary actuator 525 located on the left side of the left shoulder. The joint unit 560b controls the pneumatic rotary actuator 525 located on the right side of the right shoulder. The joint unit 560c controls the pneumatic rotary actuator 535 located near the left elbow. The joint unit 560d controls the pneumatic rotary actuator 535 located near the right elbow.

Each of the joint units 560a to 560d comprises: an electropneumatic regulator 341; a solenoid valve 342; and a potentiometer 343. The electropneumatic regulator 341, the solenoid valve 342, and the potentiometer 343 are identical with the electropneumatic regulator 341, the solenoid valve 342, and the potentiometer 343 as shown in FIG. 10, respectively, and will therefore be not described to avoid overlaps.

The potentiometer 343 of the joint unit 560a, 560b is a third angle detecting portion. The potentiometer 343 of the joint unit 560c, 560d is a fourth angle detecting portion. The potentiometer 343 of the joint unit 340a, 340b is a fifth angle detecting portion. The potentiometer 343 of the joint unit 340c, 340d is a sixth angle detecting portion. The potentiometer 353, 363 is a seventh angle detecting portion.

The handy terminal 50 is structurally identical with the handy terminal 50 as shown in FIG. 3. Parameters that can be set in the handy terminal 50 of the fourth embodiment are listed in Table 3.

TABLE 3

| Parameter No | Meaning | Initial value | Range of values |
|---|---|---|---|
| 0 | Force plate initialization [Inc]: eliminate right foot tare; [Dec]: eliminate left foot tare | | |
| 1 | Invalid | | |
| 2 | Lifted load | 30 | 1-30 [kg] |
| 3 | Parameter storage area: Parameters corresponding to 10 persons in total can be stored | 1 | 1-10 |
| 4 | Shoulder swinging-down judgment angle | 4 | 1-10 [deg] |
| 5 | Maximum torque for shoulder/elbow | 50 | 0-100 [%] |
| 6 | Shoulder/elbow control range | 90 | 0-90 [deg] |
| 7 | Output in shoulder/elbow assist-OFF state | 1 | 0-10 [%] |
| 8 | Maximum torque for hip/knee in support state | 50 | 0-100 [%] |
| 9 | Hip/knee control range | 90 | 0-90 [deg] |
| 10 | Maximum torque for hip/knee in swing phase | 50 | 0-100 [%] |
| 11 | Time for output of maximum torque for hip/knee | 500 | 0-1000 [mS] |
| 12 | Maximum torque for hip/knee in walking | 50 | 0-100 [%] |
| 13 | Hip/knee control range in walking | 90 | 0-90 [deg] |
| 14 | Output in hip/knee assist-OFF state | 1 | 0-10 [%] |

Figure 16:
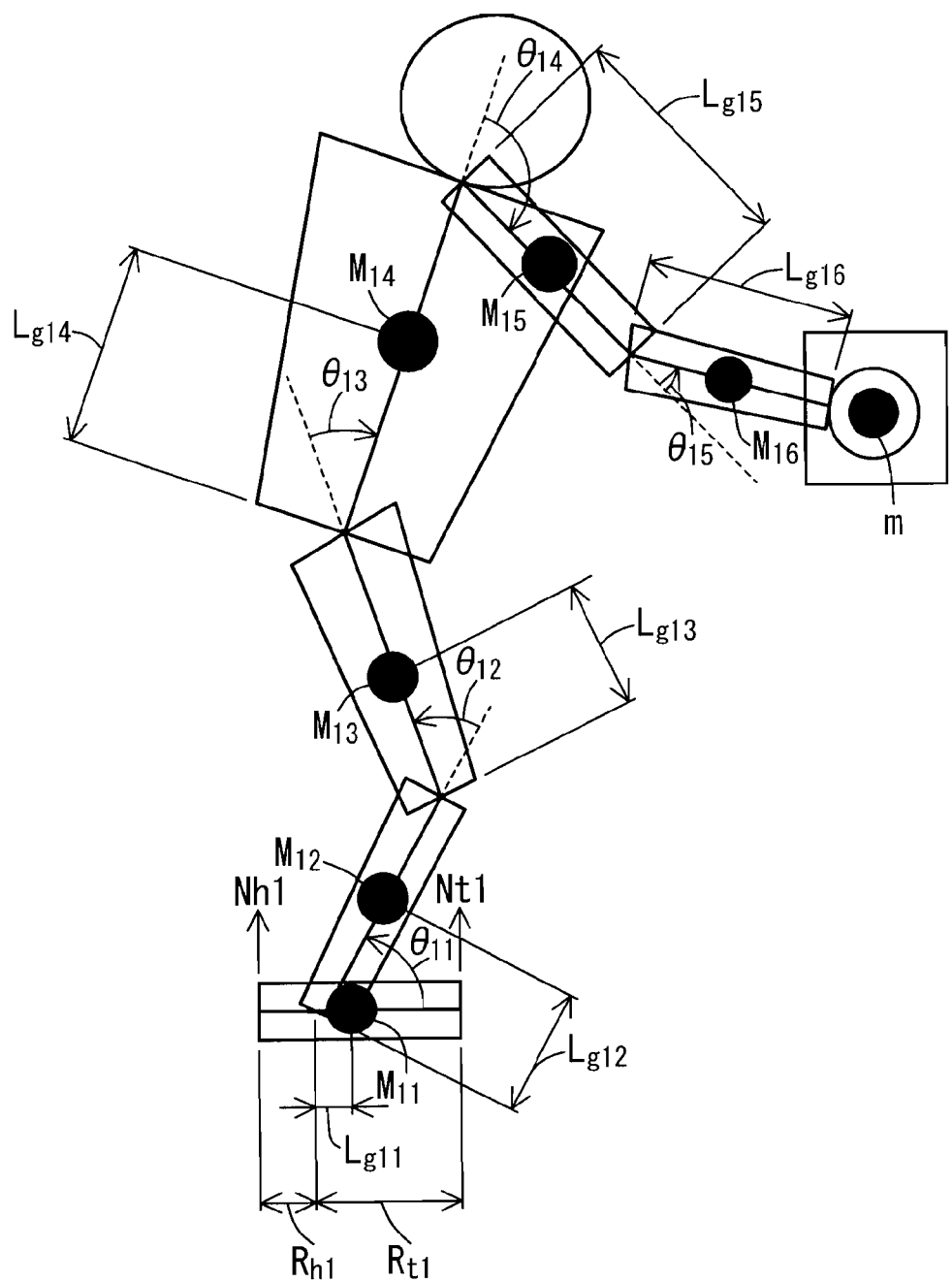
FIG. 16 is a view for explaining calculation of rotation torque T for each joint.
Figure 17A:
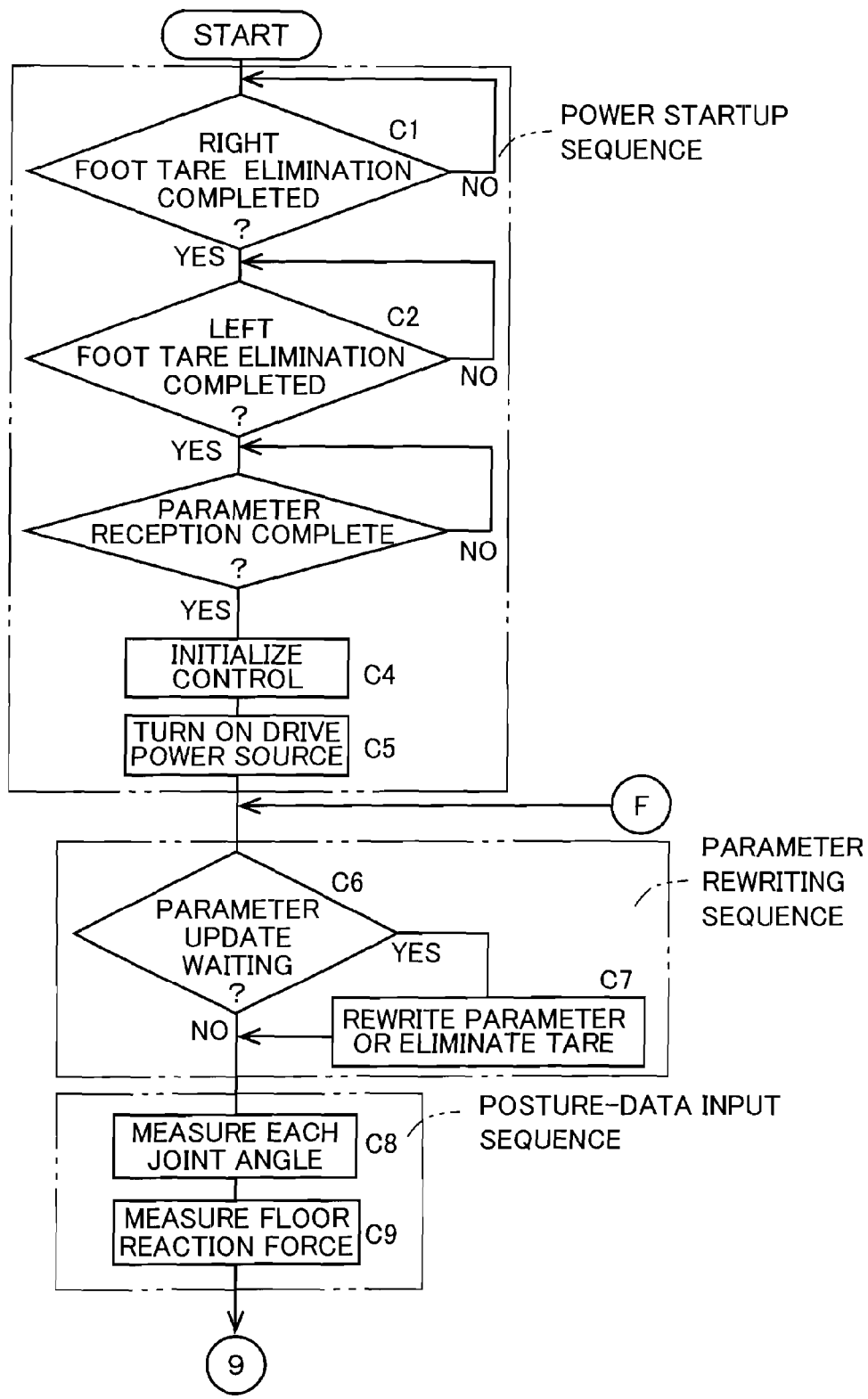
FIGS. 17A and 17B are flow charts showing the procedural steps of a fourth assist suit control process to be performed by the second heavy-work assist suit 500.
Figure 17B:
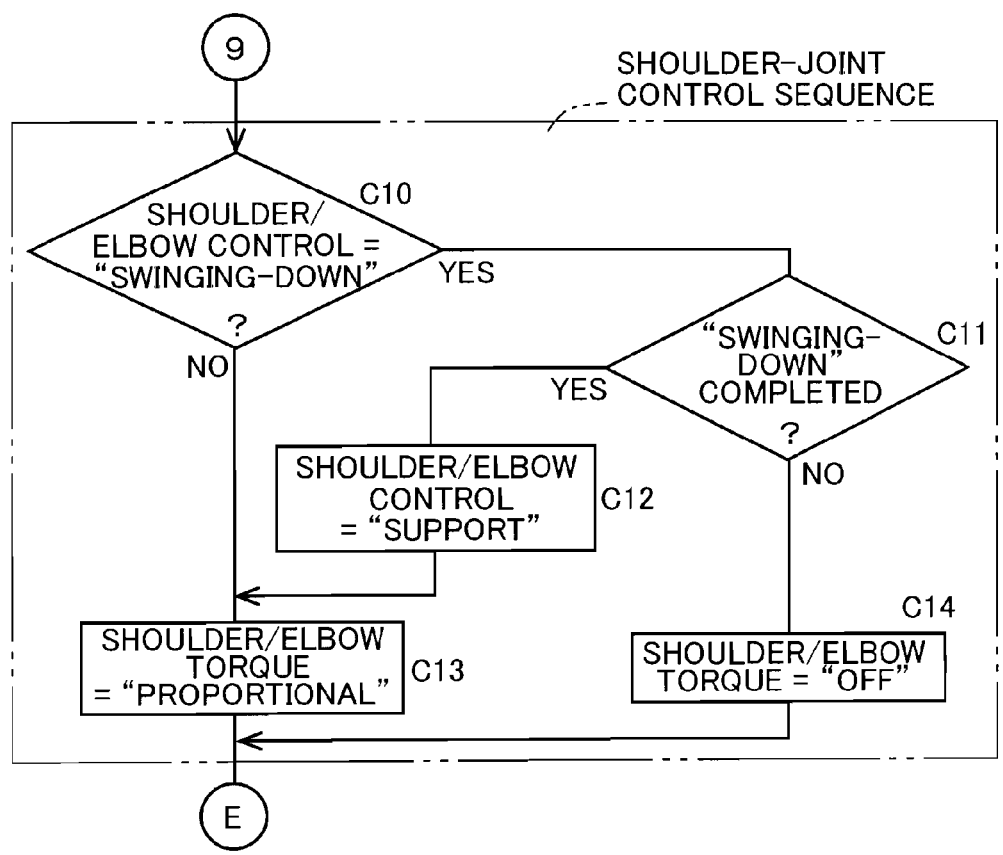
Figure 18A:
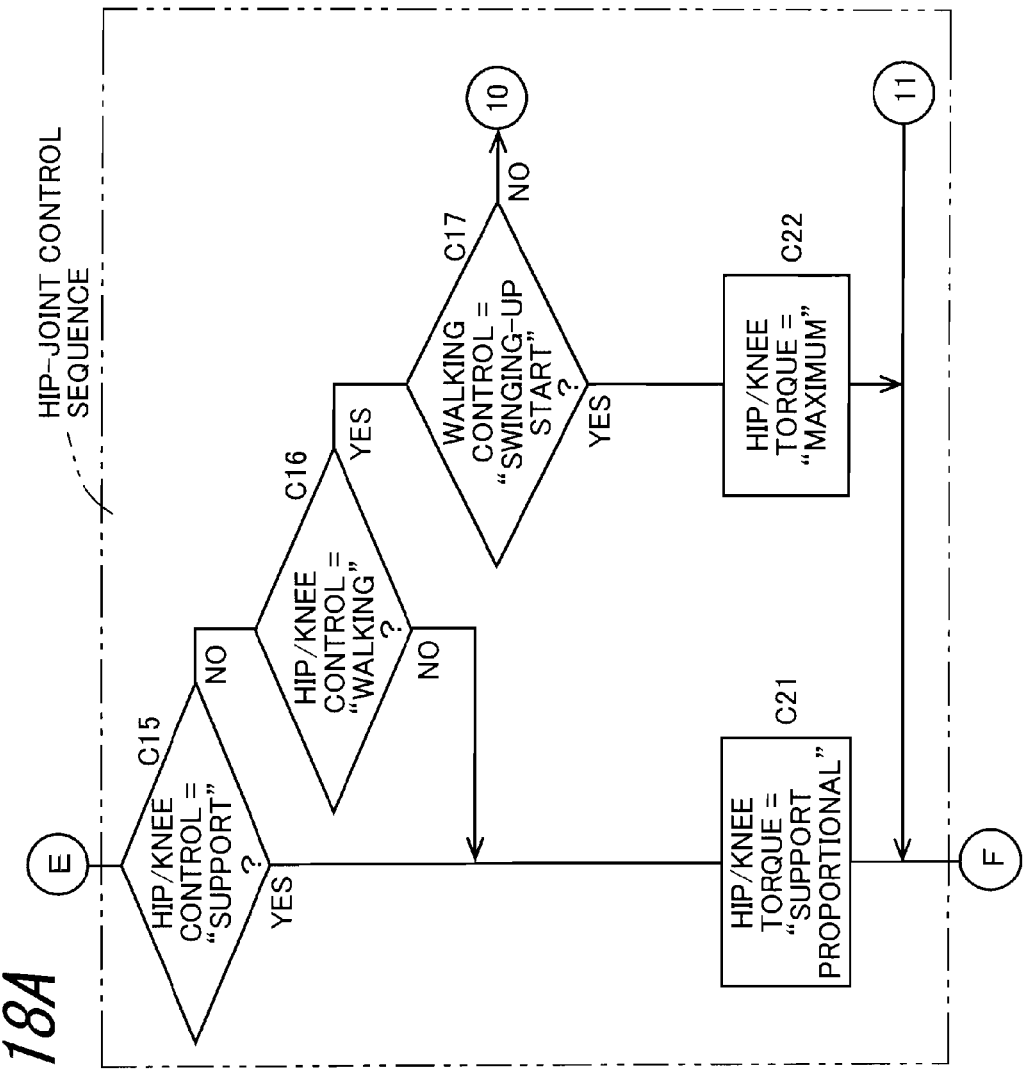
FIGS. 18A and 18B are flow charts showing the procedural steps of the fourth assist suit control process to be performed by the second heavy-work assist suit 500.
Figure 18B:
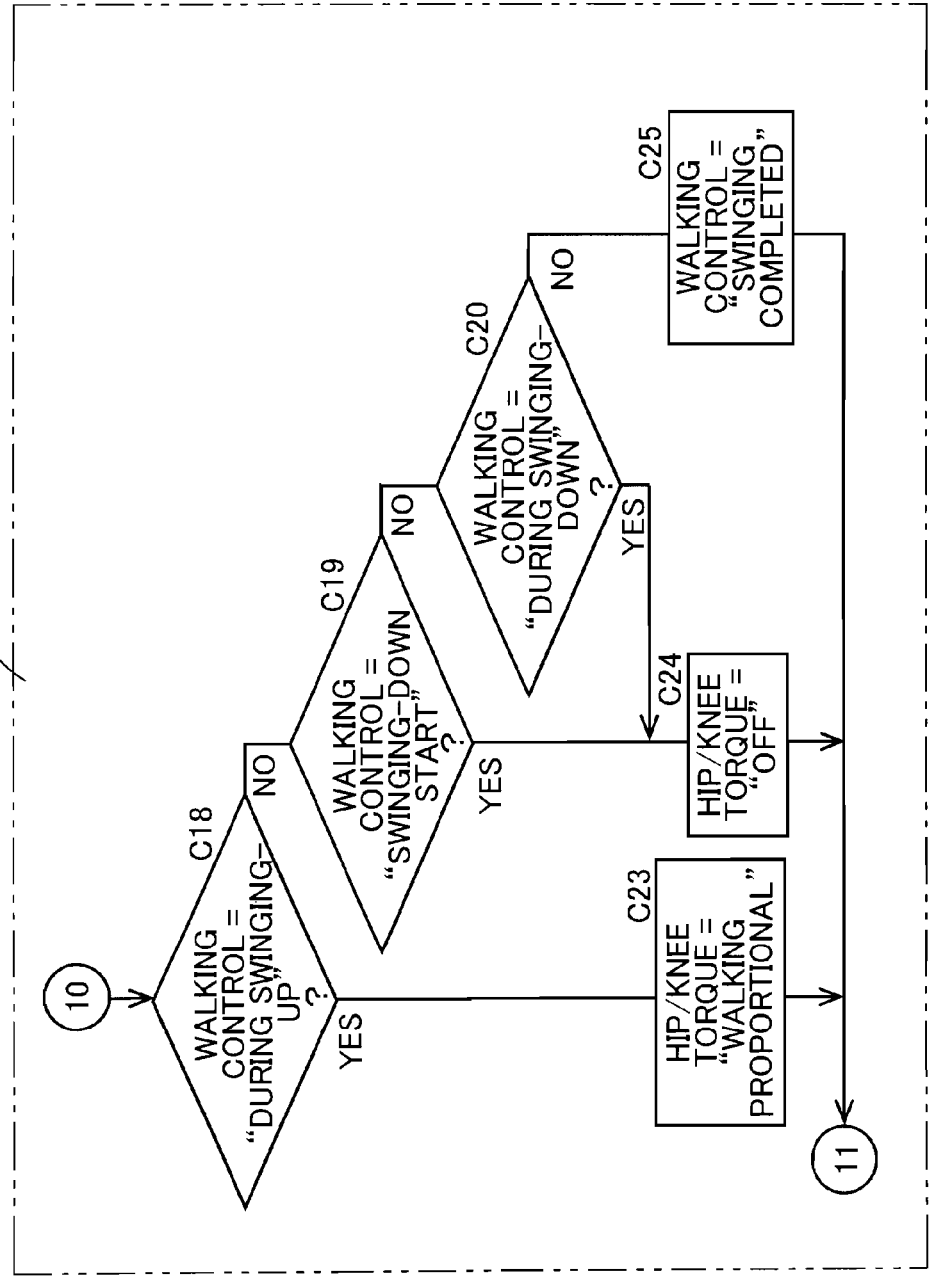

FIG. 16 is a view for explaining calculation of rotation torque T for each joint. The control section 332 determines assist torque by dynamically calculating rotation torque T required for the wearer to move his/her body in various working postures based on the measured angles of shoulder joints, elbow joints, waist joints, and knee joints and the conditions of floor-reaction-force switches acting on the toe and heel of a shoe. The floor-reaction-force switches are a toe floor-reaction-force detection switch 538 and a heel floor-reaction-force detection switch 539. The toe floor-reaction-force detection switch 538 and the heel floor-reaction-force detection switch 539 serve as weight detecting portions.

Provided that the wearer is modeled as an articulated rigid link mechanism whose legs are assumed to lie on separate planes and that the model is divided into an upper limb and a lower limb, the control section 332 adopts an equation whereby right/left joint torque for each arm and the same for each leg can be calculated separately based on a load and a floor reaction force for the upper limb and the lower limb, respectively. By dividing the model into the upper and lower limbs, it is possible to ignore spine curves attributable to multiple-joint body structure.

Due to the necessity to detect the weights of various loads, the control section 332 detects, at first, the weight of a user in a state of wearing the second heavy-work assist suit 500 to calculate support torque for holding the posture of the wearer carrying no load. Moreover, when the wearer carries a load, the control section 332 detects the weight of the load to calculate support torque for holding the load.

In FIG. 16, there is shown the wearer modeled as an articulated rigid link mechanism whose legs are assumed to lie independently on separate planes. A link 11 represents the foot, a link 12 represents the lower leg, a link 13 represents the thigh, a link 14 represents the body, a link 15 represents the upper arm, and a link 16 represents the forearm.

The weight at the position of the center of gravity, the length, and the distance to the center of gravity of the link 11 are designated by $M_{11}$, $L_{11}$, and $L_{g11}$, respectively; those of the link 12 are designated by $M_{12}$, $L_{12}$, and $L_{g12}$, respectively; those of the link 13 are designated by $M_{13}$, $L_{13}$, and $L_{g13}$, respectively; those of the link 14 are designated by $M_{14}$, $L_{14}$, and $L_{g14}$, respectively; those of the link 15 are designated by $M_{15}$, $L_{15}$, and $L_{g15}$, respectively; and those of the link 16 are designated by $M_{16}$, $L_{16}$, and $L_{g16}$, respectively. Moreover, the joint angle of the ankle joint is designated by $\theta_{11}$; that of the knee joint is designated by $\theta_{12}$; that of the hip joint is designated by $\theta_{13}$; that of the shoulder joint is designated by $\theta_{14}$; and that of the elbow joint is designated by $\theta_{15}$. Furthermore, the distance from the center of gravity of the heel is designated by $R_{h1}$; and the distance from the center of gravity of the toe is designated by $R_{t1}$. In addition, the floor reaction force on the heel is designated by $N_{h1}$; and the floor reaction force on the toe is designated by $N_{t1}$. Joint torque for each joint can be calculated according to the following equations (1) to (5), wherein $\tau_{re}$ represents elbow joint torque; $\tau_{rs}$ represents elbow joint torque; $\tau_{rh}$ represents elbow joint torque; $\tau_{rk}$ represents elbow joint torque; and $\tau_{ra}$ represents elbow joint torque.

$$\tau_{re} = (mL_{16} + M_{16}L_{g16})\cos(\theta_{11} + \theta_{12} + \theta_{13} + \theta_{14} + \theta_{15}) \quad (1)$$

$$\tau_{rs} = \{(m + + M_{16})L_{16} + M_{15}L_{g15}\}g \cos(\theta_{11} + \theta_{12} + \theta_{13} + \theta_{14}) + \tau_{re} \quad (2)$$

$$\tau_{rh} = \{M_{11}L_{13} + M_{12}L_{13} + M_{13}(L_{13} - L_{g13})\}g \cos(\theta_{11} + \theta_{12}) - (N_{t1} + N_{h1})L_{13} \cos(\theta_{11} + \theta_{12}) + \tau_{rk} \quad (3)$$

$$\tau_{rk} = \{M_{11}L_{12} + M_{12}(L_{12} - L_{g12})\}g \cos\theta_{11} - (N_{t1} + N_{h1})L_{12} \cos\theta_{11} + \tau_{ra} \quad (4)$$

$$\tau_{ra} = -M_{11}L_{g11}g + N_{t1}R_{t1} - N_{h1}R_{h1} + (N_{t1} + N_{h1})L_{g11} \quad (5)$$

Following the completion of joint-torque calculation, the control section 332 determines the relationship between air pressure supplied to each of the pneumatic cylinders 501 and 516, as well as to each of the pneumatic rotary actuators 525 and 535, and the rotation torque T by utilizing an approximate expression, and provides an instruction in the form of air-pressure command.

In the equations (1) to (5), the terms other than the joint angles $\theta_{11}$ to $\theta_{15}$, the load weight m, and the floor reaction forces $N_{f1}$ and $N_{h1}$ are constants, and, the constants are each converted into an appropriate parameter value in advance, so that they can be inputted via the handy terminal 50 by the wearer afterwards.

FIGS. 17A, 17B, 18A and 18B are flow charts showing the procedural steps of the fourth assist suit control process to be performed by the second heavy-work assist suit 500. Upon powering on the second heavy-work assist suit 500, the control section 332 operates so that the supply of power to the constituent components except the pneumatic cylinders 501 and 516 and the pneumatic rotary actuators 525 and 535 is started, thus bringing the suit into motion, and then the procedure proceeds to Step C1.

The fourth assist suit control process generally comprises five sequences. Steps C1 to C5 belong to a power startup sequence; Steps C6 and C7 belong to a parameter rewriting sequence; Steps C8 and C9 belong to a posture-data input sequence; Steps C10 to C14 belong to a shoulder-joint/elbow-joint control sequence; and Steps C15 to C25 belong to a hip-joint/knee-joint control sequence. The control section 332 produces an output of assist torque needed for each joint by running the shoulder-joint/elbow-joint control sequence and the hip-joint/knee-joint control sequence. Steps C1 to C3 and Step C6 are identical with Steps B1 to B3 and Step B6 as shown in FIG. 11, respectively, and will therefore be not described to avoid overlaps.

In Step C4, the control section 332 performs control initialization. Specifically, just as with Step A2 shown in FIG. 5, the control section 332 defines a joint angle in an upright posture with arms pointing downward in the vertical direction as an initial value, viz. 0 degree. That is, the control section 132 acquires each joint angle in the upright posture with arms pointing downward in the vertical direction from the potentiometer 343 included in each of the joint units 340a to 340d, 560a to 560d, the potentiometer 353 included in the right-sole unit 350, and the potentiometer 363 included in the left-sole unit 360, and then defines the position of each of the acquired joint angles as a 0-degree angle position of each joint angle.

In Step C5, the control section 332 turns on a drive power source for driving the pneumatic cylinders 501 and 516 and the pneumatic rotary actuators 525 and 535. That is, the control section 332 effects control of the battery 333 in a manner so as to start power supply from the battery 333 to the pneumatic cylinders 501 and 516 and the pneumatic rotary actuators 525 and 535.

In Step C7, upon reception of an updated parameter from the handy terminal 50, the control section 332 stores the received updated parameter in the non-illustrated memory section for parameter updating. Alternatively, the control section 332 effects tare elimination.

In Step C8, the control section 332 measures each joint angle. Specifically, the control section 332 acquires joint angles measured by the potentiometer 343 included in each of the joint units 340a to 340d, 560a to 560d, the potentiometer 353 included in the right-sole unit 350, and the potentiometer 363 included in the left-sole unit 360, and a turning direction, from each of the potentiometers 343, 353, and 363. In Step C9, the control section 332 reads switch status from a floor-reaction-force switch. Specifically, the control section 332 acquires, from the toe floor-reaction-force detection switch 538 and the heel floor-reaction-force detection switch 539, the result detected from each of the switches, or equivalently measured weight. At this time, the control section 332 acquires hip inclination measured by a triaxial acceleration sensor included in the central control unit from the triaxial acceleration sensor.

Then, the control section 332 calculates static torque exerted on the wearer's upper arm, forearm, thigh, and lower leg based on the acquired joint angles, presence or absence of turning motion, a turning direction, weight, and hip inclination, and also assesses the conditions of shoulder/elbow control, hip/knee control, and walking control. The shoulder/elbow control is the control of shoulder joints and elbow joints, and the hip/knee control is the control of hip joints and knee joints.

Steps C10 to C14 correspond to Steps A8 to A12 as shown in FIG. 5, respectively, except that the former are associated with shoulder/elbow control and shoulder/elbow torque in place of shoulder control and shoulder torque, and also Steps C15 to C25 correspond to Steps C13 to C23 as shown in FIG. 12, respectively, except that the former are associated with hip/knee control and hip/knee torque in place of hip control and hip torque, wherefore the description of those steps will be omitted to avoid overlaps. The control section 332 executes a sequence of Steps C6 to C25, or equivalently a main loop, at 10 millisecond intervals, thereby achieving smooth assistance to the wearer.

In the control section 132, among the parameters as listed in Table 1, parameter No. 4 is used in Step C11; parameters No. 5 and No. 6 are used in Step C13; parameter No. 7 is used in Step C14; parameters No. 8 and No. 9 are used in Step C21; parameters No. 10 and No. 11 are used in Step C22; parameters No. 12 and No. 13 are used in Step C23; and parameter No. 14 is used in Step C24.

In the first light-work assist suit 100 and the second light-work assist suit 200, for the purpose of power assistance to shoulder joints and hip joints, the electric motor 1 is placed at the side of each of the right and left shoulder joints, and the electric motor 11 is placed at the side of each of the right and left hip joints. In the electric motor 1, 11, in the interest of back-drivable capability, in other words, in order that the drive device can be operated from the wearer's side, the speed reducer added to the electric motor 1, 11 is adjusted so that the speed reduction ratio is as low as about a one-fiftieth level, for restricting the electric motor 1, 11's output to prevent production of a force greater than that which can be produced by the wearer, which makes it possible to ensure a sufficient assist force in the anti-gravity direction. In the first light-work assist suit 100 and the second light-work assist suit 200, as an assist mechanism equipped with the electric motor 1, 11, a driven rotary shaft, or equivalently a drive device-free rotary shaft, is disposed around the outer periphery of the wearer's joint to permit freedom of wearer's movement in directions other than the assist direction.

Thus, in the electric motor 1, 11, in the interest of back-drivable capability, the speed reducer added to the electric motor 1, 11 is adjusted so that the speed reduction ratio is as low as about a one-fiftieth level for restricting the electric motor 1, 11's output to prevent production of a force greater than that which can be produced by the wearer, which makes it possible to ensure wearer's safety. Moreover, in order to permit freedom of wearer's movement in directions other than the assist direction, the driven rotary shaft is disposed around the outer periphery of the wearer's joint, wherefore it never occurs that the first light-work assist suit 100 and the second light-work assist suit 200 put a restraint on wearer's movement.

According to the control method for the first light-work assist suit 100 and the second light-work assist suit 200, assist torque is determined by, instead of utilizing a faint surface electromyogram (EMG) signal which travels through a muscle in response to muscle's motion, dynamically calculating rotation torque required for the wearer to move his/her body in various working postures. This eliminates the inconvenience of placement of a surface electromyogram (EMG) sensor. Moreover, according to this control method, since assist torque is determined by, instead of adopting an action-pattern reproduction system, dynamically calculating rotation torque required for the wearer to move his/her body in various working postures, it is possible to avoid causing discontinuity in movement at the time of switching of action patterns.

Therefore, the first light-work assist suit 100 and the second light-work assist suit 200 are useful because of being free from the inconvenience of placement of a surface electromyogram (EMG) sensor. Moreover, in the first light-work assist suit 100 and the second light-work assist suit 200, since there is no need to compile a large number of action patterns into a database, it never occurs that discontinuity in movement appears at the time of switching of action patterns.

In the lower-limb part of each of the first heavy-work assist suit 300 and the second heavy-work assist suit 500, for the purpose of power assistance to hip joints and knee joints, the pneumatic cylinder 301, 501 is placed at the side of each of the right and left hip joints, and the pneumatic cylinder 315, 516 is placed at the side of each of the right and left knee joints. As for the pneumatic cylinders 301, 315, 501, and 516, by virtue of back-drivable capability and cushioning effects resulting from air compressibility, and also, by restricting supply pressure and flow rate to prevent production of a force and speed greater than those which can be produced by the wearer, it is possible to ensure wearer's safety, as well as to ensure a sufficient assist force in the anti-gravity direction. As for an assist mechanism equipped with the pneumatic cylinder 301, 315, 501, 516, a driven rotary shaft is disposed around the outer periphery of the wearer's joint to permit freedom of wearer's movement in directions other than the assist direction.

In the upper-limb part of the first heavy-work assist suit 300, the lifter device for power assistance for the lifting of heavy objects is installed in an upper-limb back box attached to the back frame for the wearer's leg via a rotary shaft which is rotatable about the vertical axis, viz. the upper-limb back box 324. Coupled to the upper part of this back box is the fixed end of the pneumatic artificial rubber muscle 325. Connected to the moving end of the artificial rubber muscle 325 is the movement frame 326, and, an about five-fold speed increase is achieved via the pinion gears 630 to 632. The wire 639, 640 is passed from the upper part of the back box to the guide portion situated above each of the right and left shoulders, and from there to the front of the wearer. On the end of the wire 639, 640 is installed the hook 641 for holding a heavy object and the switch 642. The wearer is able to tie a heavy object to the wire 639, 640 by putting the heavy object on the hook 641.

As for the pneumatic cylinders 301, 315, 501, and 516, the pneumatic artificial rubber muscle 325, and the pneumatic rotary actuators 525, 535, by virtue of back-drivable capability and cushioning effects resulting from air compressibility, and also, by restricting supply pressure and flow rate to prevent production of a force and speed greater than those which can be produced by the wearer, it is possible to ensure wearer's safety. Moreover, in the first heavy-work assist suit 300 and the second heavy-work assist suit 500, the driven rotary shaft is disposed around the outer periphery of the wearer's joint to permit freedom of wearer's movement in directions other than the assist direction, wherefore no restraint is put on wearer's movement.

According to the control method for the first heavy-work assist suit 300 and the second heavy-work assist suit 500, assist torque is determined by, instead of utilizing a faint surface electromyogram (EMG) signal which travels through a muscle in response to muscle's motion, dynamically calculating rotation torque required for the wearer to move his/her body in various working postures, wherefore the first heavy-work assist suit 300 and the second heavy-work assist suit 500 are free of the inconvenience of placement of a surface electromyogram (EMG) sensor. Moreover, according to this control method, assist torque is determined by, instead of adopting an action-pattern reproduction system, dynamically calculating rotation torque required for the wearer to move his/her body in various working postures, wherefore the first heavy-work assist suit 300 and the second heavy-work assist suit 500 are free of discontinuity in movement at the time of switching of action patterns.

Therefore, the first heavy-work assist suit 300 and the second heavy-work assist suit 500 are useful because of being free from the inconvenience of placement of a surface electromyogram (EMG) sensor. Moreover, in the first heavy-work assist suit 300 and the second heavy-work assist suit 500, since there is no need to compile a large number of action patterns into a database, it never occurs that discontinuity in movement appears at the time of switching of action patterns.

Thus, two electric motors 1, 201 are located near the right and left shoulders, respectively, of the wearer, for producing rotation torque for assisting the movement of the wearer's upper arms in a direction to follow the movement of the wearer's upper arms. The back frame 5, 206 is placed at the upper region of the wearer's body, for holding the two electric motors 1 and 201. Two electric motors 11 and 212 are each located near the wearer's hip, for producing rotation torque for assisting the movement of the wearer's thigh in a direction to follow the movement of the wearer's thigh. The back frame 15, 216 is placed at the wearer's hip, for holding the two electric motors 11, 212. In the first light-work assist suit 100 and the second light-work assist suit 200, in order to permit freedom of wearer's movement in directions other than the assist direction, the driven rotary shafts 2 to 4, 203 and 205 and the driven rotary shafts 12 to 14 and 214, for example, drive device-free driven rotary shafts, which are free to rotate about the vertical axis and the front-rear axis, are each disposed around the outer periphery of the wearer's joint. This makes it possible to provide assistance without putting any restraint on wearer's movement.

Also included is a frame extending from the back frame 5 to each shoulder through the driven rotary shafts 2 to 4. The two electric motors 1 are coupled to the back frame 5 via the frame. This makes it possible to render the back frame 5 for holding the two electric motors 1 lighter in weight, and thereby reduce burdens on the wearer.

Moreover, the frame includes two shoulder frames to be placed at the right and left shoulders, respectively, of the wearer from above, and two lateral frames extending outwardly in the right-left direction from the two shoulder frames to the shoulders, respectively, through the driven rotary shafts 203 and 205. The two electric motors 201 are coupled to the back frame 206 via the two lateral frames. Accordingly, in the second light-work assist suit 200, the two electric motors 212 can be positioned with stability, which helps facilitate wearer's movement.

Moreover, the rotary encoder included in the electric motor 1, 201 is installed in the two electric motors 1, 201, and detects the angle of turning motion of the upper arm about the shoulder joint. The rotary encoder included in the electric motor 11, 212 is installed in the two electric motors 11, 212, and detects the angle of turning motion of the thigh about the hip joint. The toe floor-reaction-force detection switch 21 and the heel floor-reaction-force detection switch 22 are placed at the toe part and the heel part, respectively, of the sole of a shoe worn by the wearer, and detect whether a weight greater than or equal to a predetermined value acts on the toe and the heel. The three-dimensional acceleration sensor is installed in the back frame 15, 216, and detects the inclination of the upper half of the wearer's body. With the provision of the rotary encoder included in the electric motor 1, 201, 11; the toe floor-reaction-force detection switch 21 and the heel floor-reaction-force detection switch 22; and the three-dimensional acceleration sensor, the first light-work assist suit 100 and the second light-work assist suit 200 are free from the inconvenience of placement of a surface electromyogram (EMG) sensor, and are therefore useful.

Moreover, the control section 132 determines static torque exerted on each upper arm and each thigh, a turning direction, and rotation torque required for turning motion by calculation, based on the turning angle of each upper arm detected by the rotary encoder included in the electric motor 1, 201, the turning angle of each thigh detected by the rotary encoder included in the electric motor 11, 212, the result detected from the toe floor-reaction-force detection switch 21 and the heel floor-reaction-force detection switch 22, and the inclination of the upper half of the body detected by the three-dimensional acceleration sensor, calculates drive torque for a drive to the two electric motors 1, 201 and the two electric motors 11, 212, based on the thusly determined static torque, turning direction, and rotation torque, and drives the two electric motors 1, 201 and the two electric motors 11, 212 so as to produce the calculated drive torque. Thus, in the first light-work assist suit 100 and the second light-work assist suit 200, since drive-torque calculation is performed based on turning angles and so forth, there is no need to compile a large number of action patterns into a database, wherefore it never occurs that discontinuity in movement appears at the time of switching of action patterns.

Moreover, the control section 132 adjusts the calculated drive torque so that the speed reduction ratio becomes less than or equal to a level that allows the wearer to operate the two electric motors 1, 201 and the two electric motors 11 and 212 in a reverse direction, and then drives the two electric motors 1 and 201 and the two electric motors 11 and 212. Thus, in the first light-work assist suit 100 and the second light-work assist suit 200, the speed reduction ratio is adjusted to be less than or equal to a level that allows the wearer to operate the two electric motors 1 and 201 and the two electric motors 11 and 212 in a reverse direction, for example, the speed reduction ratio is adjusted to be as low as about a one-fiftieth level, so that the output from the two electric motors 1 and 201 and the two electric motors 11 and 212 can be restricted to prevent production of a force greater than that which can be produced by the wearer. This makes it possible to ensure wearer's safety.

Moreover, the two electric motors 1 and 201 and the two electric motors 11 and 212 are each an electric motor. Since the electric motor has back-drivable capability, it follows that the first light-work assist suit 100 and the second light-work assist suit 200 succeed in ensuring wearer's safety.

Moreover, two pneumatic cylinders 301 and 501 produce rotation torque for assisting the movement of each of the wearer's thighs in a direction to follow the movement of each of the wearer's thighs. Two pneumatic cylinders 315 and 516 produce rotation torque for assisting the movement of each of the wearer's lower legs in a direction to follow the movement of each of the wearer's lower legs. A holding section includes the back frames 512 and 529 to be placed at the wearer's back, two frames 506 to be placed at the wearer's thighs, two frames 520 to be placed at the wearer's lower legs, and two frames 523 to be placed at shoe soles, and holds the two pneumatic cylinders 301 and 501 and the pneumatic cylinders 315 and 516. An upper-body assist section is held by a back fitting portion, and assists upper body's movement. The holding section further includes: two driven rotary shafts 505 lying near the opposite outer sides, respectively, of the waist in the right-left direction, for coupling a thigh fitting portion to the back fitting portion for rotation about the front-rear axis; two driven rotary shafts 504 lying near the outer sides of right and left knees in the right-left direction, respectively, for coupling a lower leg fitting portion to the thigh fitting portion for rotation about the front-rear axis; two driven rotary shafts 519 lying near the outer sides of right and left ankles in the right-left direction, respectively, for coupling a shoe sole fitting portion to the lower leg fitting portion for rotation about the front-rear axis; the driven rotary shaft 508 for coupling one end of the pneumatic cylinder 301, 501, for rotation about the front-rear axis, to the back fitting portion in a location above the hip connection portion; the driven rotary shaft 502 for coupling the other end of the pneumatic cylinder 301, 501, for rotation about the front-rear axis, to the front end of the arm extending forwardly and upwardly from one end of a part of the thigh fitting portion which lies closer to the knee connection portion; the driven rotary shaft 521 for coupling one end of the pneumatic cylinder 315, 516, for rotation about the front-rear axis, to the back side of the thigh fitting portion in an intermediate position closer to the knee connection portion; and the driven rotary shaft 517 for coupling the other end of the pneumatic cylinder 315, 516, for rotation about the front-rear axis, to the holding section on the back side of the knee connection portion in a location behind the ankle connection portion. Accordingly, in the first heavy-work assist suit 300 and the second heavy-work assist suit 500, since the weight of a load such as a package can be released from the shoe sole fitting portion into the ground or floor, it is possible to reduce burdens on the wearer while assisting wearer's movement.

Moreover, the holding section includes the guide portion extending forward from the upper part of the back frame 512, 529 in straddling position over the shoulders of the wearer. The upper-body assist section includes the wire 639, 640 having the hook 641 at its front end, and the artificial rubber muscle 325 installed on the back side of the back frame 644, for winding up and down the wire 639, 640 along the guide portion. Accordingly, the first heavy-work assist suit 300 is capable of assisting the lifting and lowering of a load when the load is put on the hook 641 of the wire 639, 640.

Moreover, two pneumatic rotary actuators 525 are placed near the opposite shoulders, respectively, and are each held by the back frames 512 and 529, and produce rotation torque for assisting the movement of each of the wearer's upper arms in a direction to follow the movement of each of the wearer's upper arms. Two pneumatic rotary actuators 525 are placed near the opposite elbows, respectively, and are each held by the back frames 512, 529, and produce rotation torque for assisting the movement of each wearer's forearm in a direction to follow the movement of each wearer's forearm. Accordingly, the second heavy-work assist suit 500 is capable of assisting the lifting and lowering of a load with both hands.

Moreover, the potentiometer 343 of the joint unit 560a, 560b is installed in the two pneumatic rotary actuators 525, and detects the turning angle of turning motion of the upper arm. The potentiometer 343 of the joint unit 560c, 560d is installed in the two pneumatic rotary actuators 525, and detects the turning angle of turning motion of the forearm. The potentiometer 343 of the joint unit 340a, 340b is installed in the two driven rotary shafts 505, and detects the turning angle of turning motion of the thigh. The potentiometer 343 of the joint unit 340c, 340d is installed in the two driven rotary shafts 504, and detects the turning angle of turning motion of the lower leg. The potentiometer 353, 363 is installed in the two driven rotary shafts 519, and detects the turning angle of turning motion of the foot. The toe floor-reaction-force detection switch 538 and the heel floor-reaction-force detection switch 539 are placed at the toe part and the heel part, respectively, of the sole of a shoe worn by the wearer, and detect a weight exerted on the toe and the heel. The three-dimensional acceleration sensor is installed in the back frames 512 and 529, and detects the inclination of the upper half of the body. The control section 332 determines static torque exerted on each upper arm, each forearm, each thigh, each lower leg, and each foot, a turning direction, and rotation torque required for turning motion by calculation, based on the turning angles detected by the potentiometers 343, 353 and 363, the weight detected by the toe floor-reaction-force detection switch 538 and the heel floor-reaction-force detection switch 539, and the inclination of the upper half of the body detected by the three-dimensional acceleration sensor, calculates drive torque for a drive to the two pneumatic rotary actuators 525, the two pneumatic rotary actuators 535, the two pneumatic cylinders 301 and 501, and the pneumatic cylinders 315 and 516, based on the thusly determined static torque, turning direction, and rotation torque, and drives the two pneumatic rotary actuators 525, the two pneumatic rotary actuators 535, the two pneumatic cylinders 301 and 501, and the pneumatic cylinders 315 and 516 under the calculated drive torque. With the provision of the potentiometers 343, 353 and 363, the toe floor-reaction-force detection switch 538 and the heel floor-reaction-force detection switch 539, and the three-dimensional acceleration sensor, the second heavy-work assist suit 500 is free from the inconvenience of placement of a surface electromyogram (EMG) sensor, and is therefore useful. Moreover, in the second heavy-work assist suit 500, since drive-torque calculation is performed based on turning angles and so forth, there is no need to compile a large number of action patterns into a database, wherefore it never occurs that discontinuity in movement appears at the time of switching of action patterns.

Moreover, the two pneumatic cylinders 301 and pneumatic cylinders 315 are each a pneumatic cylinder. The drive section is the artificial rubber muscle 325. As for the pneumatic cylinder and the artificial rubber muscle, by virtue of back-drivable capability and cushioning effects resulting from air compressibility, and also, by restricting supply pressure and flow rate to prevent production of a force and speed greater than those which can be produced by the wearer, it is possible for the first heavy-work assist suit 300 to ensure wearer's safety.

Moreover, the two pneumatic cylinders 501 and pneumatic cylinders 516 are each a pneumatic cylinder. The two pneumatic rotary actuators 525 and pneumatic rotary actuators 535 are each a pneumatic rotary actuator. As for the pneumatic cylinder and the pneumatic rotary actuator, by virtue of back-drivable capability and cushioning effects resulting from air compressibility, and also, by restricting supply pressure and flow rate to prevent production of a force and speed greater than those which can be produced by the wearer, it is possible for the second heavy-work assist suit 500 to ensure wearer's safety.

Moreover, the handy terminal 50 effects inputting of parameters indicative of individual differences among wearers. The control section 132, 332 calculates the drive torque based on parameters inputted via the handy terminal 50. Thus, the first light-work assist suit 100, the second light-work assist suit 200, the first heavy-work assist suit 300, and the second heavy-work assist suit 500 are designed to permit inputting of parameters indicative of individual differences among wearers, and can therefore be used by anyone who wants to wear.

Moreover, in the process of control of the first light-work assist suit 100 and the second light-work assist suit 200, in Steps A4 to A7, static torque exerted on each upper arm and each thigh, a turning direction, and rotation torque required for turning motion are determined by calculation, based on the turning angle of each upper arm detected by the rotary encoder included in the electric motor 1, the turning angle of each thigh detected by the rotary encoder included in the electric motor 11, the result detected from the toe floor-reaction-force detection switch 21 and the heel floor-reaction-force detection switch 22, and the inclination of the upper half of the body detected by the three-dimensional acceleration sensor. Then, in Steps A8 to A23, based on the thusly determined static torque, turning direction, and rotation torque, drive torque for a drive to the two electric motors 1 and 201 and the two electric motors 11 and 212 is calculated, and, after the calculated drive torque is adjusted so that the speed reduction ratio becomes less than or equal to a level that allows the wearer to operate the two electric motors 1 and 201 and the two electric motors 11 and 212 in a reverse direction, the two electric motors 1 and 201 and the two electric motors 11 and 212 are driven. Being provided with the angle detecting portions, the floor-reaction-force detecting portions, and the three-dimensional acceleration sensor, the first light-work assist suit 100 and the second light-work assist suit 200 are free from the inconvenience of placement of a surface electromyogram (EMG) sensor, and are therefore useful. Moreover, in the first light-work assist suit 100 and the second light-work assist suit 200, since drive-torque calculation is performed based on turning angles and so forth, there is no need to compile a large number of action patterns into a database, wherefore it never occurs that discontinuity in movement appears at the time of switching of action patterns.

Figure 19A:
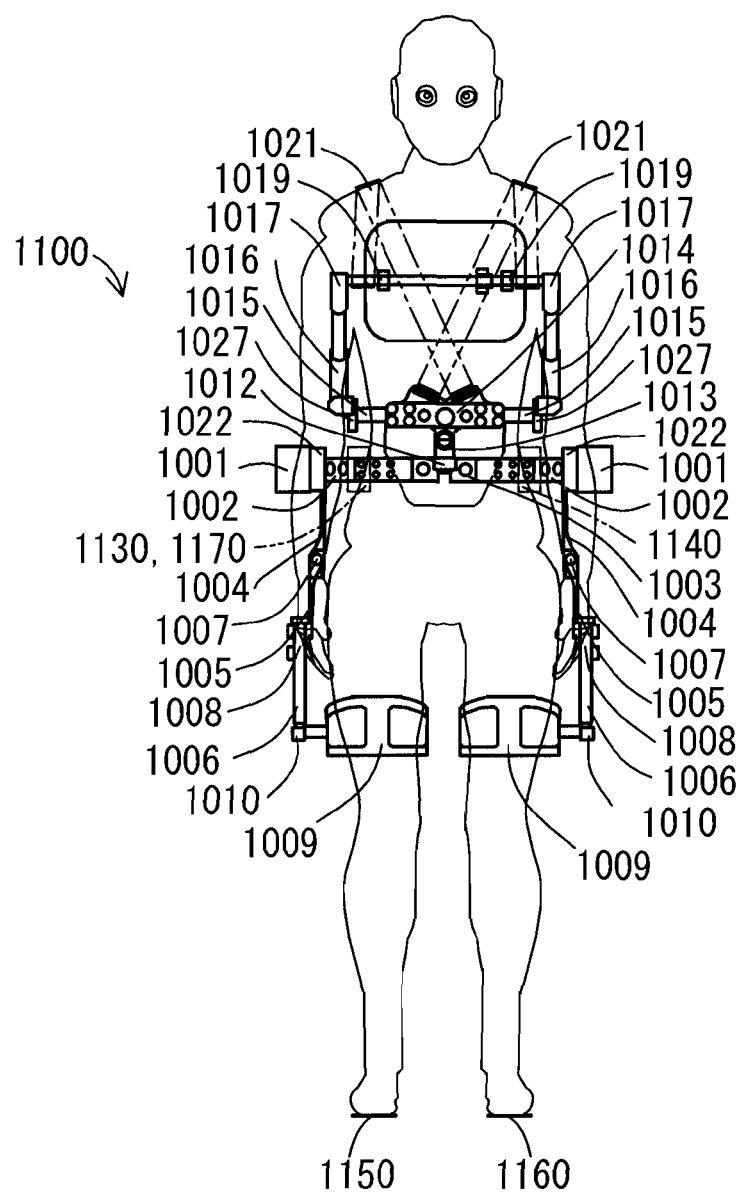
FIG. 19A is a view showing the outer appearance of a heavy-work assist suit 100 in accordance with an embodiment of the invention.
Figure 19B:
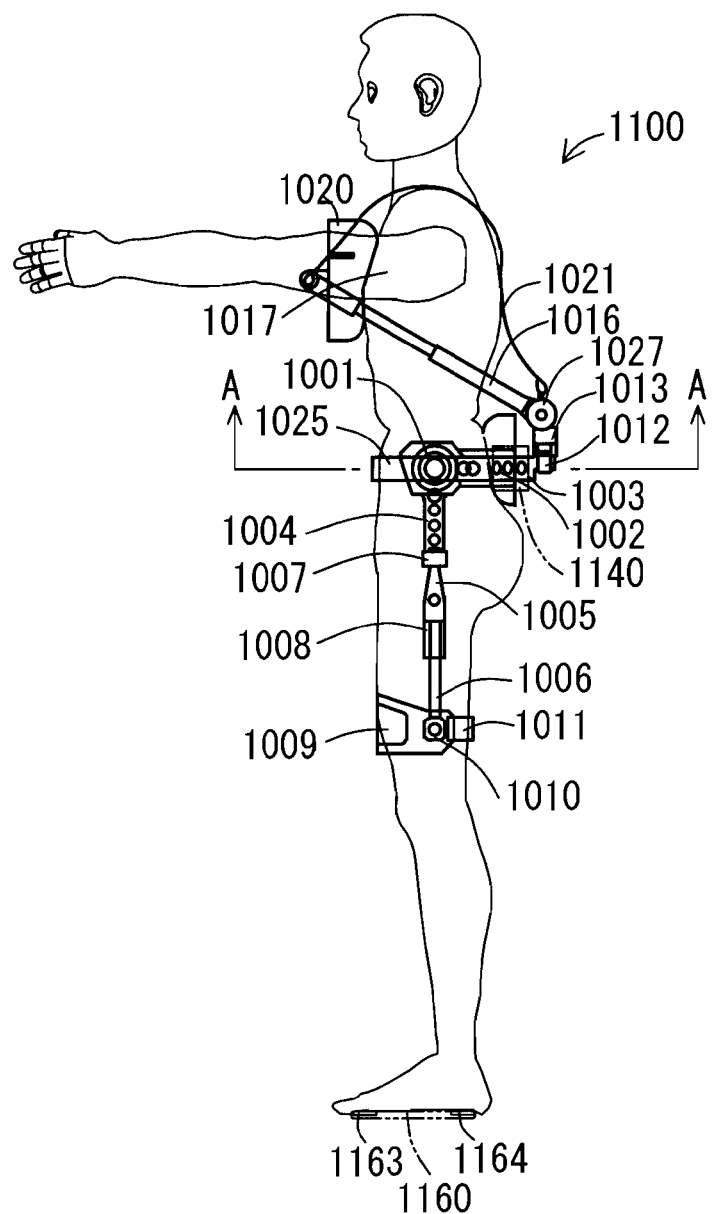
FIG. 19B is a view showing the outer appearance of the heavy-work assist suit 100 in accordance with the embodiment of the invention.

FIGS. 19A and 19B are views showing the outer appearance of a heavy-work assist suit 1100 in accordance with another embodiment of the invention. FIG. 19A is a front view showing the outer appearance of the heavy-work assist suit 1100 worn by the wearer. FIG. 19B is a side view showing the outer appearance of the heavy-work assist suit 1100 worn by the wearer. A control method pursuant to the invention is practiced by the heavy-work assist suit 1100.

The heavy-work assist suit 1100 implemented as a power assist robot apparatus is an assist suit for heavy work. The heavy-work assist suit 1100 comprises: power-assist electric motors 1001; frames 1002 to 1006, 1014 to 1018, 1023 and 1024; driven rotary shafts 1007, 1010, 1012, 1013 and 1019; slide holes 1008; receiving portions 1009; and belts 1011, 1021 and 1025.

The power-assist electric motor 1001 serving as a rotatably driving portion is constructed of an electric servo motor, for example. The power-assist electric motor 1001 is an electric motor used as a power source for power assistance to the upper body and the thigh, and more specifically for assisting upper body's movement and thigh's movement. In other words, the power-assist electric motor 1001 produces power to assist turning motion of the upper body and the thigh about a point near the third to fifth lumbar vertebras of the waist joint as a pivotal point.

The power-assist electric motor 1001 is placed, in the following fashion, at each of the right and left sides of the waist joint near the third to fifth lumbar vertebras in a manner such that the rotary shaft of the power-assist electric motor 1001 is rotatable about the right-left axis. The positional relationship between of the heavy-work assist suit 1100 and the wearer conforms to the positional relationship between each component and the wearer in a state of wearing the heavy-work assist suit 1100.

The power-assist electric motor 1001 is, at its fixed-end side, attached to a main frame. The main frame serving as a waist frame comprises the frame 1002 and the frame 1003. Adjustment holes disposed in the frame 1002 and the frame 1003 permit adjustment to the width of the main frame in the right-left direction. By virtue of an adjustment mechanism composed of the adjustment holes disposed in the frame 1002 and the frame 1003, in the main frame, its width in the right-left direction can be adjusted to conform to the shape of the wearer's body. The adjustment mechanism composed of the adjustment holes disposed in the frame 1002 and the frame 1003 serves as an adjustment mechanism for waist.

On the rotating-end side of the power-assist electric motor 1001 is installed a lower-limb assist arm. The lower-limb assist arm serving as a thigh frame comprises the frames 1004 to 1006. The frame 1004 and the frame 1005 are attached to each other via the driven rotary shaft 1007 configured to provide a degree of freedom in turning motion of the hip joint about the front-rear axis. The frame 1006 is made vertically slidable in the slide hole 1008 disposed at the frame 1005 side. By virtue of an adjustment mechanism in which the frame 1006 slides in the slide hole 1008, the lower-limb assist arm is capable of arm-length adjustment in conformity to the shape of the wearer's body. The main frame and an upper-body assist arm constitute an upper-body frame. The adjustment mechanism in which the frame 1006 slides in the slide hole 1008 serves as an adjustment mechanism for thigh.

At the front end of the frame 6 is installed the receiving portion 1009 having a semi-cylindrical receiving surface via the driven rotary shaft 1010 configured to provide a degree of freedom in turning motion about the right-left axis. The driven rotary shaft 1010 serving as a thigh connection portion causes the receiving portion 1009 to rotate about the right-left axis, thereby imparting an adequate angle to the receiving surface of the receiving portion 1009 in response to the motion of the wearer's thigh. Attached to the receiving portion 1009 is the belt 1011. The belt 1011 is provided to fasten the wearer's thigh to the receiving portion 1009.

On the frame 1003 is installed the upper-body assist arm via the driven rotary shaft 1012 configured to provide a degree of freedom in turning motion about the vertical axis and the driven rotary shaft 1013 configured to provide a degree of freedom in turning motion about the front-rear axis. The upper-body assist arm serving as a chest frame comprises the frames 1014 to 1018.

The upper-body assist arm is placed so as to extend from the back side of the wearer's waist to the underarm and from there to the front of the chest, and supports the wearer's upper limb. By virtue of an angular adjustment mechanism 1027 provided in the frame 1015 and the frame 1016, the upper-body assist arm is capable of adjustment to the angle of the upper-limb assist arm in conformity to the shape of the wearer's body. Moreover, adjustment holes disposed in the frame 1014 and the frame 1015 permit adjustment to the breadth of the upper-body assist frame. By virtue of an adjustment mechanism composed of the adjustment holes, the upper-limb assist frame can be adjusted to conform to the shape of the wearer's body. The driven rotary shaft 1012 and the driven rotary shaft 1013 are upper-body connection portions. The frame 1014 and the frame 1015 are chest rear frames.

In the upper-body assist arm, the frame 1016 is allowed to telescope throughout its length by a slide mechanism disposed inside the frame 1016. The upper-body assist arm is so designed that, when the wearer leans forward or backward, the slide mechanism prevents the upper-body assist arm from interfering with the forward or backward leaning motion of the wearer. The frame 1016 is coupled to the frame 1018 via the frame 1017. The main frame and the upper-body assist arm serve as the upper-body frame. The frame 1016 and the frame 1017 situated on the right side of the wearer are chest right frames, and the frame 1016 and the frame 1017 situated on the left side of the wearer are chest left frames.

On The frame 1018, which is a chest front frame, is installed a chest cushion 1020 via the driven rotary shaft 1019 configured to provide a degree of freedom in turning motion about the right-left axis. Two belts 1021 are each placed so as to extend from the frame 1018 to the top of the wearer's shoulder and from there to the frame 1014. The chest cushion 1020 and the belts 1021 bring the upper-body assist arm into intimate contact with the wearer. The driven rotary shaft 1019 is a chest connection portion. The chest cushion 1020 is a cushioning portion.

Figure 20:
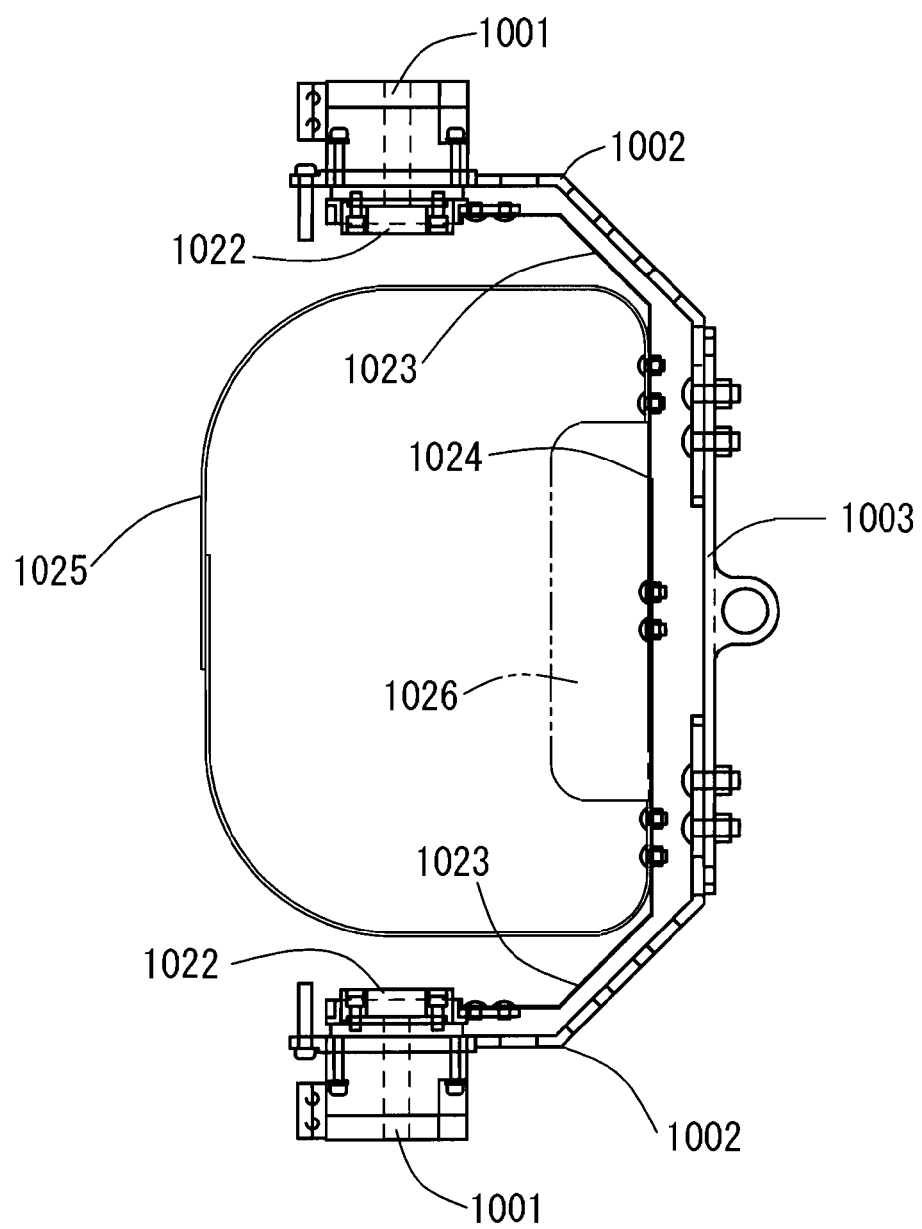
FIG. 20 is a sectional view of a main frame equipped with the power-assist electric motor 1.

FIG. 20 is a sectional view of the main frame equipped with the power-assist electric motor 1. FIG. 20 is a sectional view taken along the line A-A shown in FIG. 19B. On the rotating-end side of the power-assist electric motor 1001 is further installed, via a bearing 1022, a sub frame. The sub frame comprises the frame 1023 and the frame 1024.

The bearing 1022 serving as a bearing portion comprises an inner-ring part and an outer-ring part. The rotating-end side of the power-assist electric motor 1001 is attached to the inner-ring part of the bearing 1022. Specifically, the inner-ring part is attached to the rotary shaft of the power-assist electric motor 1001. Attached to the inner-ring part is the upper end of the lower-limb assist arm, or equivalently the upper end of the frame 1004. The outer-ring part is attached so as to be rotatable about the axis of the rotary shaft of the power-assist electric motor 1001 relative to the inner-ring part. The frame 1023 of the sub frame is attached to the outer-ring part of the bearing 1022.

In this structure, since the sub frame is attached to the outer-ring part, whereas the rotary shaft of the power-assist electric motor 1001 is attached to the inner-ring part, even if the power-assist electric motor 1001 is operated to rotate the rotary shaft, the sub frame is restrained against rotating motion.

On the sub frame is installed the belt 1025 and a cushion 1026. The belt 1025 and the cushion 1026 bring the sub frame of the heavy-work assist suit 1100 into intimate contact with the wearer's waist.

Figure 21:
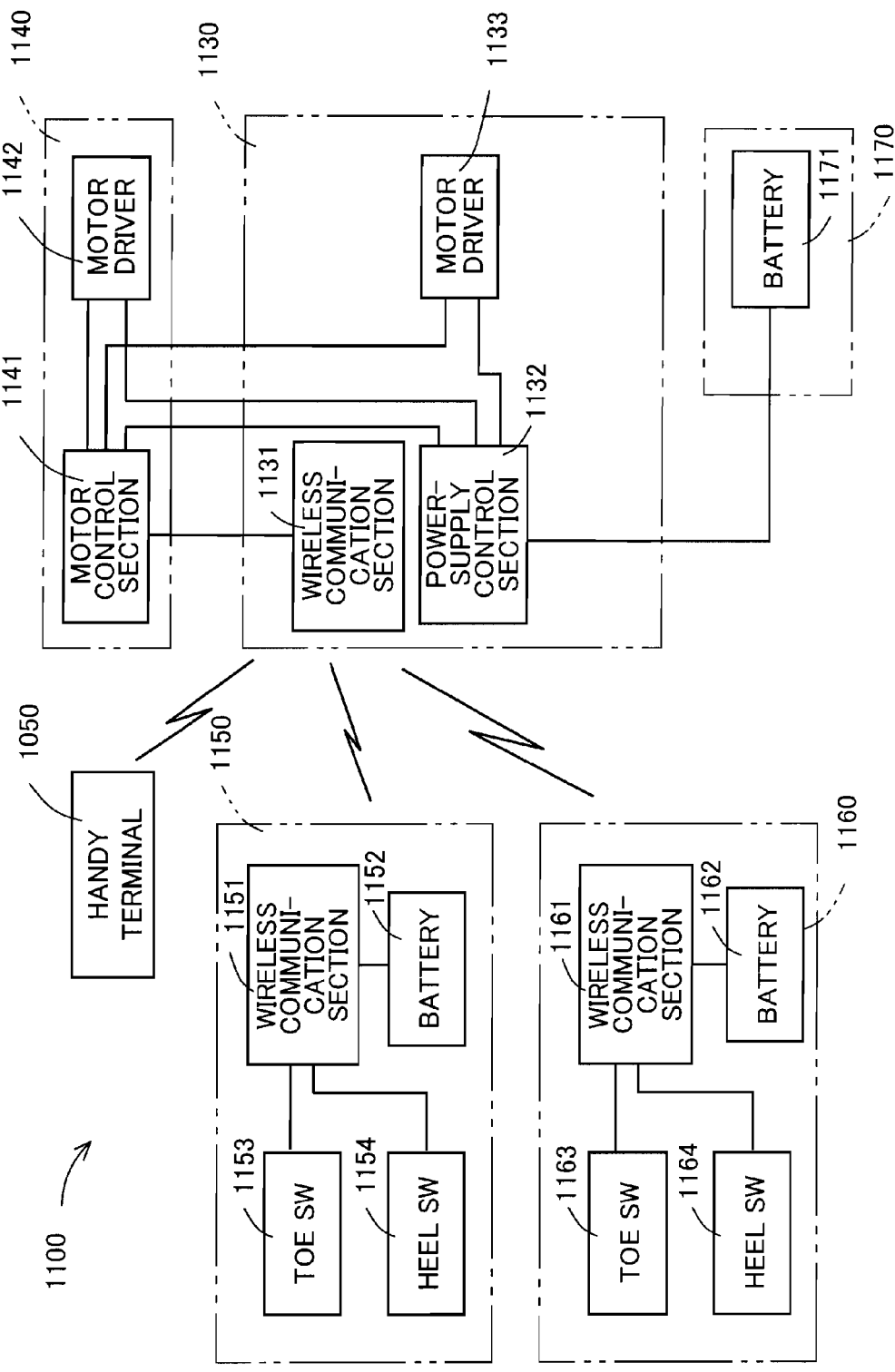
FIG. 21 is a diagram showing the configuration of control devices included in the heavy-work assist suit 100.

FIG. 21 is a diagram showing the configuration of control devices included in the heavy-work assist suit 1100. The control devices included in the heavy-work assist suit 1100 include a handy terminal device (hereafter referred to as "handy terminal") 1050, a communication unit 1130, a control unit 1140, a right-sole unit 1150, a left-sole unit 1160, and a battery unit 1170.

The communication unit 1130, the control unit 1140, and the battery unit 1170 are attached to the frame 1002. The communication unit 1130 and the battery unit 1170 are positioned near the right rear of the wearer, and the control unit 1140 is positioned near the left rear of the wearer. The right-sole unit 1150 is placed at the right shoe sole of the wearer, and the left-sole unit 1160 is placed at the left shoe sole of the wearer. The handy terminal 1050 serving as a parameter input section is portable terminal equipment which is operated while being held by the wearer's right or left hand.

The communication unit 1130 comprises a wireless communication section 1131; a power-supply control section 1132; and a motor driver 1133. The wireless communication section 1131 communicates with the right-sole unit 1150, the left-sole unit 1160, and the handy terminal 1050 by means of wireless communication, and communicates with the control unit 1140 by means of wired communication.

The power-supply control section 1132 controls the battery unit 1170. The motor driver 1133 is a driver for controlling the power-assist electric motor 1001 placed on the right side of the wearer's waist. The motor driver 1133 communicates with a motor control section 1141 by means of wired communication to receive a command such as an output torque command required for assistance from the motor control section 1141, as well as to send information such as motor positional information to the motor control section 1141. The motor positional information is information representing the rotation angle of the rotary shaft of the power-assist electric motor 1001.

The control unit 1140 comprises the motor control section 1141 and a motor driver 1142. The motor control section 1141 serving as a drive control section includes a biaxial inclination sensor. The biaxial inclination sensor serving as a first angle detecting portion, which is for example an acceleration sensor for detecting the degree of acceleration in the directions of two axes that are perpendicular to each other, is positioned so as to detect the angle of turning motion of the wearer's upper limb about the right-left axis and the angle of turning motion of the wearer's upper body about the front-rear axis. Although, in this embodiment, the biaxial inclination sensor is used to detect the angle of turning motion of the wearer's upper body about the right-left axis, the detecting means is not limited to the biaxial inclination sensor but may be of a triaxial acceleration sensor and a triaxial gyro sensor, for example.

The motor control section 1141 calculates drive torque required for assistance based on information from the wireless communication section 1131 and motor positional information from the motor driver 1133, 1142, and then sends an output torque command to the motor driver 1133, 1142. The motor driver 1142 is a driver for controlling the power-assist electric motor 1001 placed on the left side of the wearer's waist. The motor driver 1142 receives a command such as an output torque command required for assistance from the motor control section 1141, and also sends information such as motor positional information to the motor control section 1141.

The right-sole unit 1150 comprises: a wireless communication section 1151; a battery 1152; a toe switch (hereafter also referred to as "SW") 1153; and a heel SW 1154. The battery 1152 is a rechargeable storage battery for supplying power to the wireless communication section 1151, the toe SW 1153, and the heel SW 1154. The wireless communication section 1151 transmits the status of the toe SW 1153 and the heel SW 1154, or equivalently the result detected from the toe SW 1153 and the heel SW 1154, to the motor control section 1141 of the control unit 1140 by way of the wireless communication section 1131 of the communication unit 1130.

The toe SW 1153 is placed at the toe part of the sole of a right shoe worn by the wearer, for detecting whether a load greater than or equal to a predetermined value acts on the toe. The heel SW 1154 is placed at the heel part of the sole of the right shoe worn by the wearer, for detecting whether a load greater than or equal to a predetermined value acts on the heel.

The left-sole unit 1160 comprises: a wireless communication section 1161; a battery 1162; a toe SW 1163; and a heel SW 1164. The wireless communication section 1161, the battery 1162, the toe SW 1163, and the heel SW 1164 are structurally identical with the wireless communication section 1151, the battery 1152, the toe SW 1153, and the heel SW 1154, respectively, and will therefore be not described to avoid overlaps. The toe SW 1153, the heel SW 1154, the toe SW 1163, and the heel SW 1164 are floor-reaction-force detecting portions.

The handy terminal 1050 is used to set parameters required for the operation of the heavy-work assist suit 1100 as will hereafter be described. The battery unit 1170 includes a battery 1171. The battery 1171 is a rechargeable storage battery. The battery unit 1170 supplies electric power from the battery 1171 to the communication unit 1130 and the control unit 1140.

Figure 22:
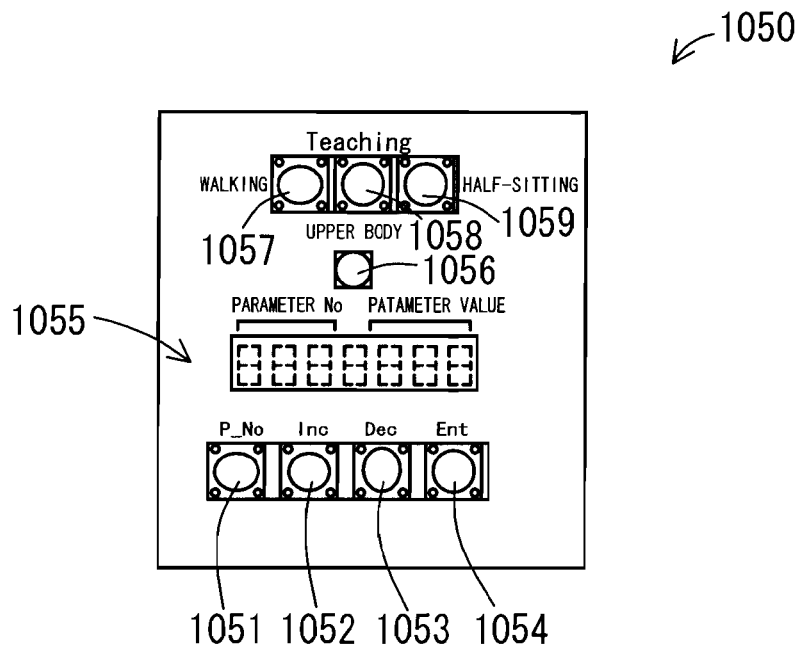
FIG. 22 is a view showing the outer appearance of the handy terminal 50.

FIG. 22 is a view showing the outer appearance of the handy terminal 1050. The handy terminal 1050 is terminal equipment used for the setting of parameters required for the operation of the heavy-work assist suit 1100. The handy terminal 1050 comprises: a parameter-number selection switch 1051; an incrementing switch 1052; a decrementing switch 1053; an entry switch 1054; a parameter display portion 1055; a light emitting diode (hereafter referred to as "LED") 1056; a walking switch 1057; an upper-body switch 1058; and a half-sitting switch 1059.

The parameter-number selection switch 1051 is a switch for inputting parameter number (hereafter also referred to as "parameter No" or "P_No"). The parameter No is incremented from zero by one with every push of the switch. The incrementing switch 1052 is a switch for the counting-up of parameter value for setting, and the parameter value is incremented by one with every push of the switch. The decrementing switch 1053 is a switch for the counting-down of parameter value for setting, and the parameter value is decremented by one with every push of the switch.

The entry switch 1054 is a switch for setting selected parameter No and updated parameter value by storing them in a non-illustrated memory section. The parameter display portion 1055 is constructed of a display device for displaying, for example, a numeral, a symbol, and a character thereon. The parameter display portion 1055 shown in FIG.

22 is capable of displaying a 7-digit number, a symbol, and a character. Upper 3 digits indicate parameter No, the fourth digit indicates symbol "-", and lower 3 digits, namely the fifth to seventh digits indicate parameter value. The LED 1056 is a lamp for indicating that selected parameter No and updated parameter value are set in storage in the non-illustrated memory section. The LED 1056 blinks for a predetermined period of time, for example, for three seconds, following the successful completion of parameter updating.

The walking switch 1057, the upper-body switch 1058, and the half-sitting switch 1059 are teaching switches. The walking switch 1057 is a switch for setting "walking parameter" by storing it in the non-illustrated memory section. The upper-body switch 1058 is a switch for setting "upper-body parameter" by storing it in the non-illustrated memory section. The half-sitting switch 1059 is a switch for setting "half-sitting parameter" by storing it in the non-illustrated memory section.

The wearer depresses, among the walking switch 1057, the upper-body switch 1058, and the half-sitting switch 1059, the one adapted to achieve target action for teaching, and whereafter actually performs a series of movements to be taught. Based on the actually performed movement sequence, a parameter for assisting the movement is produced, and the thusly produced parameter is transmitted to the handy terminal 1050, whereupon the LED 1056 blinks for a predetermined period of time. The motor control section 1141 carries on a teaching mode from the time any one of the walking switch 1057, the upper-body switch 1058, and the half-sitting switch 1059 is depressed until the transmission of the produced parameter to the handy terminal 1050 is completed.

Parameters that can be set in the handy terminal 1050 are listed in Tables 4 to 7. Table 1 is a list of common parameters and walking parameters. Parameter No. 0 is a common parameter for determining a parameter storage area on a wearer-by-wearer basis. Parameters No. 1 to No. 15 are walking parameters. The handy terminal 1050 is capable of storage of parameters corresponding to 10 persons in total. In a parameter storage area for each wearer, parameters ranging from No. 1 to No. 40 can be stored on an individual basis.

Parameters No. 1 to No. 7 are walking control parameters for a swing phase; parameters No. 8 to No. 10 are walking control parameters for a stance phase; and parameters No. 11 to No. 15 are walking judgment parameters. A leg in the swing phase is a lifted leg which is not put on the ground, and a leg in the stance phase is a supported leg placed on the ground. The walking control parameter is a parameter for assisting walking movement, and the walking judgment parameter is a parameter for determining whether wearer's action is walking movement.

TABLE 4

| Parameter No | Meaning | Initial value | Range of values |
|---|---|---|---|
| 0 | Specify parameter storage area on wearer-by-wearer basis | 1 | 1-10 |
| 1 | Maximum in support [%] | 30 | 1-100 |
| 2 | Proportionality range [°] | 30 | 1-90 |
| 3 | Acceleration time [×0.1 sec] | 10 | 1-20 |
| 4 | Return angle [°] | 40 | 1-90 |
| 5 | Return output [%] | 20 | 1-100 |
| 6 | Dead zone [°] | 10 | 1-50 |
| 7 | Increase percentage [%] | 10 | 1-50 |

TABLE 4-continued

| Parameter No | Meaning | Initial value | Range of values |
|---|---|---|---|
| 8 | Maximum in support [%] | 30 | 1-100 |
| 9 | Proportionality range [°] | 30 | 1-90 |
| 10 | Dead zone [°] | 10 | 1-50 |
| 11 | Swinging-up angular rate [°/0.1 sec] | 5 | 1-50 |
| 12 | Swinging-down angular rate [°/0.1 sec] | 5 | 1-50 |
| 13 | Transition time [×0.1 sec] | 10 | 1-50 |
| 14 | Judgment time [×0.1 sec] | 10 | 1-50 |
| 15 | Differentiation time [×0.01 sec] | 10 | 1-100 |

Table 5 is a list of upper-body parameters. Parameters No. 20 to No. 22, No. 24, and No. 25 are upper-body control parameters, and parameters No. 26 to No. 28 are upper-body judgment parameters. The upper-body control parameter is a parameter for assisting upper body's movement, and the upper-body judgment parameter is a parameter for determining whether wearer's action is upper body movement.

TABLE 5

| Parameter No | Meaning | Initial value | Range of values |
|---|---|---|---|
| 20 | Maximum in support [%] | 30 | 1-100 |
| 21 | Proportionality range [°] | 60 | 1-90 |
| 22 | Acceleration time [×0.1 sec] | 10 | 1-20 |
| 24 | Dead zone [°] | 15 | 1-50 |
| 25 | Increase percentage [×0.1%] | 10 | 1-50 |
| 26 | Bending angular rate [°/0.1 sec] | 5 | 1-50 |
| 27 | Bending stop time [%] | 10 | 1-100 |
| 28 | Stop judgment angular rate [°/0.1 sec] | 1 | 1-50 |

Table 6 is a list of half-sitting parameters. Parameters No. 30 to No. 32, No. 34, and No. 35 are half-sitting control parameters, and parameters No. 36 to No. 38 are half-sitting judgment parameters. The half-sitting control parameter is a parameter for assisting wearer's movement in a half-sitting posture, and the half-sitting judgment parameter is a parameter for determining whether wearer's action is a movement in a half-sitting posture.

TABLE 6

| Parameter No | Meaning | Initial value | Range of values |
|---|---|---|---|
| 30 | Maximum in support [%] | 30 | 1-100 |
| 31 | Proportionality range [°] | 60 | 1-90 |
| 32 | Acceleration time [×0.1 sec] | 10 | 1-20 |
| 34 | Dead zone [°] | 15 | 1-50 |
| 35 | Increase percentage [×0.1%] | 10 | 1-50 |
| 36 | Bending angular rate [°/0.1 sec] | 5 | 1-50 |
| 37 | Bending stop time [%] | 10 | 1-100 |
| 38 | Stop judgment angular rate [°/0.1 sec] | 1 | 1-50 |

Table 7 is a list of sole parameters for detection of floor reaction force.

TABLE 7

| Parameter No | Meaning | Initial value | Range of values |
|---|---|---|---|
| 40 | Switch reading time [×10 mS] | 10 | 1-100 |

Figure 23:
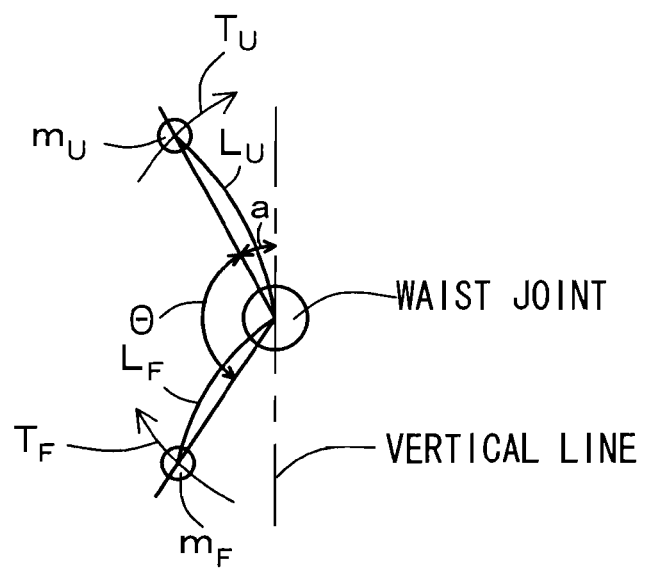
FIG. 23 is a view for explaining calculation of rotation torque T.

FIG. 23 is a view for explaining calculation of rotation torque T. The motor control section 1141 determines assist torque by dynamically calculating rotation torque T required for the wearer to move his/her body in various working postures with use of the rotation angle of the rotary shaft of the power-assist electric motor 1001 and the turning angle of the upper body. The assist torque is the drive torque produced by the power-assist electric motor 1001.

To begin with, the motor control section 1141 acquires a waist joint angle θ and an upper-body forward-inclination angle α. The upper-body forward-inclination angle α is the turning angle of the upper body, or equivalently an angle with respect to a vertical line. The waist joint angle θ is the angle of each thigh relative to the upper body, or equivalently the rotation angle of the rotary shaft of the power-assist electric motor 1001. The motor control section 1141 acquires the right and left waist joint angles θ from the motor drivers 1133, 1142, and also acquires the upper-body forward-inclination angle α from the biaxial inclination sensor included in the motor control section 1141.

Given that the mass of the leg is $m_F$ [kg], and the distance from the waist joint, viz. the rotary shaft of the power-assist electric motor 1001 to the driven rotary shaft 1010 is $L_F$ [m], then rotation torque $T_F$ [N·m] required for the movement of the leg having the mass of $m_F$ can be derived by calculation using the following equation: $T_F = L_F m_F g \sin(\pi - \theta - \alpha)$.

Likewise, given that the mass of the upper body is $m_U$ [kg], and the distance from the waist joint to the frame 1018 is $L_U$ [m], then rotation torque $T_U$ required for the movement of the upper body having the mass of $m_U$ can be derived by calculation using the following equation: $T_U = L_U m_U g \sin(\alpha)$.

In the formulae, g represents the acceleration of gravity. $L_F$, $m_F$, $L_U$, $m_U$ each represent a proportionality constant, which is a fixed value to be determined by the wearer. The motor control section 1141 defines these values as parameters for assist torque calculation. The setting of parameters is made by the wearer via the handy terminal 1050 shown in FIG. 22.

In the heavy-work assist suit 1100, assist torque is determined by dynamically calculating rotation torque T required for the wearer to move his/her body in various working postures instead of utilizing a faint surface electromyogram (EMG) signal which travels through a muscle in response to muscle's motion, wherefore there is no need to install a surface electromyogram (EMG) sensor.

Moreover, in the heavy-work assist suit 1100, assist torque is determined by, instead of adopting an action-pattern reproduction system, dynamically calculating rotation torque T required for the wearer to move his/her body in various working postures and then multiplying the rotation torque by an assist ratio, wherefore it never occurs that discontinuity in movement appears at the time of switching of action patterns.

Figure 24:
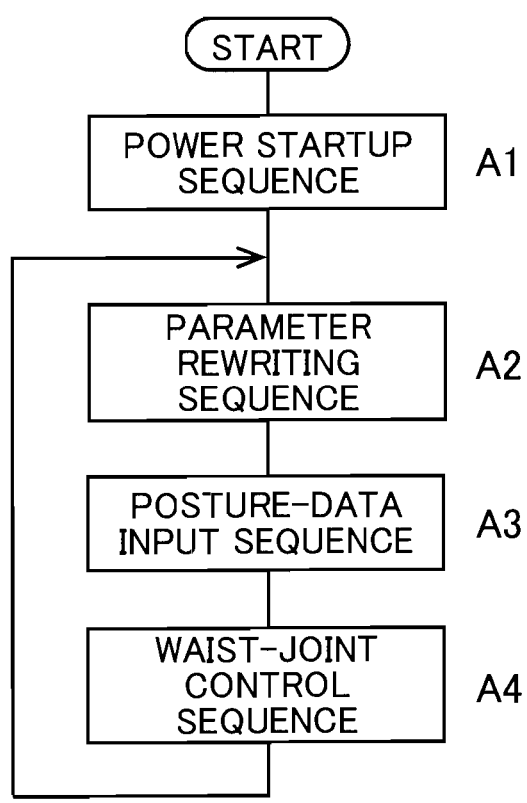
FIG. 24 is a flow chart showing the procedural steps of an assist suit control process to be performed by the heavy-work assist suit 100.

FIG. 24 is a flow chart showing the procedural steps of the assist suit control process to be performed by the heavy-work assist suit 1100. The assist suit control process comprises four steps: a power startup sequence processing step; a parameter rewriting sequence processing step; a posture-data input sequence processing step; and a waist-joint control sequence processing step. Upon powering on the heavy-work assist suit 1100, the motor control section 1141 operates so that the supply of power to the constituent components except the power-assist electric motor 1001 is started, thus bringing the suit into motion, and then the procedure proceeds to Step A1.

In Step A1, the motor control section 1141 executes the power startup sequence processing. Specifically, the motor control section 1141 waits for the completion of reception of parameters required for assistance transmitted from the handy terminal 1050. Following the completion of reception of parameters required for assistance, the motor control section 1141 effects initialization of the turning angle of each joint of the wearer standing in an upright posture; that is, the turning angle of the upper limb and the turning angle of each thigh relative to the upper limb, and turns on the power-assist electric motor 1001.

In Step A2, the motor control section 1141 executes the parameter rewriting sequence processing. Parameters required for assistance are sent from the handy terminal 1050 carried by the wearer as occasion arises. In the assist suit control process, for the sake of execution of parameter updating on a constant basis, the parameter rewriting sequence processing is performed in a main loop. The main loop is a loop of procedural steps composed of Steps A2 to A4.

In Step A3, the motor control section 1141 executes the posture-data input sequence processing. The posture-data input sequence processing is a step of acquiring data about the posture of the wearer.

In Step A4, the motor control section 1141 executes the waist-joint control sequence processing, and the procedure returns to Step A2. In the waist-joint control sequence processing step, based on the data acquired in Step A3, assist torque needed for the operation of the power-assist electric motor 1001 for each of the walking movement, the upper body movement, and the half-sitting movement is calculated, and the calculated result is outputted.

The motor control section 1141 executes the main loop at 10 mS intervals, so that the heavy-work assist suit 1100 is able to achieve smooth assistance to the wearer. Prior to the start of assistance, the motor control section 1141 judges wearer's movement in a few seconds, and produces an output of assist torque after the judgment. Since the heavy-work assist suit 1100 aims to assist able-bodied people, even if assistance is not available for a few seconds at the beginning of action, there arises no problem in actual use.

Figure 25:
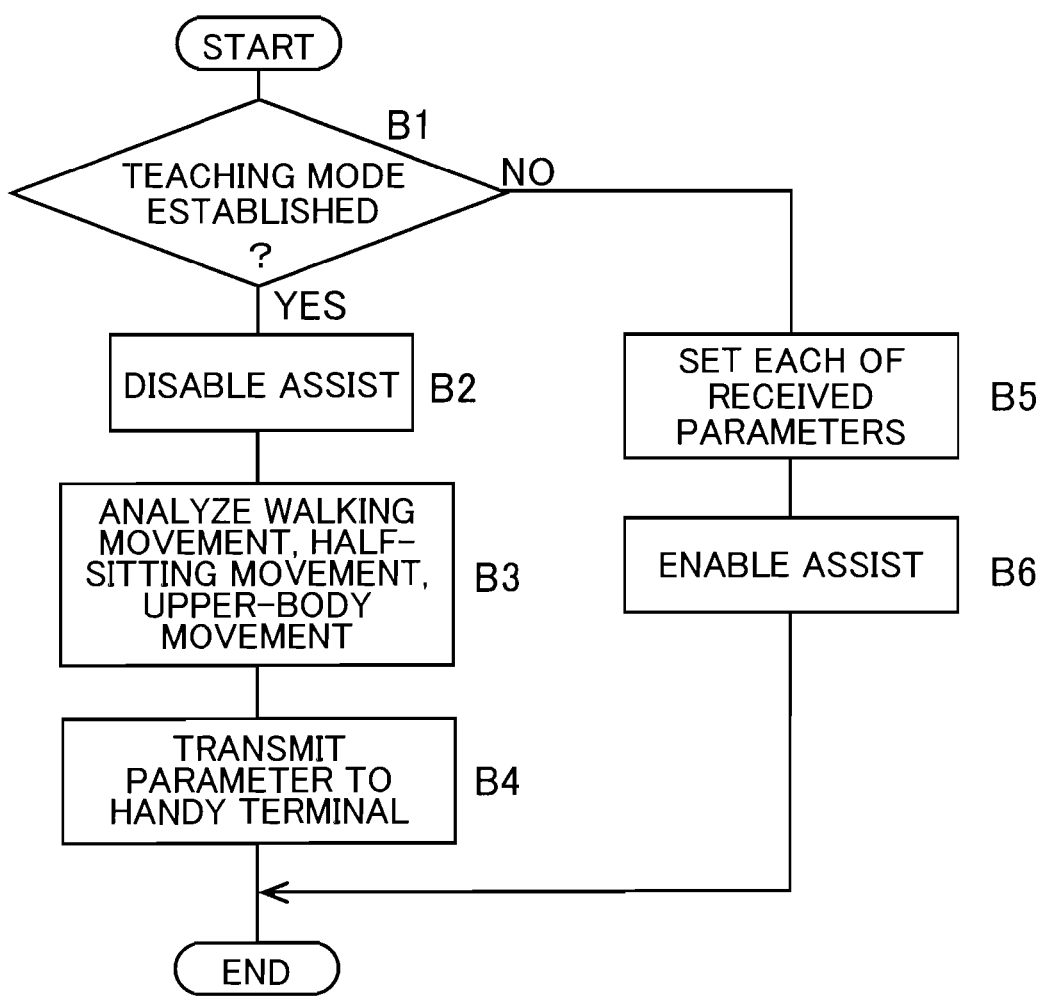
FIG. 25 is a flow chart showing the procedural steps of a parameter rewriting sequence processing.

FIG. 25 is a flow chart showing the procedural steps of the parameter rewriting sequence processing. There are two methods for parameter updating, namely updating performed by manual input and updating performed by input in the teaching mode. The method of performing updating by input in the teaching mode is adopted in the parameter rewriting sequence processing shown in FIG. 25. The motor control section 1141 operates so that, upon execution of Step A2 shown in FIG. 24, the procedure proceeds to Step B1.

In Step B1, the motor control section 1141 determines whether the teaching mode is established. The motor control section 1141 operates so that, in the presence of the teaching mode, the procedure proceeds to Step B2, whereas, in the absence of the teaching mode, the procedure proceeds to Step B5. The motor control section 1141 starts the teaching mode upon depression of any one of the walking switch 1057, the upper-body switch 1058, and the half-sitting switch 1059, and quits the teaching mode following the completion of parameter production in the teaching mode and parameter transmission to the handy terminal 1050.

In Step B2, the motor control section 1141 disables assistance. The motor control section 1141 effects control of the power-assist electric motor 1001 in a manner so as to stop assistance during the interval when assistance is being disabled, and operates so that the procedure returns to Step A2 without executing the posture-data input sequence processing in Step A3 and the waist-joint control sequence processing in Step A4 as shown in FIG. 6.

In Step B3, the motor control section 1141 produces parameters necessary to identify wearer's desired action by analyzing each of wearer's walking movement, upper body movement, and half-sitting movement, based on the right and left waist joint angles θ sent from the motor drivers 1133, 1142, the upper-body forward-inclination angle α sent from the biaxial inclination sensor included in the motor control section 1141, the result detected from the toe SW 1153 and the heel SW 1154 sent from the right-sole unit 1150, and the result detected from the toe SW 1163 and the heel SW 1164 sent from the left-sole unit 1160. Among the produced parameters, parameters No. 11 to No. 15 that are walking judgment parameters, parameters No. 26 to No. 28 that are upper-body judgment parameters, and parameters No. 36 to No. 38 that are half-sitting judgment parameters are obtained by the movement analysis.

In Step B4, the motor control section 1141 transmits the produced parameters to the handy terminal 1050, and brings the parameter rewriting sequence processing to an end. The parameters transmitted to the handy terminal 1050 are checked by the wearer via the handy terminal 1050. The confirmed parameters are re-transmitted to the handy terminal 1050 for validation.

In Step B5, the motor control section 1141 receives parameters from the handy terminal 1050, and sets the received parameters. In Step B6, the motor control section 1141 enables assistance, and brings the parameter rewriting sequence processing to an end. The reason why assistance is enabled after parameter updating is that wearer's safety must be ensured.

Figure 26:
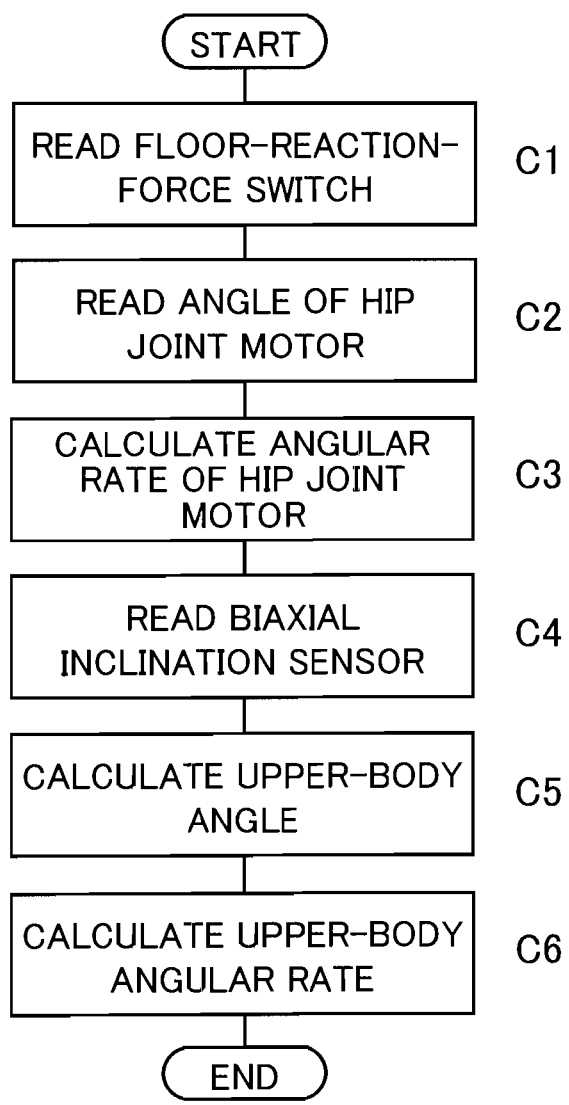
FIG. 26 is a flow chart showing the procedural steps of a posture-data input sequence processing.

FIG. 26 is a flow chart showing the procedural steps of the posture-data input sequence processing. The motor control section 1141 operates so that, upon execution of Step A3 shown in FIG. 24, the procedure proceeds to Step C1.

In Step C1, the motor control section 1141 detects the presence or absence of a floor reaction force by reading floor-reaction-force switches. The floor-reaction-force switches are the toe SW 1153 and the heel SW 1154 of the right-sole unit 1150, and the toe SW 1163 and the heel SW 1164 of the left-sole unit 1160. Specifically, the motor control section 141 receives the result detected from the toe SW 1153 and the heel SW 1154 from the right-sole unit 150, and receives the result detected from the toe SW 1163 and the heel SW 1164 from the left-sole unit 1160.

In Step C2, the motor control section 1141 reads an angle obtained by the motor encoder for the waist joint. Specifically, the motor control section 1141 reads the rotation angle of the rotary shaft of the power-assist electric motor 1001, or equivalently the waist joint angle θ, from the motor encoder for the waist joint, viz. the encoder included in the power-assist electric motor 1001, via the motor driver 1133, 1142. In Step C3, the motor control section 1141 calculates a waist-joint angular rate, or equivalently the angular rate of the rotation angle of the rotary shaft of the power-assist electric motor 1. The encoder included in the power-assist electric motor 1001 is a second angle detecting portion.

In Step C4, the motor control section 1141 reads a detected value obtained by the biaxial inclination sensor included in the motor control section 1141. In Step C5, the motor control section 1141 calculates the turning angle of the upper body, or equivalently an upper-body forward-inclination angle α, based on the detected value from the biaxial inclination sensor. In Step C6, the motor control section 1141 calculates the angular rate of the turning angle of the upper body based on the calculated upper body's turning angle, and brings the posture-data input sequence processing to an end.

Figure 27:
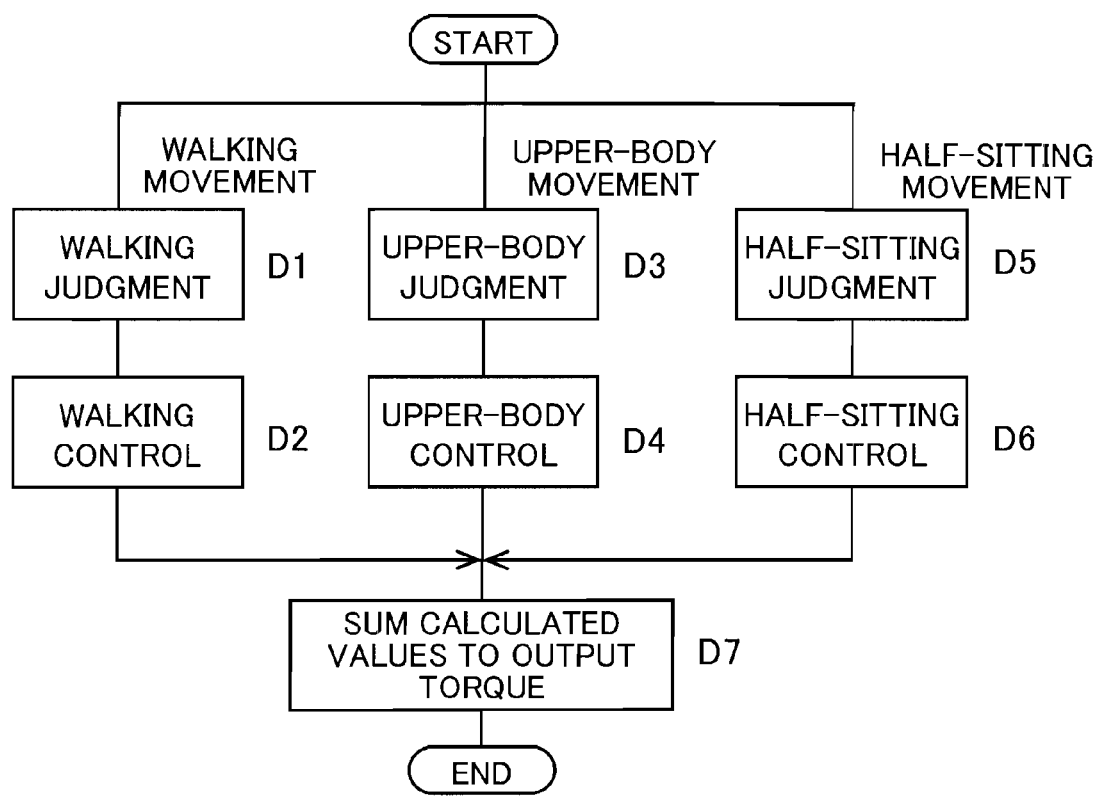
FIG. 27 is a flow chart showing the procedural steps of a hip-joint control sequence processing.

FIG. 27 is a flow chart showing the procedural steps of the hip-joint control sequence processing. Steps D1 and D2 are the process for walking movement. Steps D3 and D4 are the process for upper body movement. Steps D5 and D6 are the process for half-sitting movement. The process for walking movement, the process for upper body movement, and the process for half-sitting movement are performed in parallel. The motor control section 141 operates so that, upon execution of Step A4 shown in FIG. 24, the procedure proceeds to Steps D1, D3, and D5.

In Step D1, the motor control section 1141 makes a judgment on walking. Specifically, the motor control section 1141 determines whether walking movement is being done based on the waist joint angle θ, the upper-body forward-inclination angle α, and the floor reaction force. In Step D2, the motor control section 1141 exercises walking control. Specifically, the motor control section 1141 calculates, during walking movement, assist torque for the lifted leg and assist torque for the supported leg to assist the walking movement based on the waist joint angle θ, the upper-body forward-inclination angle α, and the floor reaction force that vary from moment to moment.

In Step D3, the motor control section 1141 makes a judgment on upper body movement. Specifically, the motor control section 1141 determines whether upper body movement is being done based on the waist joint angle θ, the upper-body forward-inclination angle α, and the floor reaction force. The upper body movement comprises a bending-down motion and a subsequent straightening-up motion of the upper body. In Step D4, the motor control section 1141 exercises upper body control. Specifically, the motor control section 1141 calculates, during upper body movement, assist torque to assist the upper body movement. The motor control section 1141 calculates assist torque proportional to the upper-body forward-inclination angle α that is necessary for both legs.

In Step D5, the motor control section 1141 makes a judgment on half-sitting movement. Specifically, the motor control section 1141 determines whether half-sitting movement is being done based on the waist joint angle θ, the upper-body forward-inclination angle α, and the floor reaction force. The half-sitting movement refers to a movement in a half-sitting posture. In Step D6, the motor control section 1141 exercises half-sitting movement control. Specifically, the motor control section 1141 calculates, during half-sitting movement, assist torque to assist the half-sitting movement. The motor control section 1141 calculates assist torque proportional to the waist joint angle θ that is necessary for both legs. Steps D1 through D6 are calculation steps.

In Step D7 which is a driving step, the motor control section 1141 sums the calculated values, produces an output of drive torque derived from the total value, and brings the hip-joint control sequence processing to an end. Specifically, the motor control section 1141 sums the assist torque calculated in Step D2, the assist torque calculated in Step D4, and the assist torque calculated in Step D6, effects control of the motor driver 1133, 1142 in a manner so as to drive the power-assist electric motor 1 for producing an output of assist torque derived from the total value, and brings the hip-joint control sequence processing to an end.

Figure 28:
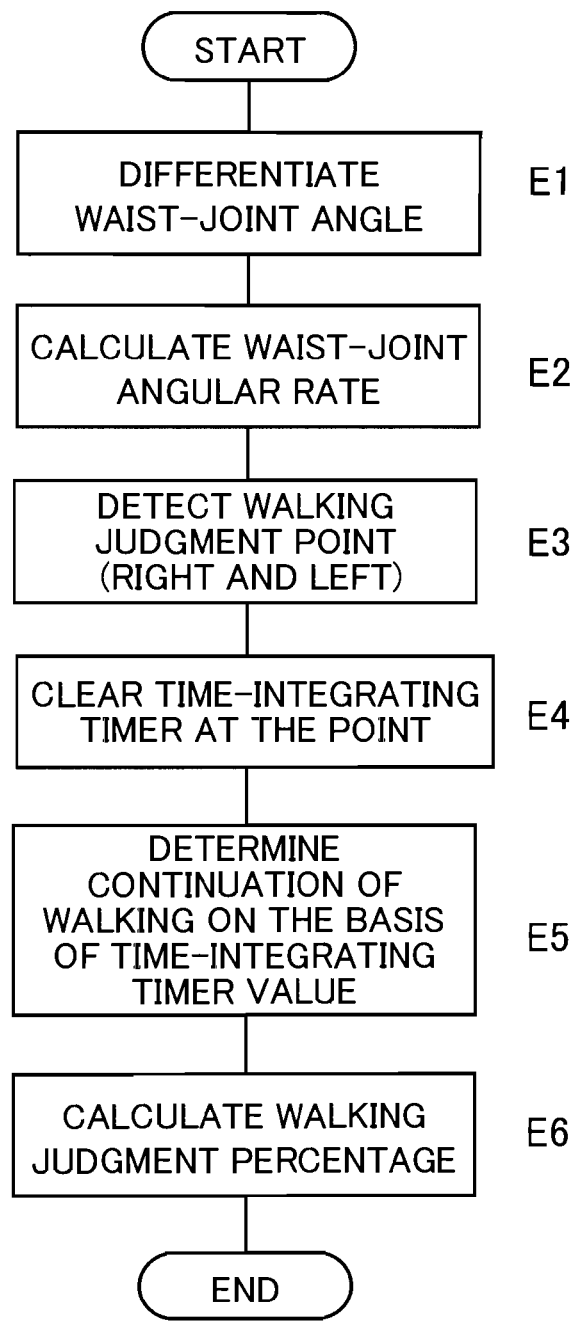
FIG. 28 is a flow chart showing the procedural steps of a walking judgment process.

FIG. 28 is a flow chart showing the procedural steps of the walking judgment process. The motor control section 1141 operates so that, upon execution of Step D1 shown in FIG. 27, the procedure proceeds to Step E1.

In Step E1, the motor control section 1141 differentiates the waist joint angle θ. In Step E2, the motor control section 1141 calculates the angular rate of the waist joint. That is, the motor control section 1141 defines the value obtained by differentiating the waist joint angle θ in Step E1 as the waist-joint angular rate. In Step E3, the motor control section 1141 detects a walking judgment point for each of the right and left legs. Specifically, the motor control section 1141 determines whether the angular rate corresponds to a walking state, and, when the angular rate corresponds to a walking state, defines a point from which the angular rate is originated as the walking judgment point.

In Step E4, the motor control section 1141 clears a time-integrating timer at the walking judgment point. The time-integrating timer is a timer incorporated in the motor control section 1141, for continuing integration computation from the time when the power is turned on until the timer is cleared. Since the time-integrating timer is cleared at the walking judgment point, it never occurs that an integration value from the time-integrating timer exceeds a predetermined value. Accordingly, the motor control section 1141 is capable of determining whether the wearer is walking based on an integration value from the time-integrating timer.

In Step E5, the motor control section 1141 determines the continuation of walking based on a time-integrating timer value, viz. an integration value from the time-integrating timer. That is, the motor control section 1141 determines whether walking movement is continuing based on the time-integrating timer value corresponding to the period from the detection of a walking judgment point to the return to the walking judgment point. In Step E6, the motor control section 1141 calculates a walking judgment percentage, and brings the walking judgment process to an end.

The walking judgment percentage (%) can be derived by calculation using the following equation: walking judgment percentage (%)=(time-integrating timer integration value)÷(transition time)×100. The transition time represents the upper limit of the time-integrating timer integration value. The fixed value is set in the form of a parameter as parameter No. 13 indicative of "judgment time", and the transition time is set in the form of a parameter as parameter No. 14.

Figure 29:
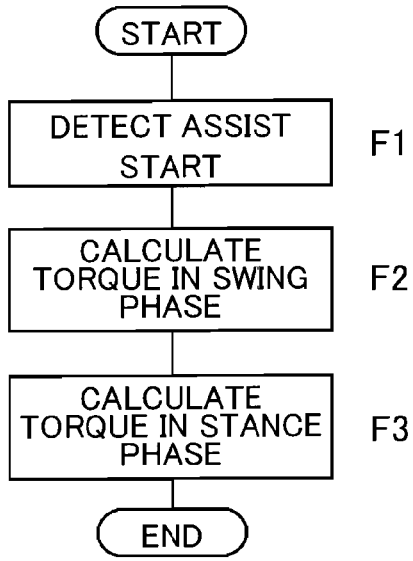
FIG. 29 is a flow chart showing the procedural steps of a walking control process.

FIG. 29 is a flow chart showing the procedural steps of the walking control process. The motor control section 1141 operates so that, upon execution of Step D2 shown in FIG. 27, the procedure proceeds to Step F1.

In Step F1, the motor control section 1141 detects the start of assistance. Specifically, the motor control section 1141 detects that the lifted leg lies in the walking judgment point. In Step F2, the motor control section 1141 calculates assist torque for the lifted leg. The walking movement of the lifted leg comprises a "swinging-up start" motion, a "during swinging-up" motion, a "swinging-down start" motion, a "during swinging-down" motion, and a "swinging-down completed" motion that are done one after another in the order named, and the walking movement comes to an end at the completion of the "swinging-down completed" motion. When the heel SW at the lifted-leg side is turned off and the waist joint angle is small, then it is judged that the swinging-up motion of the leg is started, and a short-time maximum assist torque in a swinging-up direction is calculated. When it is judged that, subsequent to the "swinging-up start" motion, the "during swinging-up" motion is being done, then assist torque in the swinging-up direction proportional to the waist joint angle is calculated. When the waist angle reaches a predetermined value, then it is judged that the "swinging-down start" motion is being done, and under this condition, also under the "during swinging-down" motion, assist torque becomes zero.

In Step F3, the motor control section 1141 calculates assist torque for the supported leg, and brings the walking control process to an end. The motor control section 1141 calculates assist torque proportional to a thigh angle for the sake of maintaining an upright posture by the supported leg. The thigh angle refers to the angle of the thigh relative to the vertical line, which is an angle obtained by adding the waist joint angle θ to the upper-body forward-inclination angle α.

Figure 30:
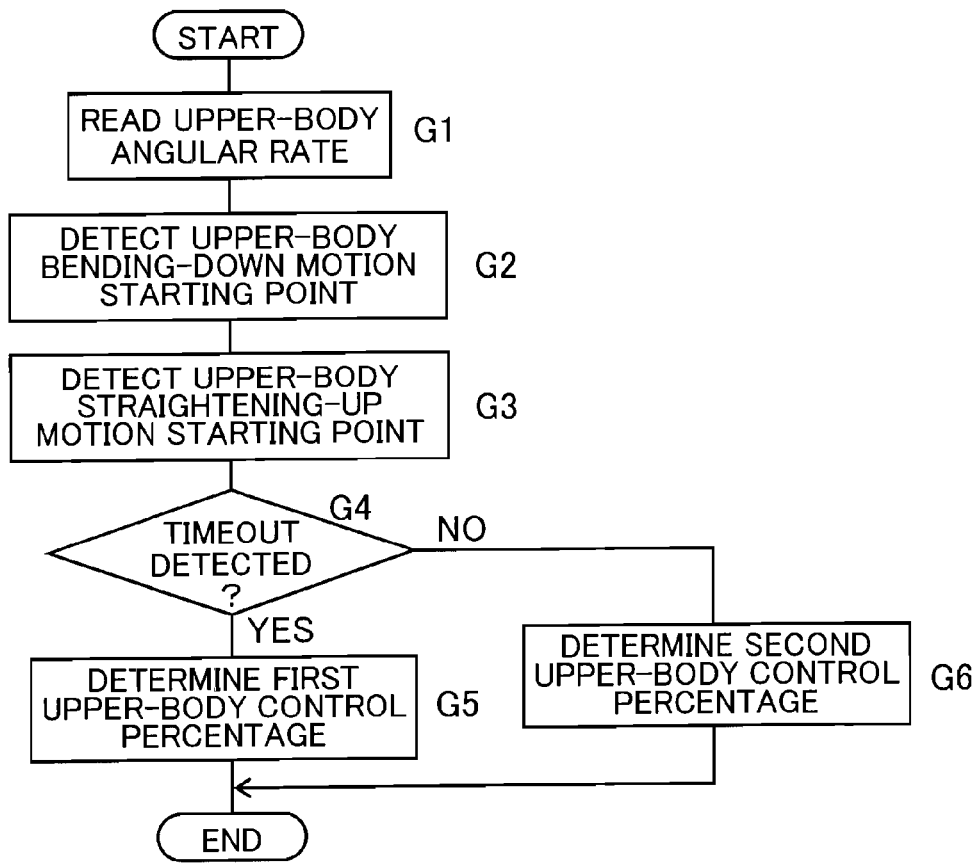
FIG. 30 is a flow chart showing the procedural steps of an upper-body judgment process.

FIG. 30 is a flow chart showing the procedural steps of the upper-body judgment process. The motor control section 141 operates so that, upon execution of Step D3 shown in FIG. 27, the procedure proceeds to Step G1.

In Step G1, the motor control section 1141 reads the angular rate of the upper body. Specifically, the motor control section 1141 calculates the angular rate of the upper body based on the detected value from the biaxial inclination sensor included in the motor control section 1141. In Step G2, the motor control section 1141 detects an upper-body bending-down motion starting point. Specifically, the motor control section 1141 detects a point at which the angular rate calculated in Step G1 exceeded the "bending angular rate" indicated by parameter No. 26, and defines the point as the upper-body bending-down motion starting point.

In Step G3, the motor control section 1141 detects an upper-body straightening-up motion starting point. Specifically, the motor control section 1141 detects a point at which the bending-down motion of the upper body stops, and defines the point as the upper-body straightening-up motion starting point.

In Step G4, the motor control section 1141 determines whether a timeout has been detected. The motor control section 1141 determines that a timeout has been detected when the straightening-up motion of the upper body has not been completed within a predetermined period of time in Step G3, and permits the procedure to proceed to Step G5, and determines that a timeout has not been detected when the straightening-up motion of the upper body has been completed within a predetermined period of time in Step G3, and permits the procedure to proceed to Step G6. In Step G5, the motor control section 1141 determines a first upper-body control percentage, and brings the upper-body judgment process to an end. In Step G6, the motor control section 1141 determines a second upper-body control percentage, and brings the upper-body judgment process to an end.

Figure 31:
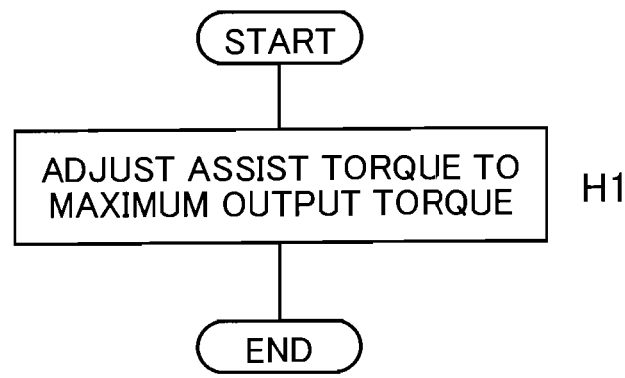
FIG. 31 is a flow chart showing the procedural steps of a first upper-body control process.

FIG. 31 is a flow chart showing the procedural steps of the first upper-body control process. The motor control section 1141 permits the procedure to proceed to Step H1 when Step D4 as shown in FIG. 27 is executed and the first upper-body control percentage is determined in Step G5 as shown in FIG. 30. In Step H1, the motor control section 1141 adjusts the assist torque for assisting the upper body movement to the maximum output torque, and brings the first upper-body control process to an end.

Figure 32:
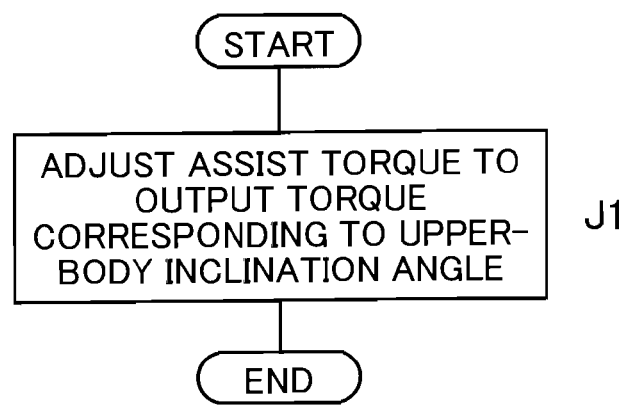
FIG. 32 is a flow chart showing the procedural steps of a second upper-body control process.

FIG. 32 is a flow chart showing the procedural steps of the second upper-body control process. The motor control section 1141 permits the procedure to proceed to Step J1 when Step D4 as shown in FIG. 27 is executed and the second upper-body control percentage is determined in Step G6 as shown in FIG. 30. In Step J1, the motor control section 1141 adjusts the assist torque for assisting the upper body movement to output torque corresponding to the upper-body inclination angle α, and brings the second upper-body control process to an end.

Figure 33:
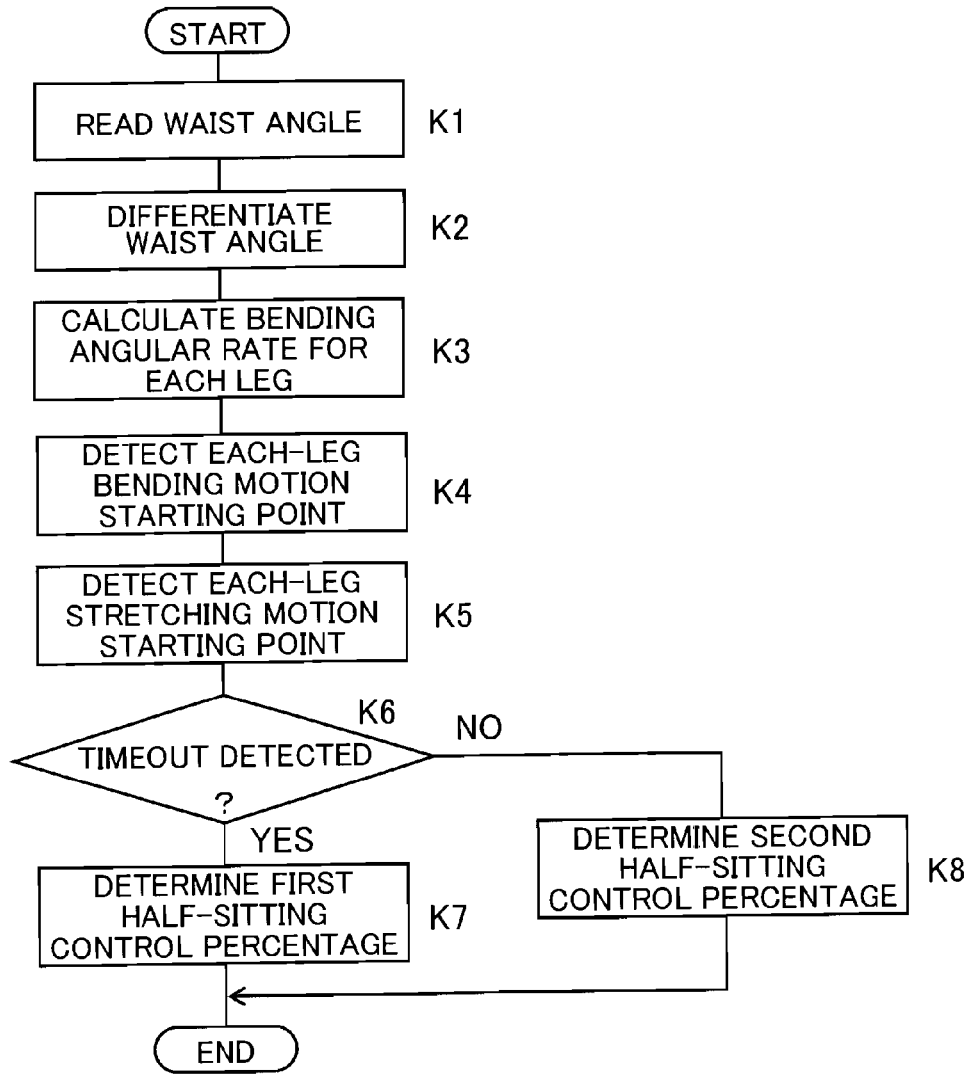
FIG. 33 is a flow chart showing the procedural steps of a half-sitting judgment process.

FIG. 33 is a flow chart showing the procedural steps of the half-sitting judgment process. The motor control section 1141 operates so that, upon execution of Step D5 shown in FIG. 27, the procedure proceeds to Step K1.

In Step K1, the motor control section 1141 reads the waist angle, or equivalently the waist joint angle θ. Specifically, the motor control section 1141 reads the rotation angle of the rotary shaft of each of the right and left power-assist electric motors 1001 from the encoder included in the power-assist electric motor 1001 via the motor driver 1133, 1142. In Step K2, the motor control section 1141 differentiates the waist angle read in Step K1. In Step K3, the motor control section 1141 calculates a bending angular rate of each leg based on the waist angle obtained by differentiation in Step K2.

In Step K4, the motor control section 1141 detects a point at which the angular rate calculated in Step K3 exceeded the "bending angular rate" indicated by parameter No. 36, and defines the point as an each-leg bending motion starting point. In Step K5, the motor control section 1141 detects a point at which the bending motion of each leg stops, and defines the point as an each-leg stretching motion starting point.

In Step K6, the motor control section 1141 determines whether a timeout has been detected. The motor control section 1141 determines that a timeout has been detected when the stretching motion of each leg has not been completed within a predetermined period of time in Step K5, and permits the procedure to proceed to Step K7, and determines that a timeout has not been detected when the stretching motion of each leg has been completed within a predetermined period of time in Step K5, and permits the procedure to proceed to Step K8. In Step K7, the motor control section 1141 determines a first half-sitting control percentage, and brings the half-sitting judgment process to an end. In Step K8, the motor control section 1141 determines a second half-sitting control percentage, and brings the half-sitting judgment process to an end.

Figure 34:
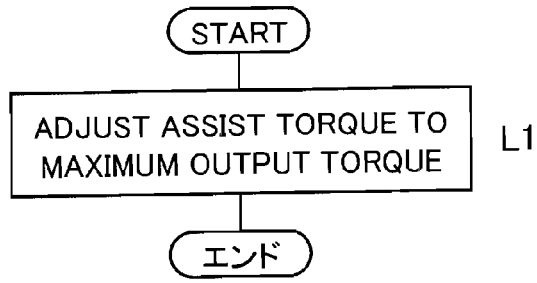
FIG. 34 is a flow chart showing the procedural steps of a first half-sitting control process.

FIG. 34 is a flow chart showing the procedural steps of the first half-sitting control process. The motor control section 1141 permits the procedure to proceed to Step L1 when Step D6 as shown in FIG. 27 is executed and the first half-sitting control percentage is determined in Step K7 as shown in FIG. 33. In Step L1, the motor control section 1141 adjusts the assist torque for assisting the half-sitting movement to the maximum output torque, and brings the first half-sitting control process to an end.

Figure 35:
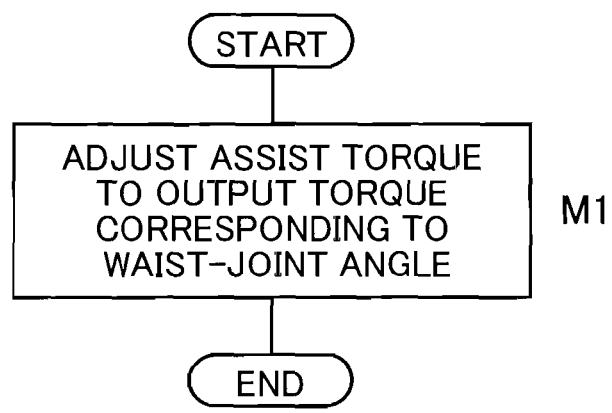
FIG. 35 is a flow chart showing the procedural steps of a second half-sitting control process.

FIG. 35 is a flow chart showing the procedural steps of the second half-sitting control process. The motor control section 1141 permits the procedure to proceed to Step M1 when Step D6 as shown in FIG. 27 is executed and the second half-sitting control percentage is determined in Step K8 as shown in FIG. 33. In Step M1, the motor control section 1141 adjusts the assist torque for assisting the half-sitting movement to output torque corresponding to the waist joint angle θ, and brings the second half-sitting control process to an end.

In the heavy-work assist suit 1100, for the purpose of power assistance to the waist joint, viz. lumbar vertebra, the power-assist electric motor 1001 is placed on each of the right and left sides of the waist joint. In the power-assist electric motor 1001, in the interest of back-drivable capability, in other words, in order that the drive device can be operated from the wearer's side, the speed reducer added to the power-assist electric motor 1001 is adjusted so that the speed reduction ratio stands at about a one-hundredth level, for restricting the power-assist electric motor 1001's output to prevent production of a force greater than that which can be produced by the wearer, which makes it possible to ensure a sufficient assist force in the anti-gravity direction.

Thus, in the heavy-work assist suit 1100, in order to render the power-assist electric motor 1001 in use back-drivable, the speed reducer added to the power-assist electric motor 1 is adjusted so that the speed reduction ratio is as low as about a one-hundredth level for restricting the power-assist electric motor 1001's output to prevent production of a force greater than that which can be produced by the wearer, which makes it possible to ensure wearer's safety.

In the heavy-work assist suit 100, as an assist mechanism equipped with the power-assist electric motor 1001, the driven rotary shafts 1007, 1010, 1012, 1013 and 1019, or equivalently drive device-free rotary shafts, are each disposed around the outer periphery of the target wearer's joint to permit freedom of wearer's movement in directions other than the assist direction.

Thus, in the heavy-work assist suit 1100, in order to permit freedom of wearer's movement in directions other than the assist direction, the driven rotary shafts 1007, 1010, 1012, 1013 and 1019 are each disposed around the outer periphery of the target wearer's joint, wherefore no restraint is put on wearer's movement.

Moreover, the heavy-work assist suit 1100 is designed and controlled so as to be able to provide power assistance to both of the waist joint and the hip joint at the same time during execution of work for lifting and transporting heavy objects. The heavy-work assist suit 1100 provides power assistance to the waist joint to prevent development of pain in the lower back, and provides power assistance to the hip joint to assist walking. Thus, the heavy-work assist suit 1100 is capable of providing power assistance to both of the waist joint, viz. lumbar vertebra, and the hip joint at the same time to assist walking while preventing lower back pain.

Moreover, in the heavy-work assist suit 1100, since assist torque is determined by dynamically calculating rotation torque and so forth required for the wearer to move his/her body in various working postures instead of utilizing a faint surface electromyogram (EMG) signal which travels through a muscle in response to muscle's motion, there is no inconvenience of placement of a surface electromyogram (EMG) sensor. Thus, the heavy-work assist suit 1100 is useful because of being free from the inconvenience of placement of a surface electromyogram (EMG) sensor.

Moreover, in the heavy-work assist suit 1100, since assist torque is determined by dynamically calculating torque and so forth required for the wearer to move his/her body in various working postures instead of adopting an action-pattern reproduction system, it never occurs that discontinuity in movement appears at the time of switching of action patterns. Thus, in the heavy-work assist suit 1100, since there is no need to compile a large number of action patterns into a database, it never occurs that discontinuity in movement appears at the time of switching of action patterns.

Furthermore, in contrast to a passive system such as a spring-type system or rubber-type system that is merely capable of providing power assistance in only one direction, the heavy-work assist suit 1100 is based on an active system using the power-assist electric motor 1001, and therefore has bidirectional assist capability.

Thus, two power-assist electric motors 1001 are located near the opposite lateral sides, respectively, of the wearer's waist in the right-left direction, for producing drive torque for assisting the movement of the upper body and the thigh in a direction to follow the movement of the wearer's upper body and thighs. The upper-body frame is placed at the wearer's chest and waist, for holding the two power-assist electric motors 1001. Two lower-limb assist arms are each designed so that one end is fixed to the rotary shaft of the power-assist electric motor 1 and the other end is placed at the lateral side of the thigh. Accordingly, the heavy-work assist suit 1100 is capable of assisting heavy-object lifting action and walking movement with fewer driving sources, namely the two power-assist electric motors 1 located at the lateral sides of the waist.

Moreover, the upper-body frame includes the upper-body assist arm, the main frame, the driven rotary shaft 1012, and the driven rotary shaft 1013. The upper-body assist arm is placed at the wearer's chest. The main frame holds the two power-assist electric motors 1001 at its opposite ends, respectively, and extends along the back side of the wearer's waist in a region between the two power-assist electric motors 1001 so as to lie at the wearer's waist. The driven rotary shaft 1012 and the driven rotary shaft 1013 couple the upper-body assist arm to the main frame for rotation about the front-rear axis and the vertical axis. Accordingly, in contrast to the case of coupling the upper-body assist arm to the main frame at two locations, namely their ends, the heavy-work assist suit 1100 is capable of assisting heavy-object lifting action and walking movement without putting any restraint on the side-to-side motion of the upper body and the turning motion of the upper body.

Moreover, the power-assist electric motor 1001 includes the bearing composed of the inner-ring part secured to the rotary shaft of the power-assist electric motor 1001 and the outer-ring part disposed so as to be rotatable about the axis of the rotary shaft thereof relative to the inner-ring part. One end of the lower-limb assist arm is secured to the inner-ring part. The main frame includes the sub frame secured to the outer-ring part, which is placed in intimate contact with the wearer's waist. Accordingly, the heavy-work assist suit 1100 is capable of assisting heavy-object lifting action and walking movement without putting any restraint on the motion of the waist.

Moreover, the upper-body assist arm includes the frame 1018, the frame 1014, the frame 1015, the frame 1016 and the frame 1017 located at the right side of the wearer, the frame 1016 and the frame 1017 located at the left side of the wearer, and the chest cushion 1020. The frame 1018 extends in the direction of the right-left axis at the front of the wearer's chest. The frame 14 and the frame 15, which extend in the direction of the right-left axis at the back of the wearer's waist, are coupled to the main frame via the driven rotary shaft 1012 and the driven rotary shaft 1013. The frame 1016 and the frame 1017 located at the right side of the wearer couple the right end of the frame 1018 to the right end of the frame 1015 for free displacement. The frame 1016 and the frame 1017 located at the left side of the wearer couple the left end of the frame 1018 to the left end of the frame 15 for free displacement. The chest cushion 1020 is coupled to the frame 1018 via the driven rotary shaft 1019 coupled for rotation about the right-left axis to the frame 1018 so as to be placed in intimate contact with the wearer's chest. Accordingly, the heavy-work assist suit 1100 is capable of assisting heavy-object lifting action and walking movement without putting any restraint on the back-and-forth motion of the upper body.

Moreover, the lower-limb assist arm includes the driven rotary shaft 1010 for coupling the other end of the lower-limb assist arm to the thigh for rotation about the right-left axis. Accordingly, the heavy-work assist suit 1100 is capable of assisting heavy-object lifting action and walking movement without putting any restraint on the motion of the thigh.

Moreover, the main frame includes the adjustment mechanism composed of the adjustment holes disposed in the frame 1002 and the frame 1003 for making adjustment to the distance between the two power-assist electric motors 1001, and also the lower-limb assist arm includes the adjustment mechanism in which the frame 1006 for making adjustment to the distance between one end and the other end of the lower-limb assist arm slides in the slide hole 1008. Accordingly, the heavy-work assist suit 1100 can be changed in form in conformity to the shape of the wearer's body.

Moreover, the biaxial inclination sensor detects the angle of turning motion of the wearer's upper body about the right-left axis. The encoder included in the power-assist electric motor 1001 is installed in each of the two power-assist electric motors 1001, and detects the rotation angle of the rotary shaft of each of the power-assist electric motors 1001. The toe SW 1153 and the heel SW 1154, as well as the toe SW 1163 and the heel SW 1164, are placed at the toe part and the heel part, respectively, of the sole of a shoe worn by the wearer, and detect whether a load greater than or equal to a predetermined value acts on the toe and the heel. Thus, the heavy-work assist suit 1100 is useful because of being free from the inconvenience of placement of a surface electromyogram (EMG) sensor.

Moreover, the motor control section 1141 determines static torque exerted on the upper body and thighs, a turning direction, and rotation torque required for turning motion by calculation, based on the turning angle of the upper limb detected by the biaxial inclination sensor, the rotation angle of the rotary shaft of the power-assist electric motor 1001 detected by the encoder included in the power-assist electric motor 1001, and the result detected from the toe SW 1153, the heel SW 1154, the toe SW 1163, and the heel SW 1164. Then, the motor control section 1141 calculates drive torque for a drive to the two power-assist electric motors 1001, based on the thusly determined static torque, turning direction, and rotation torque, and then drives the two power-assist electric motors 1001 so as to produce the calculated drive torque. Thus, in the heavy-work assist suit 1100, since there is no need to compile a large number of action patterns into a database, it never occurs that discontinuity in movement appears at the time of switching of action patterns.

Moreover, the motor control section 1141 reduces the calculated drive torque so that the speed reduction ratio becomes less than or equal to a level that allows the wearer to operate the two power-assist electric motors 1001 in a reverse direction, and imparts the drive torque to the two power-assist electric motors 1. This allows the heavy-work assist suit 1100 to ensure wearer's safety.

Moreover, to the handy terminal 1050, parameters indicative of individual differences among wearers are inputted. The motor control section 1141 calculates the drive torque based on parameters inputted via the handy terminal 1050. This allows the heavy-work assist suit 1100 to provide assistance with consideration given to individual variations.

Moreover, the motor control section 1141 produces parameters indicative of individual differences among wearers based on the turning angle of the upper body detected by the biaxial inclination sensor, the rotation angle of the rotary shaft of the power-assist electric motor 1001 detected by the encoder included in the power-assist electric motor 1001, and the result detected from the toe SW 1153, the heel SW 1154, the toe SW 1163, and the heel SW 1164. Accordingly, the heavy-work assist suit 1100 becomes capable of producing parameters dependent on individual variations when the wearer actually moves his/her body while wearing the heavy-work assist suit 1100.

Moreover, in practicing the control method for the heavy-work assist suit 1100, in Steps D1 to D6, static torque exerted on the upper body and thighs, a turning direction, and rotation torque required for turning motion are determined by calculation, based on the turning angle of the upper body detected by the biaxial inclination sensor, the rotation angle of the rotary shaft of the power-assist electric motor 1001 detected by the encoder included in the power-assist electric motor 1001, and the result detected from the toe SW 1153, the heel SW 1154, the toe SW 1163, and the heel SW 1164. Then, in Step D7, drive torque for a drive to the two power-assist electric motors 1001 is calculated based on the static torque, turning direction, and rotation torque determined in Steps D1 to D6, and the two power-assist electric motors 1001 are driven so as to produce the calculated drive torque. Thus, according to the control method pursuant to the invention, it is possible to assist heavy-object lifting action and walking movement with fewer driving sources, namely the two power-assist electric motors 1 located on the opposite sides of the waist, respectively.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

REFERENCE SIGNS LIST

1, 11, 201, 212: Electric motor
2-4, 12-14, 203, 205, 209, 302, 304: Driven rotary shaft
5, 15, 216, 312, 344, 512, 529, 644: Back frame
6, 16, 513, 530: Cushion pad
7: Shoulder belt
8, 531: Chest belt
9, 19, 208, 533, 536: Arm
10, 211: Arm belt
17, 217, 314, 514: Waist belt
18, 218: Crotch belt
20, 223: Thigh belt
21, 538: Toe floor-reaction-force detection switch
22, 539: Heel floor-reaction-force detection switch
23, 540: Central control unit
50: Handy terminal
51: Parameter-number selection switch
52: Incrementing switch
53: Decrementing switch
54: Entry switch
55: Mode switch
56: Parameter display portion
57: LED
100: First light-work assist suit
130: Lower-limb unit
131, 151, 161: Wireless communication section
132: Control section
133, 152, 162: Battery
140: Upper-limb unit
150: Right-foot unit
160: Left-foot unit
200: Second light-work assist suit
202, 204, 206, 213: Frame
207: Hinge
210, 222: Receiving surface
219: Front belt
220: Back belt
300: First heavy-work assist suit
301, 315, 501, 516: Pneumatic cylinder
305, 308, 309, 311, 316, 318, 320, 321: Driven rotary shaft
303, 306, 307, 310, 317, 322: Frame
324: Upper-limb back box
325: Artificial rubber muscle
326: Movement frame
327, 328: Linear guide
329: Rack gear
330: Central control unit
340, 560: Joint unit
350: Right-sole unit
360: Left-sole unit
370: Lifter unit
500: Second heavy-work assist suit
502, 504, 505, 508, 509, 511, 517, 519: Driven rotary shaft
503, 506, 507, 510, 518, 520, 523, 527: Frame
515: Thigh belt
521, 522, 526, 528, 532: Driven rotary shaft
524: Lower-leg belt
525, 535: Rotary actuator
534: Upper-arm belt
537: Forearm belt
630-632: Pinion gear
633: Wire winding sheave
634, 639, 640: Wire
635: Balance plate
636: Frame
637, 638: Pulley
641: Hook
642: Switch
643: Glove
645: Belt
1001: Power-assist electric motor
1002-1006, 1014-1018, 1023, 1024: Frame
1008: Slide hole
1009: Receiving portion
1007, 1010, 1012, 1013, 1019: Driven rotary shaft
1011, 1021, 1025: Belt
1020: Chest cushion
1022: Bearing
1026: Cushion
1027: Angular adjustment mechanism
1050: Handy terminal
1051: Parameter-number selection switch
1052: Incrementing switch
1053: Decrementing switch
1054: Entry switch
1055: Parameter display portion
1056: LED
1057: Walking switch
1058: Upper-body switch
1059: Half-sitting switch
1100: Heavy-work assist suit
1130: Communication unit
1131, 1151, 1161: Wireless communication section
1132: Power-supply control section
1134, 1142: Motor driver
1140: Control unit
1141: Motor control section
1150: Right-sole unit
1152, 1162, 1171: Battery
1153, 1163: Toe SW
1154, 1164: Heel SW
1160: Left-sole unit
1170: Battery unit

The invention claimed is:

1. A power assist robot apparatus comprising:
a waist belt;
two rotating drive portions that are located near opposite lateral sides in a right-left direction of the waist belt, respectively, and are configured to produce drive torque for assisting a movement of a wearer's upper body and thighs in a direction to follow the movement of the wearer's upper body and thighs;

an upper-body frame for placement at the wearer's chest and waist that is connected to rotary shafts of the two rotating drive portions to form a lever-fulcrum combination, the two rotating drive portions being a fulcrum and the upper body frame being a lever; and two thigh frames, each of which has one end fixed to one of the rotary shafts of the rotating drive portions and has the other end placed at a lateral side of a thigh, the upper-body frame comprises,
- a chest frame for placement at the wearer's chest;
- a waist frame for holding the two rotating drive portions at opposite ends thereof, respectively, which extends along a back side of the waist belt in a region between the two rotating drive portions; and
- an upper-body connection portion that is located on a back face side of the waist belt and configured to couple the chest frame to the waist frame for rotation about a front-rear axis and a vertical axis as well.

2. The power assist robot apparatus according to claim 1, wherein the respective rotating drive portions comprises a bearing comprising an inner-ring part secured to the rotary shaft of the rotating drive portion and an outer-ring part that is rotatable about an axis of the rotary shaft relative to the inner-ring part, one end of the thigh frame is secured to the inner-ring part, and wherein the waist frame comprises a sub frame which is secured to the outer-ring part for intimate contact with the wearer's waist.

3. The power assist robot apparatus according to claim 1, wherein the upper-body frame comprises
a first joint and a second joint, the first and second joints each having one degree of freedom, the second joint having a degree of freedom different from the first joint.

4. The power assist robot apparatus according to claim 1, wherein at least one of the two thigh frames comprises
a third joint, a fourth joint and a fifth joint, each of the third, fourth and fifth joints each having one degree of freedom, the one degree of freedom for each joint being different from the degrees of freedom for others of the third, fourth or fifth joints.

5. The power assist robot apparatus according to claim 1, further comprising:
- a first angle detecting portion for detecting an angle of turning motion of the wearer's upper body about a right-left axis thereof;
- a second angle detecting portion in each of the two rotating drive portions for detecting a rotation angle of the rotary shaft of each of the rotating drive portions; and
- a shoe comprising floor-reaction-force detecting portions that are placed at a toe part and a heel part, respectively, of a sole of the shoe, for detecting whether a load greater than or equal to a value acts on the toe part and the heel part.

6. A control method for the power assist robot apparatus as set forth in claim 5, comprising:
determining static torque exerted on the wearer's upper body and each thigh, a turning direction, and rotation torque required for turning motion by calculating, based on a turning angle of the upper body detected by the first angular detecting portion, a rotation angle of the rotary shaft of the rotating drive portion detected by the second angular detecting portion, and a result detected from the floor-reaction-force detecting portion; and calculating drive torque for a drive to the two rotating drive portions, based on the static torque, turning direction, and rotation torque determined in the calculation step, and driving the two rotating drive portions to produce the calculated drive torque.

7. The power assist robot apparatus according to claim 5, further comprising:
- a non-transitory medium including computer readable instructions; and
- one or more processors configured to
  determine static torque exerted on the wearer's upper body and thighs, a turning direction, and rotation torque required for turning motion by calculation, based on a turning angle of the wearer's upper body detected by the first angle detecting portion, a rotation angle of the rotary shaft of the rotating drive portion detected by the second angle detecting portion, and a result detected from the floor-reaction-force detecting portion,
  calculate drive torque which is to be produced by the two rotating drive portions, based on the determined static torque, turning direction, and rotation torque, and
  drive the two rotating drive portions to produce the calculated drive torque.

8. The power assist robot apparatus according to claim 7, wherein the one or more processors are further configured to
reduce the calculated drive torque so that a speed reduction ratio becomes less than or equal to a level that allows the rotating drive portions to operate in a reverse direction, and
impart the drive torque to the two rotating drive portions.

* * * * *